(12) United States Patent
Kawano et al.

(10) Patent No.: US 11,087,775 B2
(45) Date of Patent: Aug. 10, 2021

(54) DEVICE AND METHOD OF NOISE SUPPRESSION BASED ON NOISE SOURCE POSITIONS

(71) Applicant: SONY CORPORATION, Tokyo (JP)

(72) Inventors: Shinichi Kawano, Tokyo (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 404 days.

(21) Appl. No.: 15/779,195

(22) PCT Filed: Sep. 26, 2016

(86) PCT No.: PCT/JP2016/078321
§ 371 (c)(1),
(2) Date: May 25, 2018

(87) PCT Pub. No.: WO2017/098775
PCT Pub. Date: Jun. 15, 2017

(65) Prior Publication Data
US 2020/0321018 A1  Oct. 8, 2020

(30) Foreign Application Priority Data

Dec. 11, 2015  (JP) ............................. JP2015-242189

(51) Int. Cl.
*G10L 21/0216* (2013.01)
*G10K 11/178* (2006.01)
(Continued)

(52) U.S. Cl.
CPC .......... *G10L 21/0216* (2013.01); *G06F 3/012* (2013.01); *G06F 3/167* (2013.01);
(Continued)

(58) Field of Classification Search
CPC ...... G10L 15/22; G10L 21/0208; G10L 25/84
See application file for complete search history.

(56) References Cited

U.S. PATENT DOCUMENTS

2002/0156633 A1* 10/2002 Hickey ............... G11B 19/025
704/270
2010/0123785 A1* 5/2010 Chen ..................... H04R 3/005
348/207.11
(Continued)

FOREIGN PATENT DOCUMENTS

CN  103688232 A   3/2014
EP  2746898 A1   6/2014
(Continued)

OTHER PUBLICATIONS

International Search Report and Written Opinion of PCT Application No. PCT/JP2016/078321, dated Dec. 6, 2016, 08 pages of ISRWO.

(Continued)

*Primary Examiner* — Jialong He
(74) *Attorney, Agent, or Firm* — Chip Law Group

(57) ABSTRACT

An information processing device including a control unit which, on a basis of a positional relation between a generation source of noise and a sound collecting unit that collects a sound generated by a user, controls output to induce an action of the user to change a sound collection characteristic of a generated sound, the action being different from an operation related to processing of the sound collecting unit. An information processing method performed by a processor, the information processing method including, on a basis of a positional relation between a generation source of noise and a sound collecting unit that collects a sound generated by a user, controlling output to induce an action of the user to change a sound collection characteristic of a generated sound, the action being different from an operation related to processing of the sound collecting unit.

19 Claims, 36 Drawing Sheets

(51) Int. Cl.
*G06F 3/01* (2006.01)
*G06F 3/16* (2006.01)
*G06K 9/00* (2006.01)
*H04R 1/10* (2006.01)

(52) U.S. Cl.
CPC .... *G06K 9/00671* (2013.01); *G10K 11/17823* (2018.01); *H04R 1/1083* (2013.01); *G10K 2210/1081* (2013.01); *H04R 2460/01* (2013.01)

(56) References Cited

U.S. PATENT DOCUMENTS

| 2013/0121498 | A1* | 5/2013 | Giesbrecht | H04M 9/082 |
| | | | | 381/66 |
| 2013/0208896 | A1* | 8/2013 | Chatlani | H04R 25/407 |
| | | | | 381/17 |
| 2013/0311175 | A1* | 11/2013 | Arakawa | H04R 3/005 |
| | | | | 704/226 |
| 2014/0225825 | A1 | 8/2014 | Yamamoto et al. | |
| 2015/0032451 | A1* | 1/2015 | Gunn | G10L 15/20 |
| | | | | 704/244 |

FOREIGN PATENT DOCUMENTS

| JP | 09-146586 A | 6/1997 |
| JP | 2000-181500 A | 6/2000 |
| JP | 2013-065111 A | 4/2013 |
| JP | 2014-086759 A | 5/2014 |
| JP | 5936069 B2 | 6/2016 |
| KR | 10-2014-0027469 A | 3/2014 |
| WO | 2013/038733 A1 | 3/2013 |
| WO | 2015/136952 A1 | 9/2015 |

OTHER PUBLICATIONS

Office Action for JP Patent Application No. 2017-554946 dated Nov. 10, 2020, 03 pages of Office Action and 03 pages of English Translation.

* cited by examiner

FIG. 6

| | (1) | (2) | (3) | (4) | (5) | (6) | (7) | (8) |
|---|---|---|---|---|---|---|---|---|
| ORIENTATION OF FACE WITH RESPECT TO NOISE SOURCE | | | | | | | | |
| ANGLE (α) FORMED BY ORIENTATION OF FACE AND ORIENTATION FROM NOISE SOURCE TO FACE | | | | | | | | |
| VALUE OF α | α=180 | 90 < α < 180 | α = 90 | 0 < α < 90 | α = 0 | -90 < α < 0 | α = -90 | -180 < α < -90 |
| VALUE OF cos(α) | cos α = -1 | cos α < 0 | cos α = 0 | cos α > 0 | cos α = 1 | cos α > 0 | cos α = 0 | cos α < 0 |
| DIRECTION DETERMINATION VALUE | 1 | 2 | 3 | 4 | 5 | 4 | 3 | 2 |

FIG. 8

| SOUND PRESSURE DETERMINATION VALUE | SOUND PRESSURE LEVEL (dB) | EXAMPLES |
|---|---|---|
| 1 | 0 | HEARING RANGE OF HUMAN |
| | 10 | SOUND OF BREATH |
| | 20 | SOUND OF SHAKING LEAVES |
| | 40 | INSIDE OF LIBRARY |
| 0 | 60 | GENERAL CONVERSATION |
| | 80 | SOUND OF ALARM |
| | 100 | INSIDE OF CAR OF SUBWAY TRAIN |
| | 120 | TAKEOFF SOUND OF AIRPLANE |

FIG. 27

| | (11) | (12) | (13) | (14) | (15) | (16) | (17) | (18) |
|---|---|---|---|---|---|---|---|---|
| ORIENTATION OF FACE WITH RESPECT TO SOUND COLLECTING DEVICE | | | | | | | | |
| ANGLE (α) FORMED BY ORIENTATION OF FACE AND ORIENTATION FROM SOUND COLLECTING DEVICE TO FACE | | | | | | | | |
| VALUE OF α | α = 180 | 90 < α < 180 | α = 90 | 0 < α < 90 | α = 0 | -90 < α < 0 | α = -90 | -180 < α < -90 |
| VALUE OF cos(α) | cos α = -1 | cos α < 0 | cos α = 0 | cos α > 0 | cos α = 1 | cos α > 0 | cos α = 0 | cos α < 0 |
| DIRECTION DETERMINATION VALUE | 5 | 4 | 3 | 2 | 1 | 2 | 3 | 4 |

DEVICE AND METHOD OF NOISE SUPPRESSION BASED ON NOISE SOURCE POSITIONS

CROSS REFERENCE TO RELATED APPLICATIONS

This application is a U.S. National Phase of International Patent Application No. PCT/JP2016/078321 filed on Sep. 26, 2016, which claims priority benefit of Japanese Patent Application No. JP 2015-242189 filed in the Japan Patent Office on Dec. 11, 2015. Each of the above-referenced applications is hereby incorporated herein by reference in its entirety.

TECHNICAL FIELD

The present disclosure relates to an information processing device, an information processing method, and a program.

BACKGROUND ART

In recent years, research and development of sound processing technologies of analyzing input sounds and the like have progressed. For example, a so-called voice recognition technology in which voice produced by a user is received as input voice, voice recognition is performed on the input voice, and thereby a letter string is recognized from the input voice has been developed.

Furthermore, technologies for supporting the sound processing technologies have been developed. For example, Patent Literature 1 discloses a technology for helping a user to ascertain that a voice recognition mode for input voice has started.

CITATION LIST

Patent Literature

Patent Literature 1: JP 2013-25605A

DISCLOSURE OF INVENTION

Technical Problem

In the related art disclosed in Patent Literature 1, however, there is a possibility that a desired processing result of the input voice may not be obtained due to noise. For example, if noise mixed with the voice of the user is input, a correct voice recognition result may not be obtained, and thus it is likely that processing different from intention of the user will be executed.

Therefore, the present disclosure proposes a mechanism that easily suppresses input of noise.

Solution to Problem

According to the present disclosure, there is provided an information processing device including: a control unit configured to, on a basis of a positional relation between a generation source of noise and a sound collecting unit that collects a sound generated by a user, control output to induce an action of the user to change a sound collection characteristic of a generated sound, the action being different from an operation related to processing of the sound collecting unit.

In addition, according to the present disclosure, there is provided an information processing method performed by a processor, the information processing method including: on a basis of a positional relation between a generation source of noise and a sound collecting unit that collects a sound generated by a user, controlling output to induce an action of the user to change a sound collection characteristic of a generated sound, the action being different from an operation related to processing of the sound collecting unit.

In addition, according to the present disclosure, there is provided a program for causing a computer to realize: a control function of, on a basis of a positional relation between a generation source of noise and a sound collecting unit that collects a sound generated by a user, controlling output to induce an action of the user to change a sound collection characteristic of a generated sound, the action being different from an operation related to processing of the sound collecting unit.

Advantageous Effects of Invention

According to the present disclosure described above, a mechanism that can easily suppress input of noise is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating examples of determination patterns of suitability of voice input according to the embodiment.

FIG. 8 is a diagram illustrating an example of patterns for determining suitability of voice input on the basis of sound pressure of noise.

FIG. 27 is a diagram illustrating examples of determination patterns of suitability of voice input according to the embodiment.

MODE(S) FOR CARRYING OUT THE INVENTION

Figure 1:
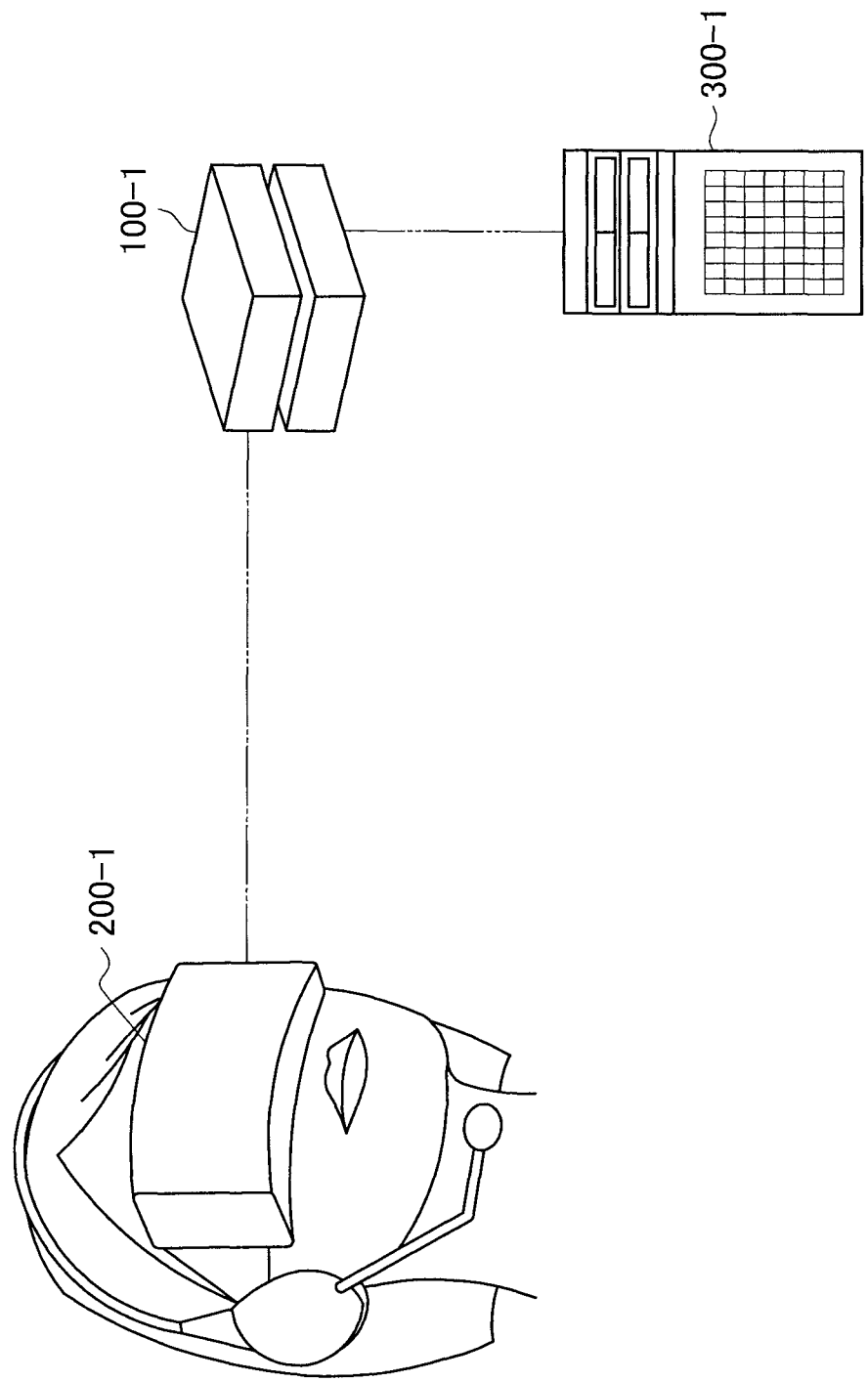
FIG. 1 is a diagram for describing a schematic configuration example of an information processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are also cases in which a plurality of components having substantially the same function and structure are distinguished by adding different numbers to the end of the same reference numeral. For example, a plurality of components having substantially the same function are distinguished as necessary like a noise source 10A and a noise source 10B. However, in a case where it is unnecessary to distinguish components having substantially the same function and structure, only the same reference numeral is added. For example, in a case where it is unnecessary to particularly distinguish the noise source 10A from the noise source 10B, they are referred to as simply as "noise sources 10."

Note that description will be provided in the following order.
1. First embodiment (induction of user for avoidance of noise)
1-1. System configuration
1-2. Configuration of devices
1-3. Processing of device
1-4. Processing examples
1-5. Summary of first embodiment
1-6. Modified example
2. Second embodiment (control of sound collecting unit and induction of user for highly sensitive sound collection)
2-1. System configuration
2-2. Configuration of devices
2-3. Processing of device
2-4. Processing example
2-5. Summary of second embodiment
3. Application examples
4. Conclusion

1. First Embodiment (Induction of User for Avoidance of Noise)

First, a first embodiment of the present disclosure will be described. In the first embodiment, an action of a user is induced for the purpose of reducing the likelihood of noise being input.

1-1. System Configuration

A configuration of an information processing system according to the first embodiment of the present disclosure will be described with reference to FIG. 1. FIG. 1 is a diagram for describing a schematic configuration example of the information processing system according to the present embodiment.

As illustrated in FIG. 1, the information processing system according to the present embodiment includes an information processing device 100-1, a display/sound collecting device 200-1, and a sound processing device 300-1. Note that, for the sake of convenience in description, information processing devices 100 according to the first and second embodiments will be distinguished from each other by affixing numbers corresponding to the embodiments to the ends of the names, like an information processing device 100-1 and an information processing device 100-2. The same applies to other devices.

The information processing device 100-1 is connected to the display/sound collecting device 200-1 and the sound processing device 300-1 through communication. The information processing device 100-1 controls display of the display/sound collecting device 200-1 through communication. In addition, the information processing device 100-1 causes the sound processing device 300-1 to process sound information obtained from the display/sound collecting device 200-1 through communication, and controls display of the display/sound collecting device 200-1 or processing related to the display on the basis of the processing result. The process related to the display may be, for example, processing of a game application.

The display/sound collecting device 200-1 is worn by a user, and performs image display and sound collection. The display/sound collecting device 200-1 provides sound information obtained from sound collection to the information processing device 100-1, and displays an image on the basis of image information obtained from the information processing device 100-1. The display/sound collecting device 200-1 is, for example, a head-mounted display (HMD) as illustrated in FIG. 1, and includes a microphone located at the mouth of the user wearing the display/sound collecting device 200-1. Note that the display/sound collecting device 200-1 may be a head-up display (HUD). In addition, the microphone may be provided as an independent device separate from the display/sound collecting device 200-1.

The sound processing device 300-1 performs processing related to a sound source direction, sound pressure, and voice recognition on the basis of sound information. The sound processing device 300-1 performs the above-described processing on the basis of sound information provided from the information processing device 100-1, and provides the processing result to the information processing device 100-1.

Here, there are cases in which a sound that is different from a desired sound, i.e., noise, is also collected when sounds are collected. One cause for collection of noise is that it is difficult to avoid noise since it is hard to predict a noise generation timing, a place where noise is generated, the frequency of noise generation, and the like. To deal with this problem, eliminating input noise afterward is conceivable. However, there is concern of a processing load and cost increasing due to a noise elimination process to be separately added. In addition, as another method, reducing the likelihood of noise being input is conceivable. For example, an action of a user who has noticed noise keeping a microphone away from a noise source is exemplified. However, a user is unlikely to notice noise in a case in which the user is wearing headphones or the like. Even if a user has noticed noise, it is difficult to accurately find the noise source. In addition, even if a user has noticed noise, it is also difficult for the user to determine whether the noise will be collected by a microphone. Furthermore, there are cases which it is hard to expect a user to perform an appropriate action to prevent noise from being input. For example, it is difficult for the user to appropriately determine an orientation of the face, a way of covering the microphone, or the like that is desirable for avoiding noise.

Therefore, the first embodiment of the present disclosure proposes an information processing system that can easily suppress input of noise. Respective devices that are constituent elements of the information processing system according to the first embodiment will be described below in detail.

Note that, although the example in which the information processing system includes three devices has been described above, the information processing device 100-1 and the sound processing device 300-1 can be realized in one device, and the information processing device 100-1, the display/sound collecting device 200-1, and the sound processing device 300-1 can be realized in one device.

1-2. Configuration of Devices

Next, configurations of respective devices included in the information processing system according to the present embodiment will be described.

Figure 2:
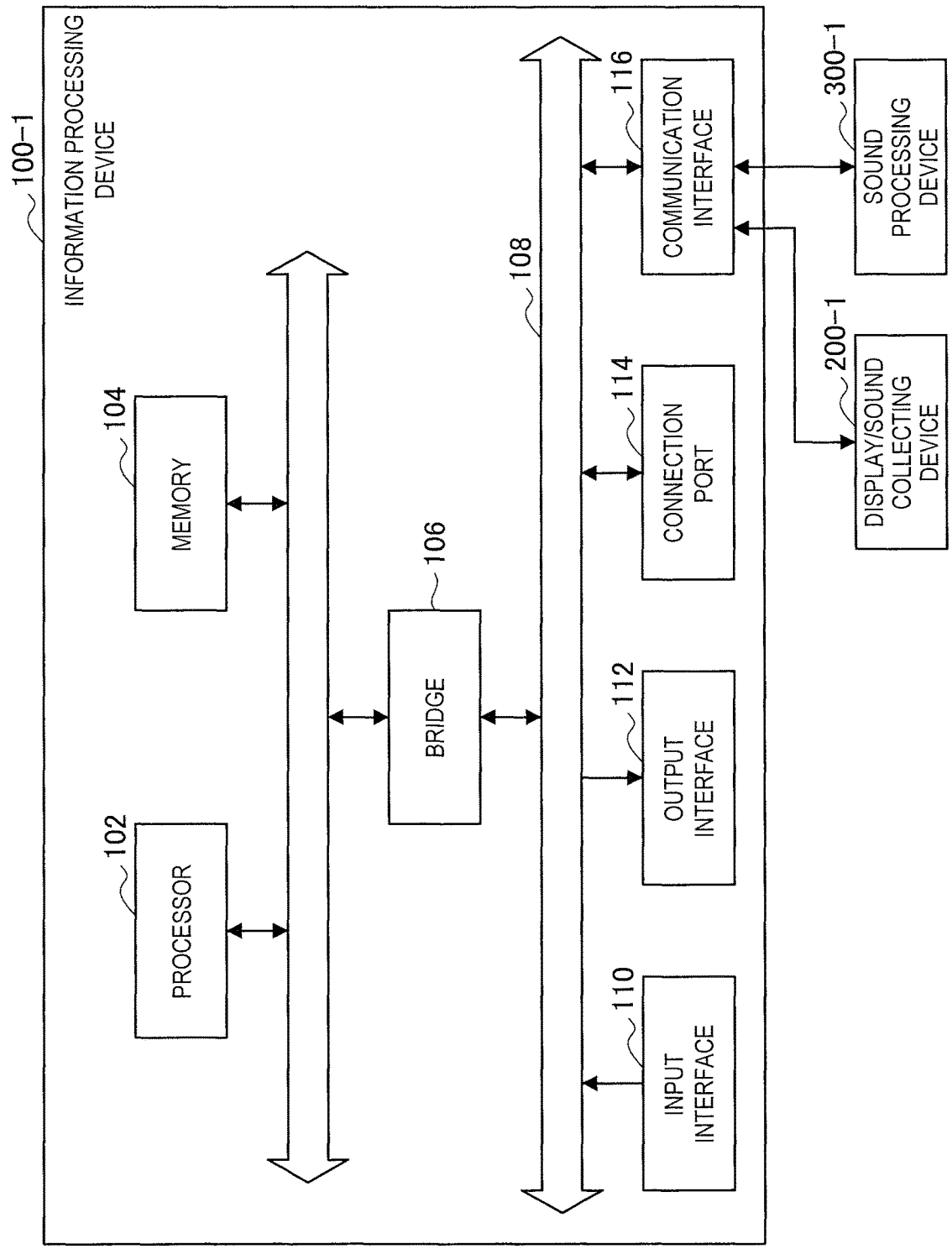
FIG. 2 is a block diagram illustrating a schematic physical configuration example of an information processing device according to the embodiment.
Figure 3:
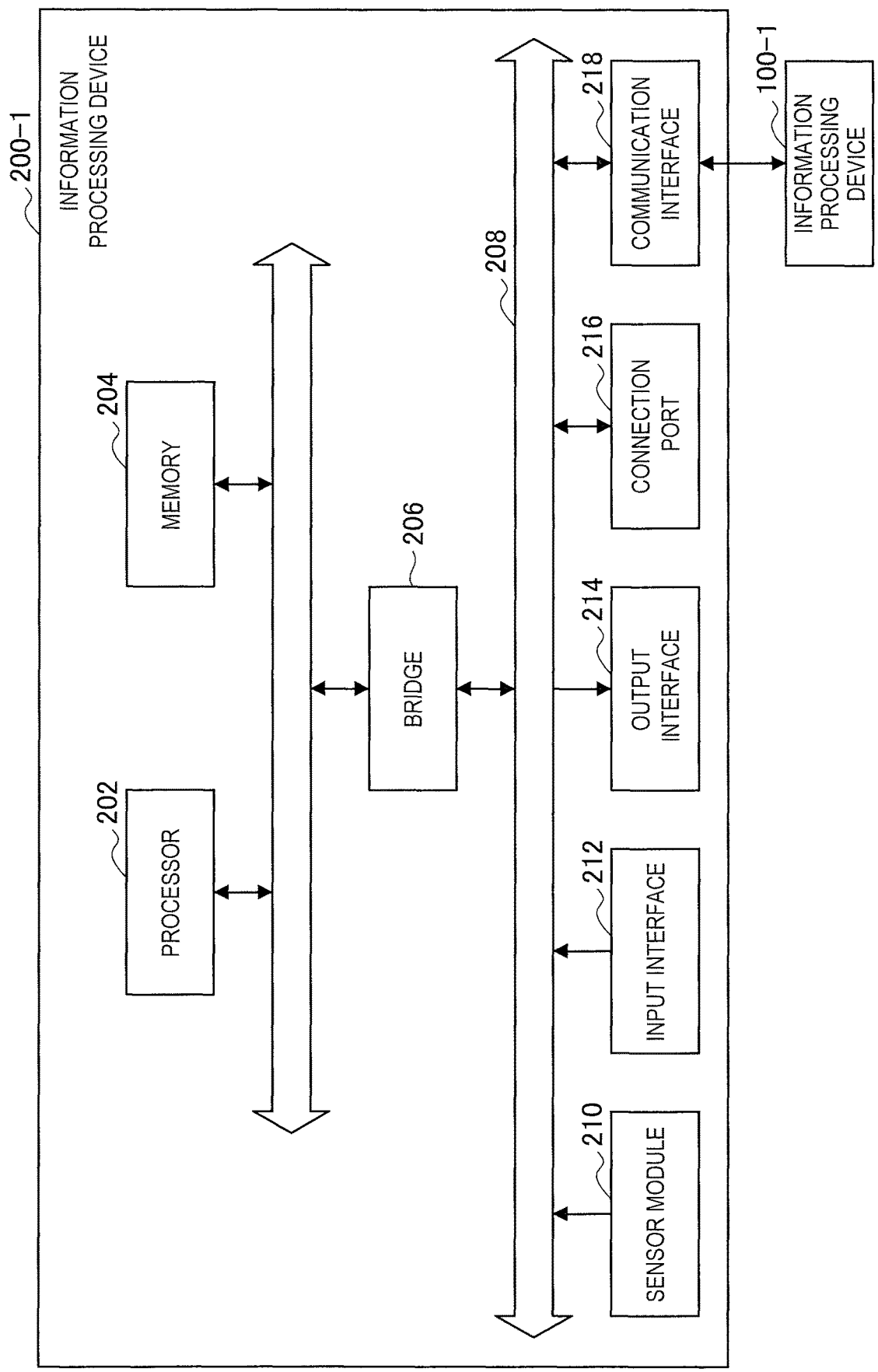
FIG. 3 is a block diagram illustrating a schematic physical configuration example of a display/sound collecting device according to the embodiment.

First, physical configurations of the respective devices will be described with reference to FIG. 2 and FIG. 3. FIG. 2 is a block diagram illustrating a schematic physical configuration example of the information processing device 100-1 according to the present embodiment, and FIG. 3 is a block diagram illustrating a schematic physical configuration example of the display/sound collecting device 200-1 according to the present embodiment.

(Physical Configuration of Information Processing Device)

As illustrated in FIG. 2, the information processing device 100-1 includes a processor 102, a memory 104, the bridge 106, a bus 108, an input interface 110, an output interface 112, a connection port 114, and a communication interface 116. Note that, since a physical configuration of the sound processing device 300-1 is substantially the same as the physical configuration of the information processing device 100-1, the configurations will be descried together below.

(Processor)

The processor 102 functions as an arithmetic processing device, and is a control module that realizes operations of a virtual reality (VR) processing unit 122, a voice input suitability determination unit 124, and an output control unit 126 (in the case of the sound processing device 300-1, a sound source direction estimation unit 322, a sound pressure estimation unit 324, and a voice recognition processing unit 326) included in the information processing device 100-1, which will be described below, in cooperation with various programs. The processor 102 causes various logical functions of the information processing device 100-1, which will be described below, to operate by executing programs stored in the memory 104 or another storage medium using a control circuit. The processor 102 can be, for example, a central processing unit (CPU), a graphics processing unit (GPU), a digital signal processor (DSP), or a system-on-chip (SoC).

(Memory)

The memory 104 stores programs, arithmetic parameters, or the like to be used by the processor 102. The memory 104 includes, for example, a random access memory (RAM), and temporarily stores programs to be used in execution of the processor 102, parameters that are appropriately changed in the execution, or the like. In addition, the memory 104 includes a read only memory (ROM), thereby realizing a storage unit of the information processing device 100-1 with the RAM and the ROM. Note that an external storage device may be used as a part of the memory 104 via a connection port, a communication device, or the like.

Note that the processor 102 and the memory 104 are connected to each other by an internal bus constituted by a CPU bus or the like.

(Bridge and Bus)

The bridge 106 connects buses. Specifically, the bridge 106 connects the internal bus connecting the processor 102 and the memory 104 and the bus 108 connecting the input interface 110, the output interface 112, the connection port 114, and the communication interface 116.

(Input Interface)

The input interface 110 is used by a user to operate the information processing device 100-1 or to input information to the information processing device 100-1. For example, the input interface 110 is constituted by, for example, an input section for the user to input information, such as a button for activating the information processing device 100-1, an input control circuit that generates an input signal on the basis of input of the user and outputs the signal to the processor 102, and the like. Note that the input section may be a mouse, a keyboard, a touch panel, a switch, a lever, or the like. By operating the input interface 110, the user of the information processing device 100-1 can input various kinds of data or give instructions of processing operations to the information processing device 100-1.

(Output Interface)

The output interface 112 is used to notify the user of information. The output interface 112 performs output to devices, for example, such as a liquid crystal display (LCD) device, an organic light emitting diode (OLED) device, a projector, a speaker, or a headphone.

(Connection Port)

The connection port 114 is a port for connecting an apparatus directly to the information processing device 100-1. The connection port 114 can be, for example, a Universal Serial Bus (USB) port, an IEEE 1394 port, a small computer system interface (SCSI) port, or the like. In addition, the connection port 114 may be an RS-232C port, an optical audio terminal, a High-Definition Multimedia Interface (HDMI, a registered trademark) port, or the like. By connecting the connection port 114 to an external apparatus, data can be exchanged between the information processing device 100-1 and the apparatus.

(Communication Interface)

The communication interface 116 intermediates communication between the information processing device 100-1 and an external device, and realizes operations of a communication unit 120 which will be described below (in the case of the sound processing device 300-1, a communication unit 320). The communication interface 116 may execute wireless communication complying with an arbitrary wireless communication scheme such as, for example, a short-range wireless communication scheme such as Bluetooth (registered trademark), near field communication (NFC), a wireless USB, or TransferJet (registered trademark), a cellular communication scheme such as wideband code division multiple access (WCDMA, a registered trademark), WiMAX (registered trademark), Long Term Evolution (LTE), or LTE-A, or a wireless local area network (LAN) such as Wi-Fi (registered trademark). In addition, the communication interface 116 may execute wired communication for performing communication using wires.

(Physical Configuration of Display/Sound Collecting Device)

In addition, the display/sound collecting device 200-1 includes a processor 202, a memory 204, a bridge 206, a bus 208, a sensor module 210, an input interface 212, an output interface 214, a connection port 216, and a communication interface 218 as illustrated in FIG. 3.

(Processor)

The processor 202 functions as an arithmetic processing device, and is a control module that realizes operations of a control unit 222 included in the display/sound collecting device 200-1, which will be described below, in cooperation with various programs. The processor 202 causes the display/sound collecting device 200-1 to operate various logical functions which will be described below by executing programs stored in the memory 204 or another storage medium using a control circuit. The processor 202 can be, for example, a CPU, a GPU, a DSP, or a SoC.

(Memory)

The memory 204 stores programs, arithmetic parameters, or the like to be used by the processor 202. The memory 204 includes, for example, a RAM, and temporarily stores programs to be used in execution of the processor 202, parameters that are appropriately changed in the execution, or the like. In addition, the memory 204 includes a ROM, thereby realizing a storage unit of the display/sound collecting device 200-1 with the RAM and the ROM. Note that an external storage device may be used as a part of the memory 204 via a connection port, a communication device, or the like.

Note that the processor 202 and the memory 204 are connected to each other by an internal bus constituted by a CPU bus or the like.

(Bridge and Bus)

The bridge 206 connects buses. Specifically, the bridge 206 connects the internal bus connecting the processor 202 and the memory 204 and the bus 208 connecting the sensor module 210, the input interface 212, the output interface 214, the connection port 216, and the communication interface 218.

(Sensor Module)

The sensor module 210 performs measurement for the display/sound collecting device 200-1 and peripheries thereof. Specifically, the sensor module 210 includes a sound collecting sensor and an inertial sensor, and generates sensor information from signals obtained from these sensors. Accordingly, operations of a sound collecting unit 224 and a face direction detection unit 226, which will be described below, are realized. The sound collecting sensor is, for example, a microphone array from which sound information from which a sound source can be detected is obtained. Note that a general microphone other than the microphone array may be separately included. Hereinbelow, a microphone array and a general microphone will also be collectively referred to as microphones. In addition, the inertial sensor is an acceleration sensor or an angular velocity sensor. In addition to these sensors, other sensors such as a geomagnetic sensor, a depth sensor, a temperature sensor, a barometric sensor, and a bio-sensor may be included.

(Input Interface)

The input interface 212 is used by a user to operate the display/sound collecting device 200-1 or to input information to the display/sound collecting device 200-1. For example, the input interface 212 is constituted by, for example, an input section for the user to input information, such as a button for activating the display/sound collecting device 200-1, an input control circuit that generates an input signal on the basis of input of the user and outputs the signal to the processor 202, and the like. Note that the input section may be a touch panel, a switch, a lever, or the like. By operating the input interface 212, the user of the display/sound collecting device 200-1 can input various kinds of data or give instructions of processing operations to the display/sound collecting device 200-1.

(Output Interface)

The output interface 214 is used to notify the user of information. The output interface 214 realizes operations of a display unit 228, which will be described below, for example, by performing output to a device such as a liquid crystal display (LCD) device, an OLED device, or a projector. In addition, the output interface 214 realizes operations of a sound output unit 230, which will be described below, by performing output to a device such as a speaker or a headphone.

(Connection Port)

The connection port 216 is a port for connecting an apparatus directly to the display/sound collecting device 200-1. The connection port 216 can be, for example, a USB port, an IEEE 1394 port, a SCSI port, or the like. In addition, the connection port 216 may be an RS-232C port, an optical audio terminal, a HDMI (registered trademark) port, or the like. By connecting the connection port 216 to an external apparatus, data can be exchanged between the display/sound collecting device 200-1 and the apparatus.

(Communication Interface)

The communication interface 218 intermediates communication between the display/sound collecting device 200-1 and an external device, and realizes operations of a communication unit 220 which will be described below. The communication interface 218 may execute wireless communication complying with an arbitrary wireless communication scheme such as, for example, a short-range wireless communication scheme such as Bluetooth (registered trademark), NFC, a wireless USB, or TransferJet (registered trademark), a cellular communication scheme such as WCDMA (registered trademark), WiMAX (registered trademark), LTE, or LTE-A, or a wireless LAN such as Wi-Fi (registered trademark). In addition, the communication interface 218 may execute wired communication for performing communication using wires.

Note that the information processing device 100-1, the sound processing device 300-1, and the display/sound collecting device 200-1 may not have some of the configurations described in FIG. 2 and FIG. 3 or may have additional configurations. In addition, a one-chip information processing module in which all or some of the configurations described in FIG. 2 are integrated may be provided.

Figure 4:
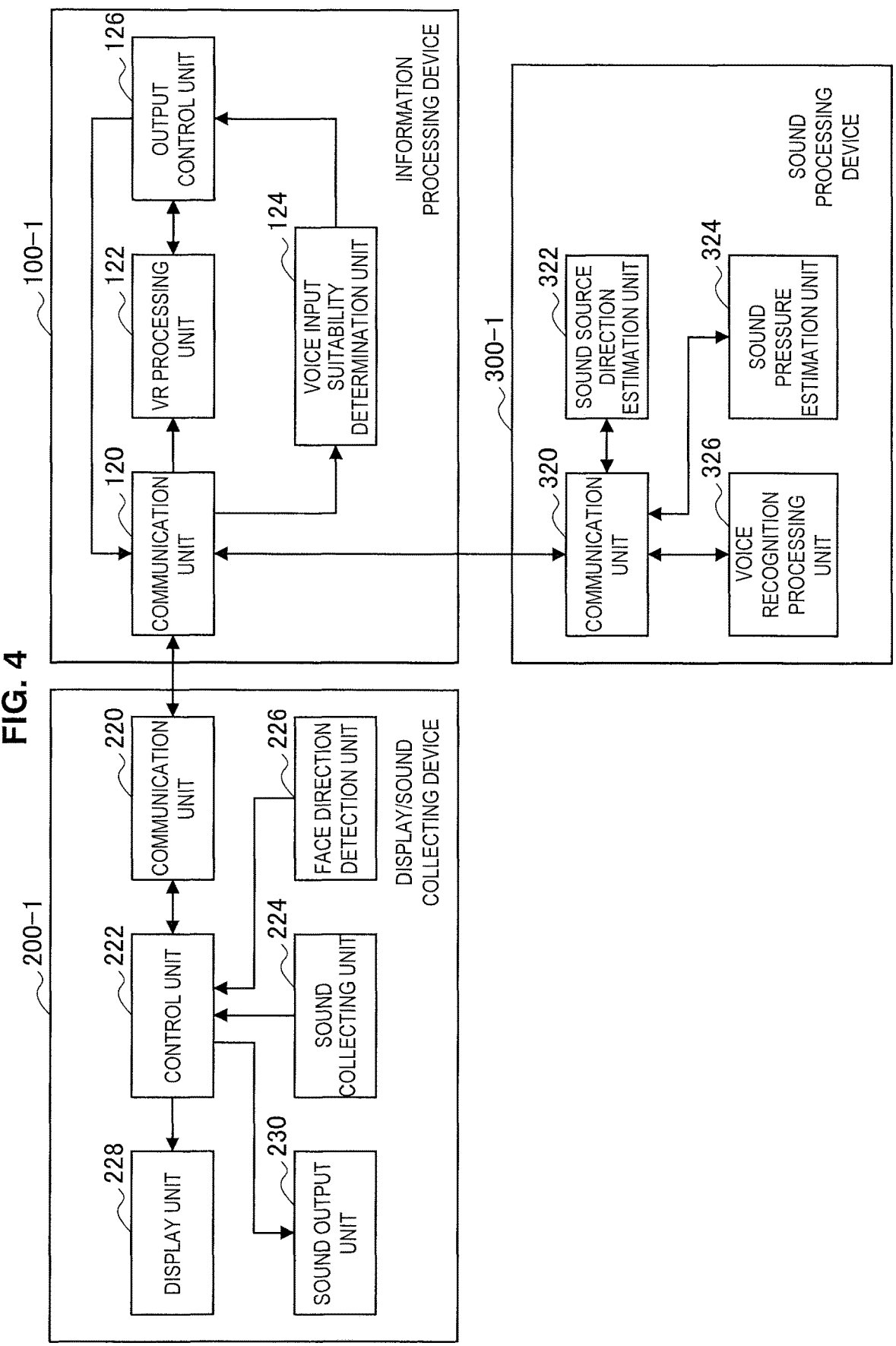
FIG. 4 is a block diagram illustrating a schematic functional configuration example of each of devices of the information processing system according to the embodiment.

Next, a logical configuration of each of the devices of the information processing system according to the present embodiment will be described with reference to FIG. 4. FIG. 4 is a block diagram illustrating a schematic functional configuration example of each of the devices of the information processing system according to the present embodiment.

(Logical Configuration of Information Processing Device)

As illustrated in FIG. 4, the information processing device 100-1 includes the communication unit 120, the VR processing unit 122, the voice input suitability determination unit 124, and the output control unit 126.

(Communication Unit)

The communication unit 120 communicates with the display/sound collecting device 200-1 and the sound processing device 300-1. Specifically, the communication unit 120 receives collected sound information and face direction information from the display/sound collecting device 200-1, and transmits image information and output sound information to the display/sound collecting device 200-1. In addition, the communication unit 120 transmits collected sound information to the sound processing device 300-1, and receives a sound processing result from the sound processing device 300-1. The communication unit 120 communicates with the display/sound collecting device 200-1 using a wireless communication scheme, for example, Bluetooth (registered trademark) or Wi-Fi (registered trademark). In addition, the communication unit 120 communicates with the sound processing device 300-1 using a wired communication scheme. Note that the communication unit 120 may communicate with the display/sound collecting device 200-1 using a wired communication scheme, and communicate with the sound processing device 300-1 using a wireless communication scheme.

(VR Processing Unit)

The VR processing unit 122 performs processing with respect to a virtual space in accordance with a mode of a user. Specifically, the VR processing unit 122 decides a virtual space to be displayed in accordance with an action or an attitude of a user. For example, the VR processing unit 122 decides coordinates of a virtual space to be displayed on the basis of information indicating an orientation of the face of a user (face direction information). In addition, a virtual space to be displayed may be decided on the basis of speech of a user.

Note that the VR processing unit 122 may control processing that uses a sound collection result of a game application or the like. Specifically, in a case in which there is output to induce an action of a user during execution of processing that uses a sound collection result, the VR processing unit 122 serves as part of a control unit and stops at least a part of the processing. More specifically, the VR processing unit 122 stops all processing that uses the sound collection result. For example, the VR processing unit 122 stops processing of a game application from progressing while output to induce an action of a user is performed. Note that the output control unit 126 may cause the display/sound collecting device 200-1 to display an image being displayed immediately before the output is performed.

In addition, the VR processing unit 122 may stop only processing using an orientation of the face of the user in the processing that uses the sound collection result. For example, the VR processing unit 122 stops processing to control a display image in accordance with an orientation of the face of the user in processing of a game application while output to induce an action of the user is performed, and allows other processing to continue. Note that the game application may determine a stop of processing by itself, instead of the VR processing unit 122.

(Voice Input Suitability Determination Unit)

Figure 5A:
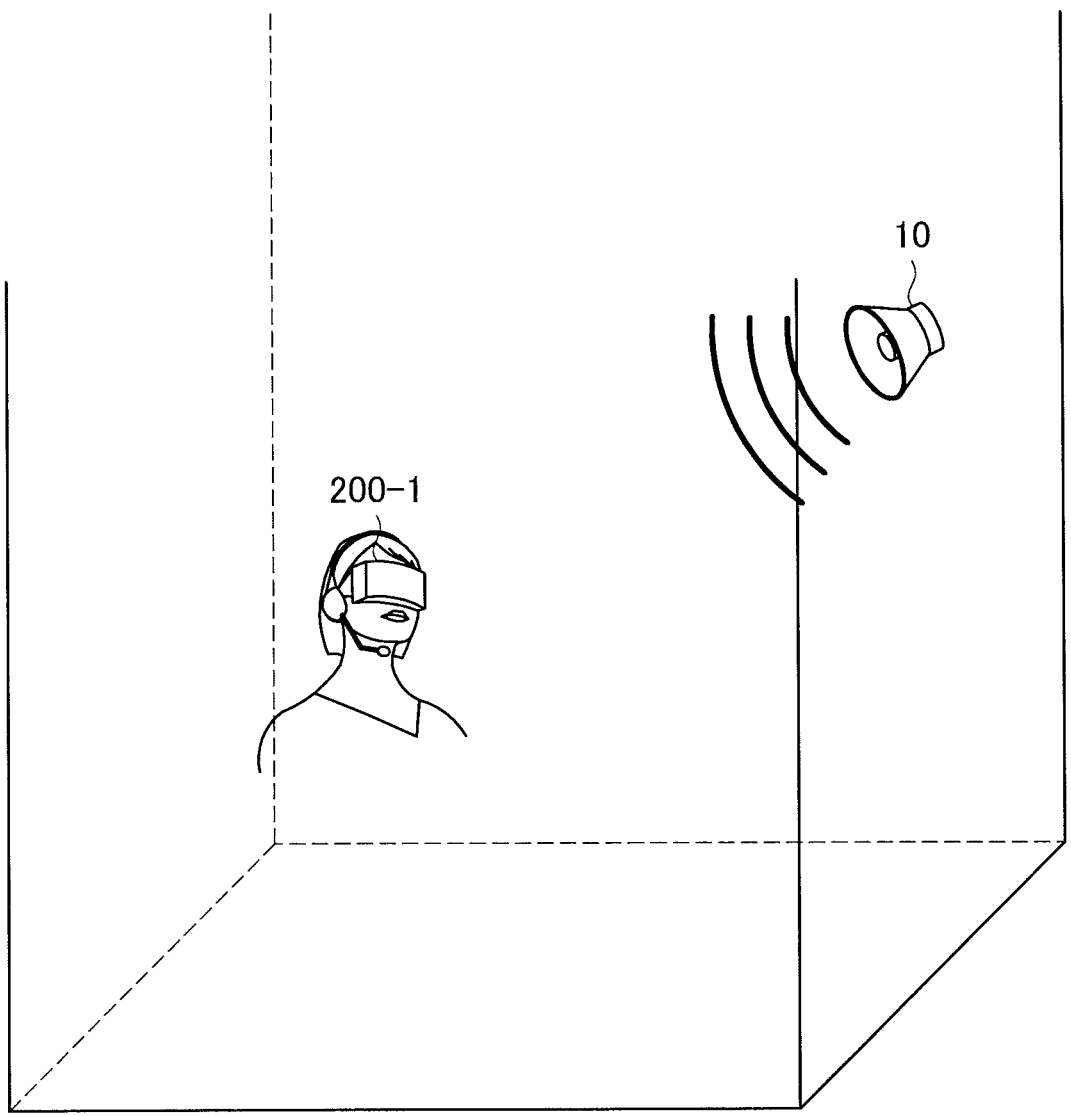
FIG. 5A is a diagram for describing a voice input suitability determination process according to the embodiment.
Figure 5B:
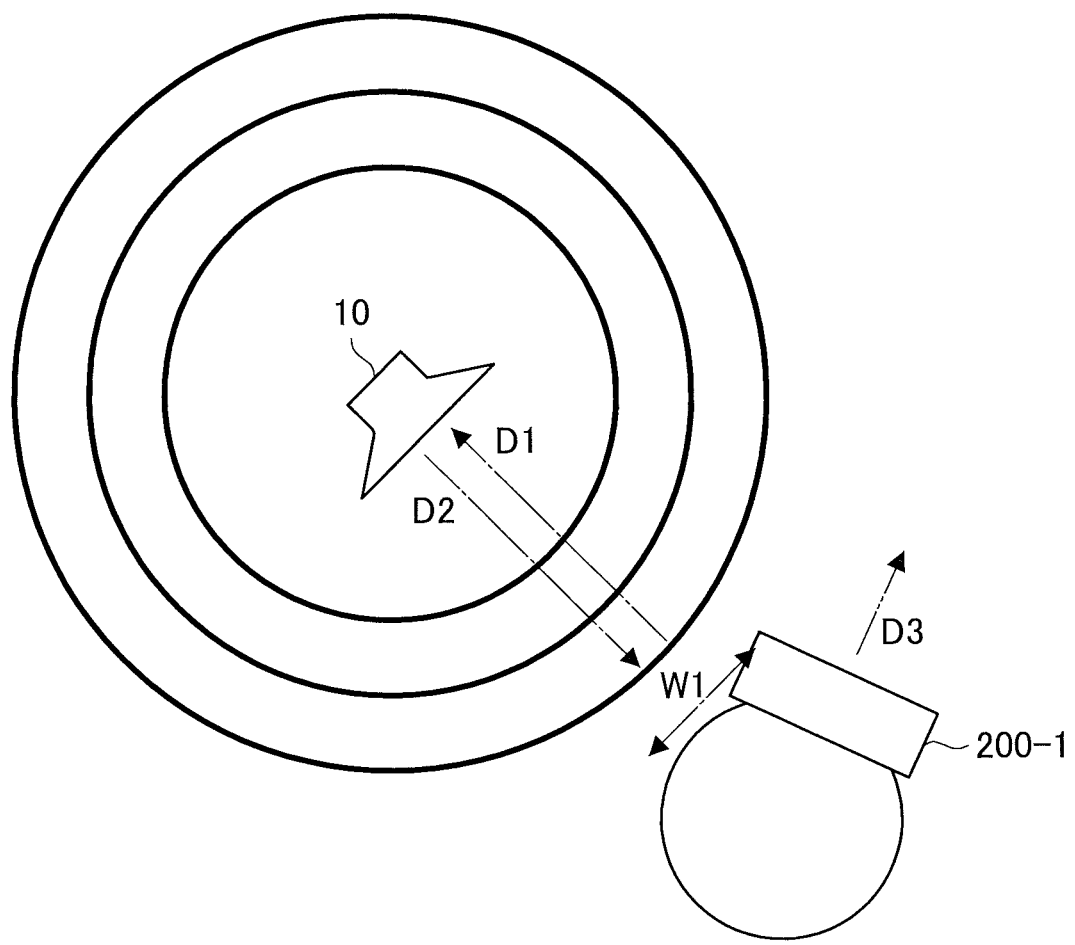
FIG. 5B is a diagram for describing a voice input suitability determination process according to the embodiment.

The voice input suitability determination unit 124 serves as a part of the control unit and determines suitability of voice input on the basis of a positional relation between a noise generation source (which will also be referred to as a noise source) and the display/sound collecting device 200-1 that collects sounds generated by a user. Specifically, the voice input suitability determination unit 124 determines suitability of voice input on the basis of the positional relation and face direction information. Furthermore, a voice input suitability determination process according to the present embodiment will be described in detail with reference to FIG. 5A and FIG. 5B, and FIG. 6. FIG. 5A and FIG. 5B are diagrams for describing the voice input suitability determination process according to the present embodiment, and FIG. 6 is a diagram illustrating examples of patterns for determining suitability of voice input according to the present embodiment.

A case in which a noise source 10 is present in a periphery of the display/sound collecting device 200-1, for example, is conceivable as illustrated in FIG. 5A. In this case, first, collected sound information obtained from the display/sound collecting device 200-1 is provided to the sound processing device 300-1, and the voice input suitability determination unit 124 acquires information indicating a sound source direction obtained through processing of the sound processing device 300-1 (which will also be referred to as sound source direction information below) from the sound processing device 300-1. For example, the voice input suitability determination unit 124 acquires sound source direction information (which will also be referred to as a FaceToNoiseVec below) indicating a sound source direction D1 from the user wearing the display/sound collecting device 200-1 to the noise source 10 as illustrated in FIG. 5B from the sound processing device 300-1 via the communication unit 120.

In addition, the voice input suitability determination unit 124 acquires face direction information from the display/sound collecting device 200-1. For example, the voice input suitability determination unit 124 acquires the face direction information indicating an orientation D3 of the face of the user wearing the display/sound collecting device 200-1 as illustrated in FIG. 5B from the display/sound collecting device 200-1 through communication.

Next, the voice input suitability determination unit 124 determines suitability of voice input on the basis of information regarding a difference between the direction between the noise source and the display/sound collecting device 200-1 and the orientation of the face of the user. Specifically, using sound source direction information regarding the acquired noise source and face direction information, the voice input suitability determination unit 124 calculates the angle formed by the direction indicated by the sound source direction information and the direction indicated by the face direction information. Then, the voice input suitability determination unit 124 determines a direction determination value as the suitability of the voice input in accordance with the calculated angle. For example, the voice input suitability determination unit 124 calculates a NoiseToFaceVec, which is sound source direction information having the opposite direction to that of the acquired FaceToNoiseVec, and then calculates an angle α formed by the direction indicated by the NoiseToFaceVec, i.e., the direction from the noise source to the user, and the direction indicated by the face direction information. Then, the voice input suitability determination unit 124 determines, as a direction determination value, a value in accordance with an output value of a cosine function having the calculated angle α as input as illustrated in FIG. 6. The direction determination value is set to a value at which, for example, the suitability of the voice input is improved as the angle α becomes smaller.

Note that the difference may be a combination of directions or cardinal directions in addition to angles, and in that case, the direction determination value may be set in accordance with the combination. In addition, although the example of using the NoiseToFaceVec has been described above, the FaceToNoiseVec having the opposite direction to the NoiseToFaceVec may be used without change. In addition, although the example in which the directions of the sound source direction information, the face direction information, and the like are directions on a horizontal plane when the user is viewed from above has been described, the directions may be directions on a vertical plane with respect to the horizontal plane, or directions in a three-dimensional space. Furthermore, the direction determination value may be a value of the five levels shown in FIG. 6, or may be a value of finer levels or a value of rougher levels.

Figure 7A:
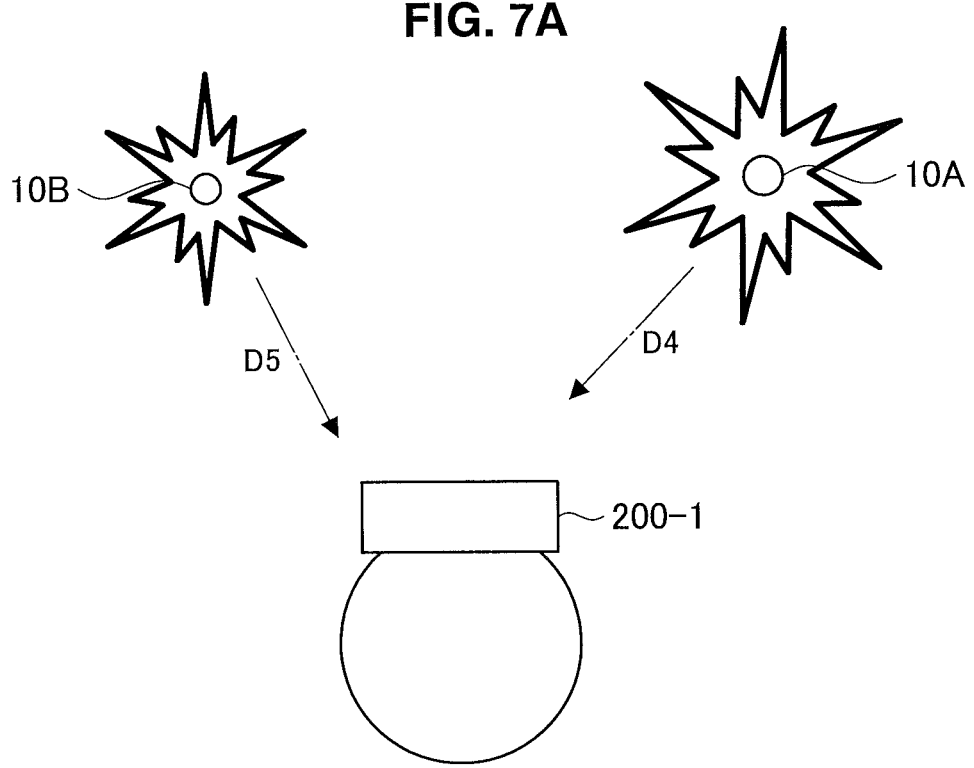
FIG. 7A is a diagram illustrating an example of a situation in which there are a plurality of noise sources.
Figure 7B:
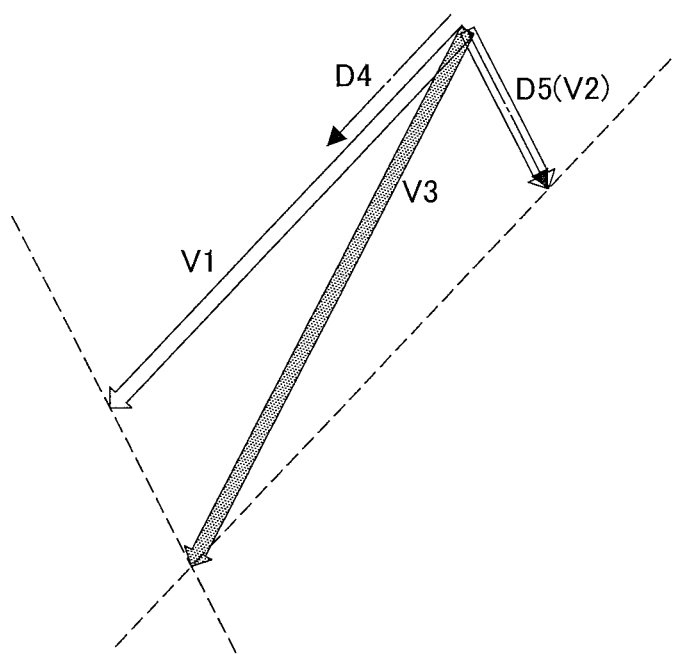
FIG. 7B is a diagram for describing a process of deciding sound source direction information indicating one direction from sound source direction information regarding the plurality of noise sources.

In addition, in a case in which there are a plurality of noise sources, voice input suitability determination may be performed on the basis of a plurality of pieces of sound source direction information. Specifically, the voice input suitability determination unit 124 determines a direction determination value in accordance with an angle formed by a single direction obtained on the basis of a plurality of pieces of sound source direction information and a direction indicated by face direction information. Furthermore, a voice input suitability determination process in the case in which there are a plurality of noise sources will be described with reference to FIG. 7A and FIG. 7B. FIG. 7A is a diagram illustrating an example of a situation in which there are a plurality of noise sources, and FIG. 7B is a diagram for describing a process of deciding sound source direction information indicating one direction from sound source direction information regarding the plurality of noise sources.

A case in which there are two noise sources, for example, as illustrated in FIG. 7A is considered. In this case, first, the voice input suitability determination unit 124 acquires a plurality of pieces of sound source direction information from the sound processing device 300-1. For example, the voice input suitability determination unit 124 acquires, from the sound processing device 300-1, sound source direction information indicating each of directions D4 and D5 from the noise sources 10 A and 10B to a user who is wearing the display/sound collecting device 200-1 as illustrated in FIG. 7A.

Next, the voice input suitability determination unit 124 calculates a single piece of sound source direction information regarding the basis of sound pressure of the noise sources using the acquired plurality of pieces of sound source direction information. For example, the voice input suitability determination unit 124 acquires sound pressure information along with the sound source direction information from the sound processing device 300-1 as will be described below. Next, the voice input suitability determination unit 124 calculates a sound pressure ratio between the noise sources on the basis of the acquired sound pressure information, for example, a ratio of sound pressure of the noise source 10 A to sound pressure of the noise source 10 B. Then, the voice input suitability determination unit 124 calculates a vector V1 of the direction D4 using the direction D5 as a unit vector V2 on the basis of the calculated sound pressure ratio, adds the vector V1 to the vector V2, and thereby acquires a vector V3.

Then, the voice input suitability determination unit 124 determines the above-described direction determination value using the calculated single piece of sound source direction information. For example, the direction determination value is determined on the basis of an angle formed by the sound source direction information indicating the direction of the calculated vector V3 and the face direction information. Note that, although the example in which the vector calculation is performed has been described, the direction determination value may be determined using another process.

The function of determining suitability of voice input on the basis of the directions of the noise sources has been described above. Furthermore, the voice input suitability determination unit 124 determines suitability of voice input on the basis of sound pressure of the noise sources. Specifically, the voice input suitability determination unit 124 determines the suitability of the voice input in accordance with whether a sound pressure level of collected noise is higher than or equal to a determination threshold value. Furthermore, a voice input suitability determination process on the basis of sound pressure of noise will be described in detail with reference to FIG. 8. FIG. 8 is a diagram illustrating an example of patterns for determining voice input suitability on the basis of sound pressure of noise.

First, the voice input suitability determination unit 124 acquires sound pressure information regarding noise sources. For example, the voice input suitability determination unit 124 acquires sound pressure information along with sound source direction information from the sound processing device 300-1 via the communication unit 120.

Next, the voice input suitability determination unit 124 determines a sound pressure determination value on the basis of the acquired sound pressure information. For example, the voice input suitability determination unit 124 determines a sound pressure determination value corresponding to sound pressure levels indicated by the acquired sound pressure information. In the example of FIG. 8, the sound pressure determination value is 1 in a case in which the sound pressure level is greater than or equal to 0 and less than 60 dB, i.e., in a case in which people sense relatively quiet sound, and the sound pressure determination value is 0 in a case in which the sound pressure level is greater than or equal to 60 and less than 120 dB, i.e., in a case in which people sense relatively loud sound. Note that the sound pressure determination value is not limited to the example of FIG. 8, and may be values of finer levels.

(Output Control Unit)

The output control unit 126 serves as a part of the control unit and controls output to induce an action of a user to change a sound collecting characteristic on the basis of a voice input suitability determination result. Specifically, the output control unit 126 controls visual presentation for inducing a change of an orientation of the face of the user. More specifically, the output control unit 126 decides a display object indicating an orientation of the face of the user that he or she should change and a degree of the change (which will also be referred to as a face direction inducing object below) in accordance with a direction determination value obtained from determination of the voice input suitability determination unit 124. For example, in a case in which the direction determination value is low, the output control unit 126 decides a face direction inducing object that induces a change of the orientation of the face of the user so that the direction determination value increases. Note that the action of the user is a different operation from a processing operation of the display/sound collecting device 200-1. For example, an operation related to a process to change a sound collecting characteristic of an input sound such as an input operation with respect to the display/sound collecting device 200-1 to control a process of changing input volume of the display/sound collecting device 200-1 is not included in the action of the user.

In addition, the output control unit 126 controls output related to evaluation of a mode of the user with reference to a mode of the user resulting from the induced action. Specifically, the output control unit 126 decides a display object indicating evaluation of a mode of the user (which will also be referred to as an evaluation object below) on the basis of a degree of divergence between the mode of the user resulting from the induced action performed by the user and a current mode of the user. For example, the output control unit 126 decides a display object indicating that suitability of voice input is being improved as the divergence further decreases.

Furthermore, the output control unit 126 may control output related to collected noise. Specifically, the output control unit 126 controls output to notify of a reachable area of collected noise. More specifically, the output control unit 126 decides a display object (which will also be referred to as a noise reachable area object below) for notifying a user of an area of noise with a sound pressure level higher than or equal to a predetermined threshold value (which will also be referred to as a noise reachable area below) out of noise that is emitted from a noise source and reaches the user. The noise reachable area is, for example, W1 as illustrated in FIG. 5B. In addition, the output control unit 126 controls output to notify of sound pressure of the collected noise. More specifically, the output control unit 126 decides a mode of the noise reachable area object in accordance with sound pressure in the noise reachable area. For example, the mode of the noise reachable area object in accordance with sound pressure is a thickness of the noise reachable area object. Note that the output control unit 126 may control hue, saturation, luminance, granularity of a pattern, or the like of the noise reachable area object in accordance with sound pressure.

In addition, the output control unit 126 may control presentation of suitability of voice input. Specifically, the output control unit 126 controls notification of suitability for collection of a sound (voice) generated by the user on the basis of an orientation of the face of the user or a sound pressure level of noise. More specifically, the output control unit 126 decides a display object indicating suitability of voice input (which will also be referred to as a voice input suitability object below) on the basis of a direction determination value or a sound pressure determination value. For example, the output control unit 126 decides a voice input suitability object indicating that voice input is not appropriate or voice input is difficult in a case in which a sound pressure determination value is 0. In addition, in a case in which the direction determination value is equal to or smaller than a threshold value even though the sound pressure determination value is 1, the voice input suitability object indicating that voice input is difficult may be displayed.

The function of controlling details of the output to induce an action of the user has been described above. Furthermore, the output control unit 126 controls whether to perform the output to induce an action of a user on the basis of information regarding a sound collection result. Specifically, the output control unit 126 controls whether to perform the output to induce an action of a user on the basis of start information of processing that uses a sound collection result. As the processing that uses a sound collection result, for example, processing of a computer game, a voice search, a voice command, voice-to-text input, a voice agent, voice chat, a phone call, translation by speech, or the like is exemplified. When receiving notification of a start of the processing, the output control unit 126 starts the processing related to the output to induce an action of a user.

In addition, the output control unit 126 may control whether to perform the output to induce an action of a user on the basis of sound pressure information of collected noise. For example, in a case in which a sound pressure level of noise is less than a lower limit threshold value, i.e., in a case in which noise little affects voice input, the output control unit 126 does not perform the output to induce an action of the user. Note that the output control unit 126 may control whether to perform the output to induce an action of a user on the basis of a direction determination value. In a case in which the direction determination value is higher than or equal to a threshold value, i.e., in a case in which influence of noise is within a tolerable range, for example, the output control unit 126 may not perform the output to induce an action of the user.

Note that the output control unit 126 may control whether to perform the output for induction on the basis of a user operation. For example, the output control unit 126 starts processing related to the output to induce an action of the user on the basis of a voice input setting operation input by the user.

(Logical Configuration of Display/Sound Collecting Device)

The display/sound collecting device 200-1 includes a communication unit 220, the control unit 222, the sound collecting unit 224, the face direction detection unit 226, the display unit 228, and the sound output unit 230 as illustrated in FIG. 4.

(Communication Unit)

The communication unit 220 communicates with the information processing device 100-1. Specifically, the communication unit 220 transmits collected sound information and face direction information to the information processing device 100-1 and receives image information and output sound information from the information processing device 100-1.

(Control Unit)

The control unit 222 controls the display/sound collecting device 200-1 overall. Specifically, the control unit 222 controls functions of the sound collecting unit 224, the face direction detection unit 226, the display unit 228, and the sound output unit 230 by setting operation parameters thereof and the like. In addition, the control unit 222 causes the display unit 228 to display images on the basis of image information acquired via the communication unit 220, and causes the sound output unit 230 to output sounds on the basis of acquired output sound information. Note that the control unit 222 may generate collected sound information and face direction information regarding the basis of information obtained from the sound collecting unit 224 and the face direction detection unit 226, instead of the sound collecting unit 224 and the face direction detection unit 226.

(Sound Collecting Unit)

The sound collecting unit 224 collects sounds in the peripheries of the display/sound collecting device 200-1. Specifically, the sound collecting unit 224 collects noise generated in the peripheries of the display/sound collecting device 200-1 and voice of a user wearing the display/sound collecting device 200-1. In addition, the sound collecting unit 224 generates collected sound information of collected sounds.

(Face Direction Detection Unit)

The face direction detection unit 226 detects an orientation of the face of the user wearing the display/sound collecting device 200-1. Specifically, the face direction detection unit 226 detects an attitude of the display/sound collecting device 200-1, and thereby detects an orientation of the face of the user wearing the display/sound collecting device 200-1. I addition, the face direction detection unit 226 generates face direction information indicating the detected orientation of the face of the user.

(Display Unit)

The display unit 228 displays images on the basis of image information. Specifically, the display unit 228 displays an image on the basis of image information provided by the control unit 222. Note that the display unit 228 displays an image on which the above-described each display object is superimposed, or superimposes the above-described each display object on an external image by displaying an image.

(Sound Output Unit)

The sound output unit 230 outputs sounds on the basis of output sound information. Specifically, the sound output unit 230 outputs a sound on the basis of output sound information provided by the control unit 222.

(Logical Configuration of Sound Processing Device)

The sound processing device 300-1 includes the communication unit 320, the sound source direction estimation unit 322, the sound pressure estimation unit 324, and the voice recognition processing unit 326 as illustrated in FIG. 4.

(Communication Unit)

The communication unit 320 communicates with the information processing device 100-1. Specifically, the communication unit 320 receives collected sound information from the information processing device 100-1, and transmits sound source direction information and sound pressure information to the information processing device 100-1.

(Sound Source Direction Estimation Unit)

The sound source direction estimation unit 322 generates sound source direction information regarding the basis of the collected sound information. Specifically, the sound source direction estimation unit 322 estimates a direction from a sound collection position to a sound source on the basis of the collected sound information and generates sound source direction information indicating an estimated direction. Note that, although it is assumed that an existing sound source estimation technology based on collected sound information obtained from a microphone array is used in the estimation of a sound source direction, a technology is not limited thereto, and any of various technologies can be used as long as a sound source direction can be estimated using the technology.

(Sound Pressure Estimation Unit)

The sound pressure estimation unit 324 generates sound pressure information regarding the basis of the collected sound information. Specifically, the sound pressure estimation unit 324 estimates a sound pressure level at a sound collection position on the basis of the collected sound information and generates sound pressure information indicating the estimated sound pressure level. Note that an existing sound pressure estimation technology is used in the estimation of a sound pressure level.

(Voice Recognition Processing Unit)

The voice recognition processing unit 326 performs a voice recognition process on the basis of the collected sound information. Specifically, the voice recognition processing unit 326 recognizes voice on the basis of the collected sound information, and then generates text information of the recognized voice or identifies the user who is a speech source of the recognized voice. Note that an existing voice recognition technology is used for the voice recognition process. In addition, the generated text information or the user identification information may be provided to the information processing device 100-1 via the communication unit 320.

1-3. Processing of Device

Next, processing of the information processing device 100-1 that performs main processing among the constituent elements of the information processing system will be described.

(Overall Processing)

Figure 9:
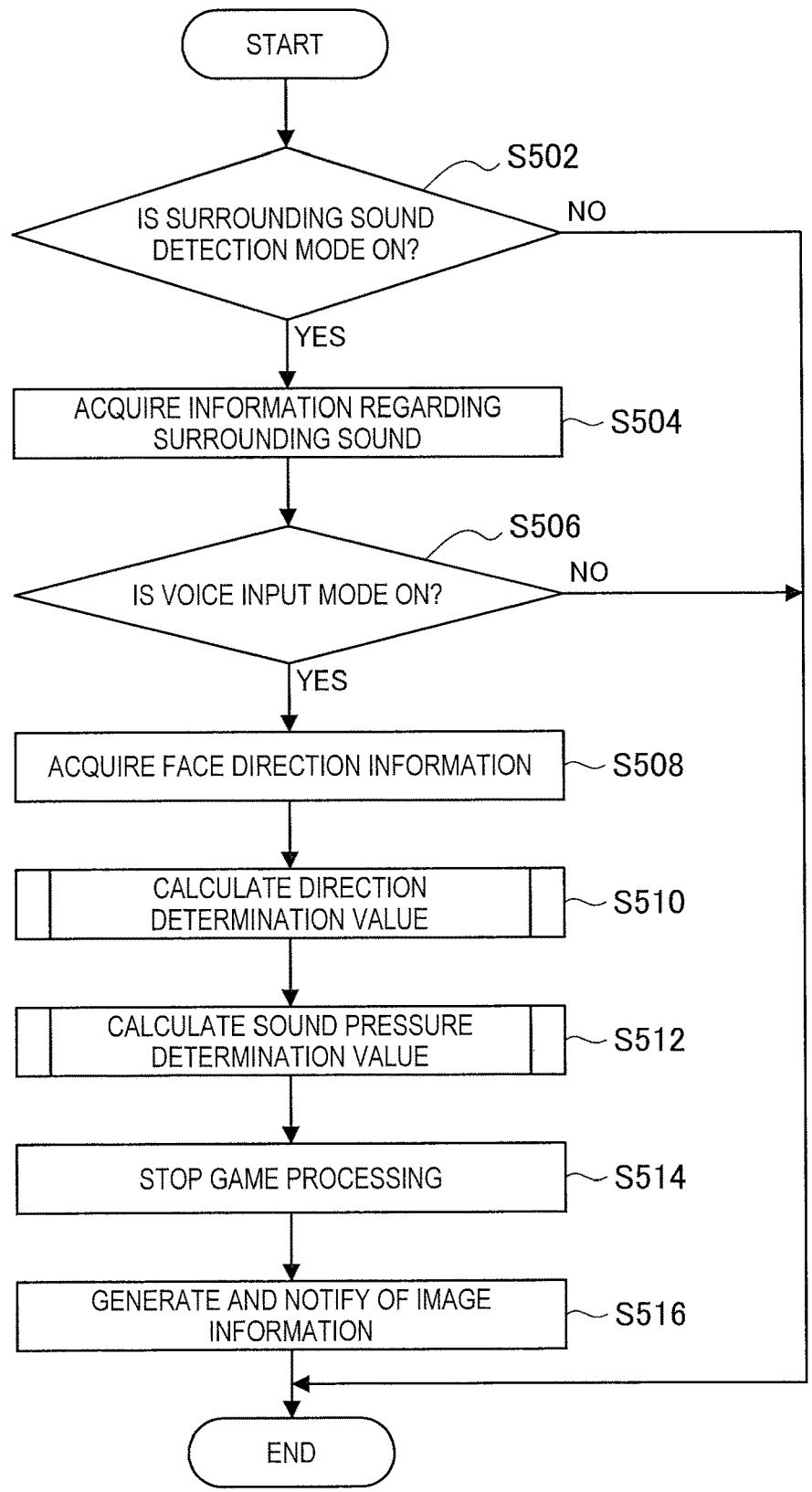
FIG. 9 is a flowchart showing the concept of overall processing of the information processing device according to the embodiment.

First, overall processing of the information processing device 100-1 according to the present embodiment will be described with reference to FIG. 9. FIG. 9 is a flowchart showing the concept of overall processing of the information processing device 100-1 according to the present embodiment.

The information processing device 100-1 determines whether a surrounding sound detection mode is on (Step S502). Specifically, the output control unit 126 determines whether a mode for detecting a sound in the periphery of the display/sound collecting device 200-1 is on. Note that the surrounding sound detection mode may be on at all times when the information processing device 100-1 is activating or on the basis of a user operation or a start of specific processing. In addition, the surrounding sound detection mode may be set to be on on the basis of speech of a keyword. For example, a detector for detecting only a keyword may be included in the display/sound collecting device 200-1, and the display/sound collecting device 200-1 may notify the information processing device 100-1 of the fact that the keyword has been detected. In this case, since power consumption of the detector is smaller than that of the sound collecting unit in most cases, power consumption can be reduced.

When the surrounding sound detection mode is determined to be on, the information processing device 100-1 acquires information regarding the surrounding sound (Step S504). Specifically, in the case in which the surrounding sound detection mode is on, the communication unit 120 acquires collected sound information from the display/sound collecting device 200-1 through communication.

Next, the information processing device 100-1 determines whether a voice input mode is on (Step S506). Specifically, the output control unit 126 determines whether the voice input mode using the display/sound collecting device 200-1 is on. Note that the voice input mode may be on at all times when the information processing device 100-1 is activating or on the basis of a user operation or a start of specific processing, like the surrounding sound detection mode.

When the voice input mode is determined to be on, the information processing device 100-1 acquires face direction information (Step S508). Specifically, in the case in which the voice input mode is on, the voice input suitability determination unit 124 acquires the face direction information from the display/sound collecting device 200-1 via the communication unit 120.

Next, the information processing device 100-1 calculates a direction determination value (Step S510). Specifically, the voice input suitability determination unit 124 calculates the direction determination value on the basis of the face direction information and sound source direction information. Details thereof will be described below.

Next, the information processing device 100-1 calculates a sound pressure determination value (Step S512). Specifically, the voice input suitability determination unit 124 calculates the sound pressure determination value on the basis of sound pressure information. Details thereof will be described below.

Next, the information processing device 100-1 stops game processing (Step S514). Specifically, the VR processing unit 122 stops at least a part of processing of a game application in accordance with whether to perform the output to induce an action of the user using the output control unit 126.

Next, the information processing device 100-1 generates image information and notifies the display/sound collecting device 200-1 of the image information (Step S516). Specifically, the output control unit 126 decides an image for inducing an action of the user in accordance with the direction determination value and the sound pressure determination value and notifies the display/sound collecting device 200-1 of the image information regarding the decided image via the communication unit 120.

(Direction Determination Value Calculation Process)

Figure 10:
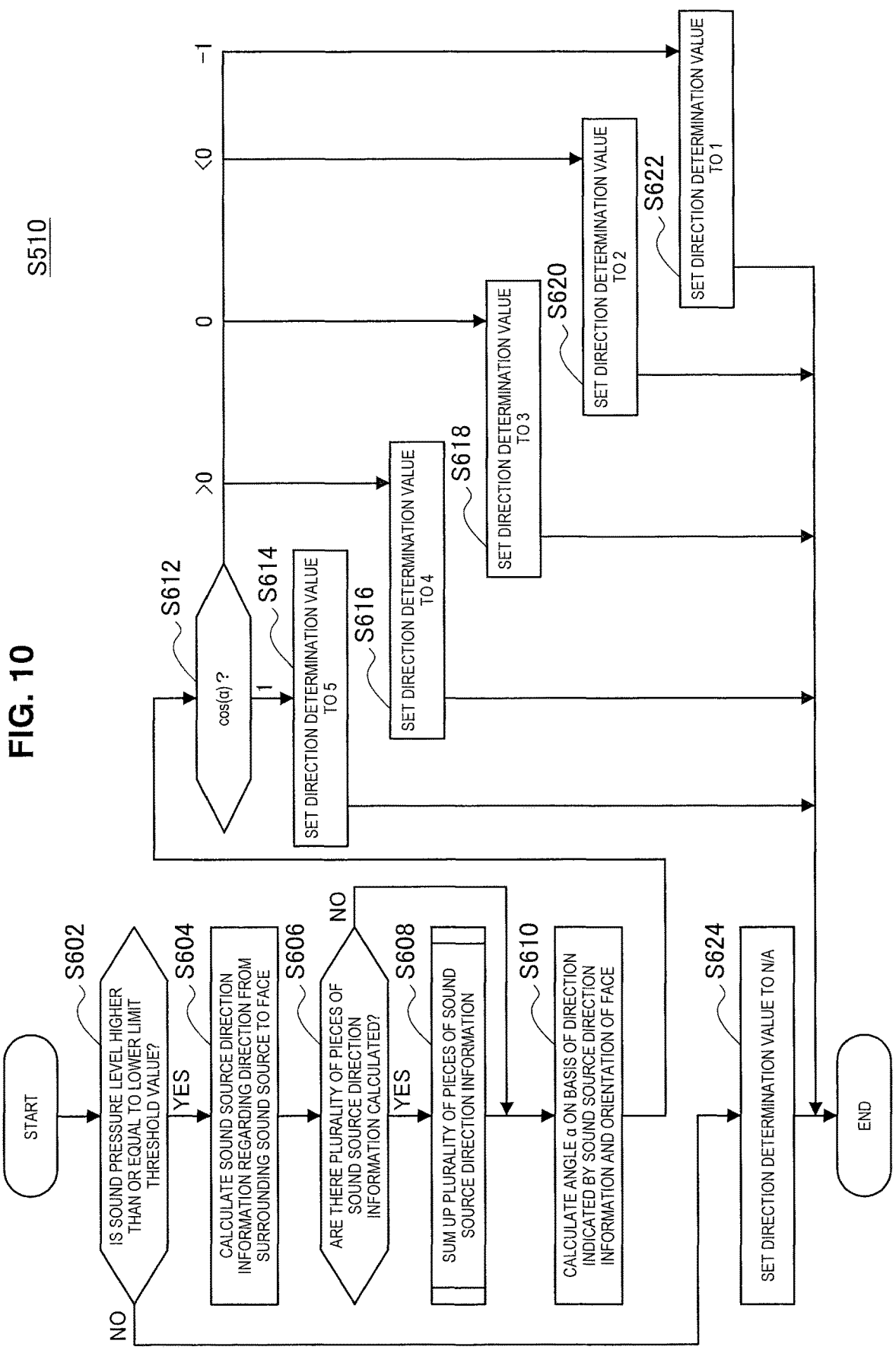
FIG. 10 is a flowchart showing the concept of a direction determination value calculation process by the information processing device according to the embodiment.

Next, a direction determination value calculation process will be described with reference to FIG. 10. FIG. 10 is a flowchart showing the concept of the direction determination value calculation process by the information processing device 100-1 according to the present embodiment.

The information processing device 100-1 determines whether a sound pressure level is higher than or equal to a determination threshold value (Step S602). Specifically, the voice input suitability determination unit 124 determines whether the sound pressure level indicated by sound pressure information acquired from the sound processing device 300-1 is higher than or equal to the determination threshold value.

If the sound pressure level is higher than or equal to the threshold value, the information processing device 100-1 calculates sound source direction information regarding the direction from a surrounding sound source to the face of the user (Step S604). Specifically, the voice input suitability determination unit 124 calculates a NoiseToFaceVec using a FaceToNoiseVec that is acquired from the sound processing device 300-1.

Next, the information processing device 100-1 determines whether there are a plurality of pieces of sound source direction information (Step S606). Specifically, the voice input suitability determination unit 124 determines whether there are a plurality of calculated NoiseToFaceVecs.

If it is determined that there are a plurality of pieces of sound source direction information, the information processing device 100-1 sums up the plurality of pieces of sound source direction information (Step S608). Specifically, the voice input suitability determination unit 124 sums up the plurality of NoiseToFaceVecs if it is determined that there are a plurality of calculated NoiseToFaceVecs. Details thereof will be described below.

Next, the information processing device 100-1 calculates an angle α using a direction indicated by the sound source direction information and an orientation of the face (Step S610). Specifically, the voice input suitability determination unit 124 calculates the angle α formed by the direction indicated by the NoiseToFaceVec and the orientation of the face indicated by the face direction information.

Next, the information processing device 100-1 determines an output result of the cosine function having the angle α as input (Step S612). Specifically, the voice input suitability determination unit 124 determines a direction determination value in accordance with the value of cos (α).

In a case in which the output result of the cosine function is 1, the information processing device 100-1 sets the direction determination value to 5 (Step S614). In a case in which the output result of the cosine function is not 1 but greater than 0, the information processing device 100-1 sets the direction determination value to 4 (Step S616). In a case in which the output result of the cosine function is 0, the information processing device 100-1 sets the direction determination value to 3 (Step S618). In a case in which the output result of the cosine function is smaller than 0 and is not −1, the information processing device 100-1 sets the direction determination value to 2 (Step S620). In a case in which the output result of the cosine function is −1, the information processing device 100-1 sets the direction determination value to 1 (Step S622).

Note that, in a case in which the sound pressure level is less than a lower limit threshold value in Step S602, the information processing device 100-1 sets the direction determination value to be not applicable (N/A) (Step S624).

(Add Process of Plurality of Pieces of Sound Source Direction Information)

Figure 11:
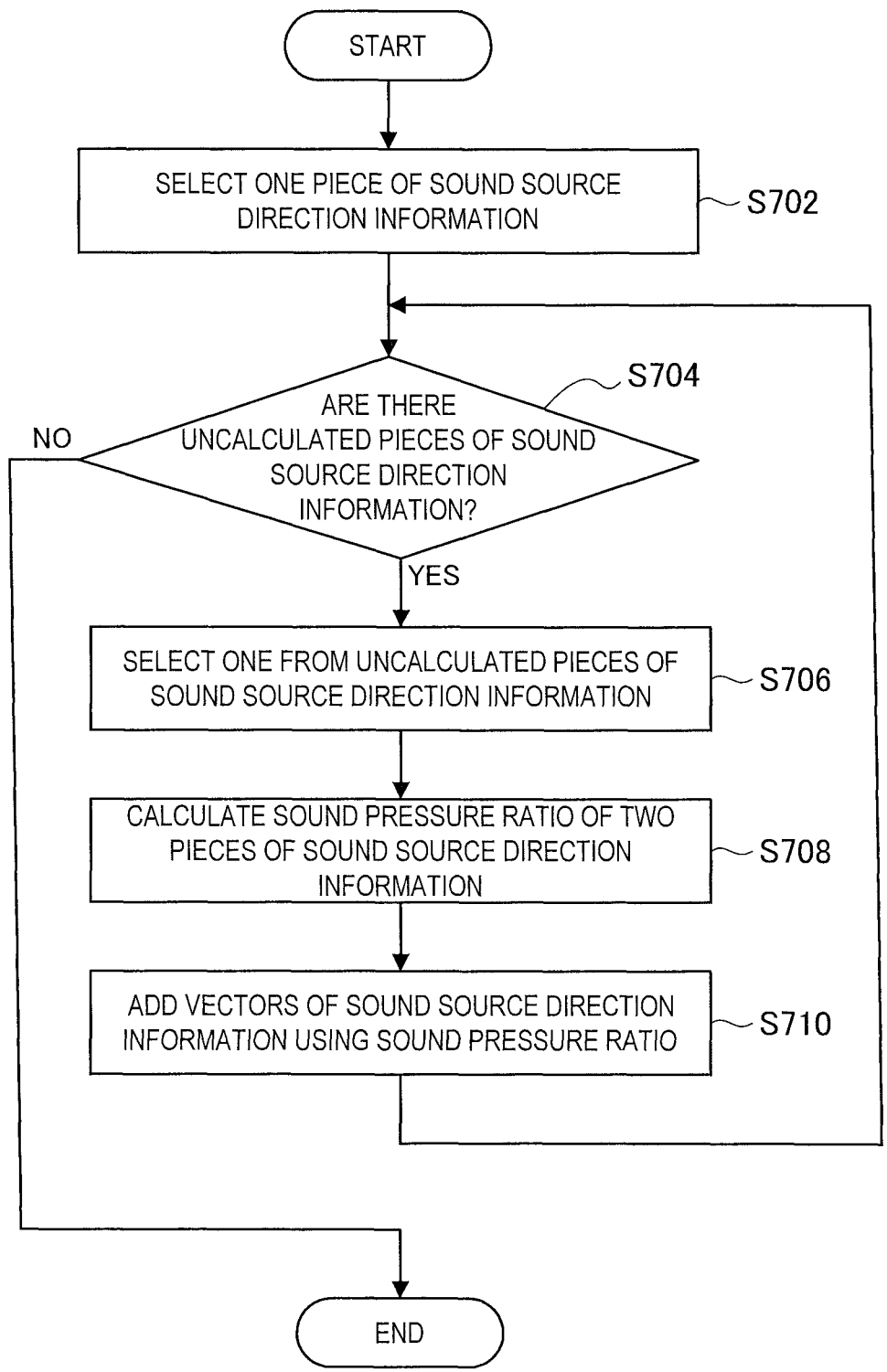
FIG. 11 is a flowchart showing the concept of a summing process of a plurality of pieces of sound source direction information by the information processing device according to the embodiment.

Next, the summing process of the plurality of pieces of sound source direction information in the direction determination value calculation process will be described with reference to FIG. 11. FIG. 11 is a flowchart showing the concept of the summing process of the plurality of pieces of sound source direction information by the information processing device 100-1 according to the present embodiment.

The information processing device 100-1 selects one piece of the sound source direction information (Step S702). Specifically, the voice input suitability determination unit 124 selects one among the plurality of pieces of sound source direction information, i.e., among NoiseToFaceVecs.

Next, the information processing device 100-1 determines whether there are uncalculated pieces of the sound source direction information (Step S704). Specifically, the voice input suitability determination unit 124 determines whether there is a NoiseToFaceVec that has not undergone a vector addition process. Note that, in a case in which there is no NoiseToFaceVec for which vector addition has not processed, the process ends.

If it is determined that there are uncalculated pieces of the sound source direction information, the information processing device 100-1 selects one from the uncalculated pieces of the sound source direction information (Step S706). Specifically, if it is determined that there is a NoiseToFaceVec for which the vector addition process has not been performed, the voice input suitability determination unit 124 selects one NoiseToFaceVec that is different from the already-selected pieces of the sound source direction information.

Next, the information processing device 100-1 calculates a sound pressure ratio of the two selected pieces of the sound source direction information (Step S708). Specifically, the voice input suitability determination unit 124 calculates a ratio of sound pressure levels of the two selected NoiseToFaceVecs.

Next, the information processing device 100-1 adds the vectors of the sound source direction information using the sound pressure ratio (Step S710). Specifically, the voice input suitability determination unit 124 changes a size of the vector related to one NoiseToFaceVec on the basis of the calculated ratios of the sound pressure levels, and then adds the vectors of the two NoiseToFaceVec together.

(Calculation Process of Sound Pressure Determination Value)

Figure 12:
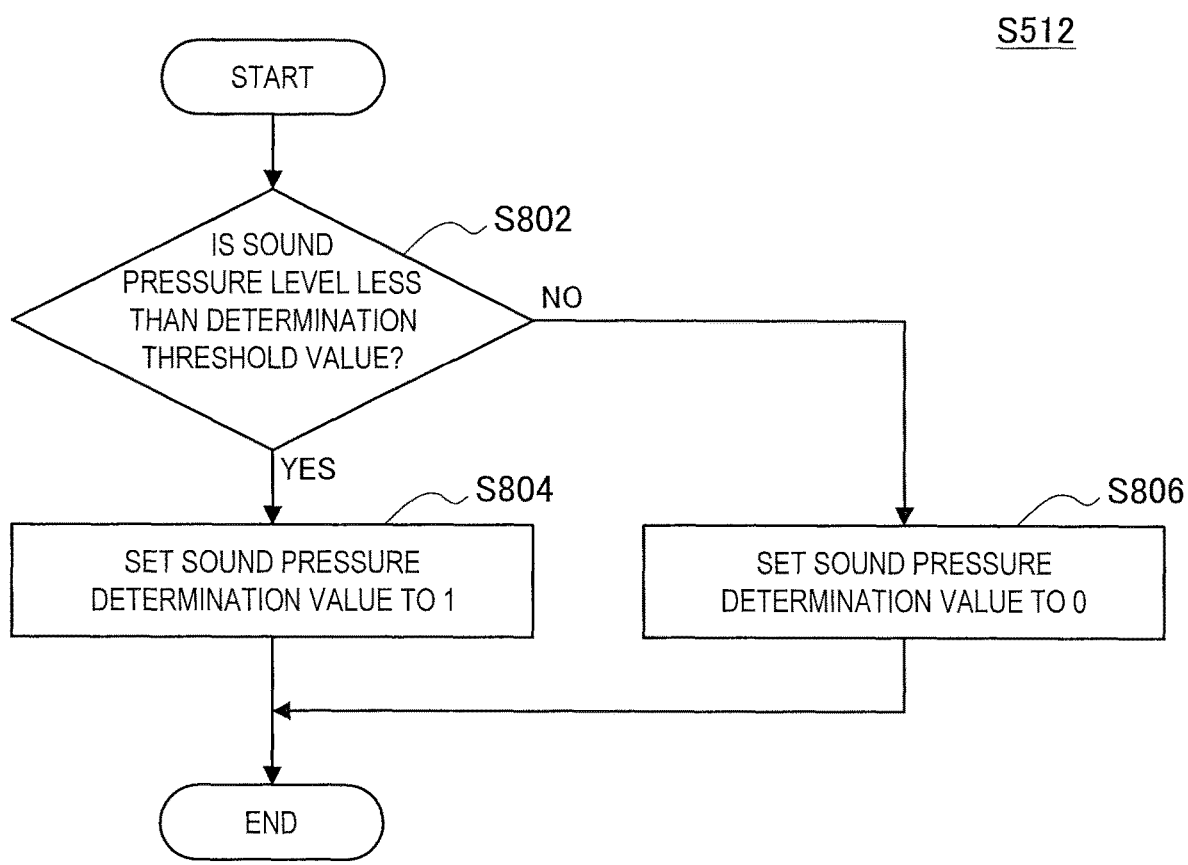
FIG. 12 is a flowchart showing the concept of a calculation process of a sound pressure determination value by the information processing device according to the embodiment.

Next, a calculation process of a sound pressure determination value will be described with reference to FIG. 12. FIG. 12 is a flowchart showing the concept of a calculation process of a sound pressure determination value by the information processing device 100-1 according to the present embodiment.

The information processing device 100-1 determines whether a sound pressure level is less than a determination threshold value (Step S802). Specifically, the voice input suitability determination unit 124 determines whether the sound pressure level indicated by sound pressure information acquired from the sound processing device 300-1 is less than the determination threshold value.

If the sound pressure level is determined to be less than the determination threshold value, the information processing device 100-1 sets the sound pressure determination value to 1 (Step S804). On the other hand, if the sound pressure level is determined to be higher than or equal to the determination threshold value, the information processing device 100-1 sets the sound pressure determination value to 0 (Step S806).

1-4. Processing Examples

Next, processing examples of the information processing system will be described below.

(Case in which Voice Input is Possible)

First, processing examples of the information processing system in a case in which voice input is possible will be described with reference to FIG. 13 to FIG. 17. FIG. 13 to FIG. 17 are diagrams for describing processing examples of the information processing system in a case in which voice input is possible.

Figure 13:
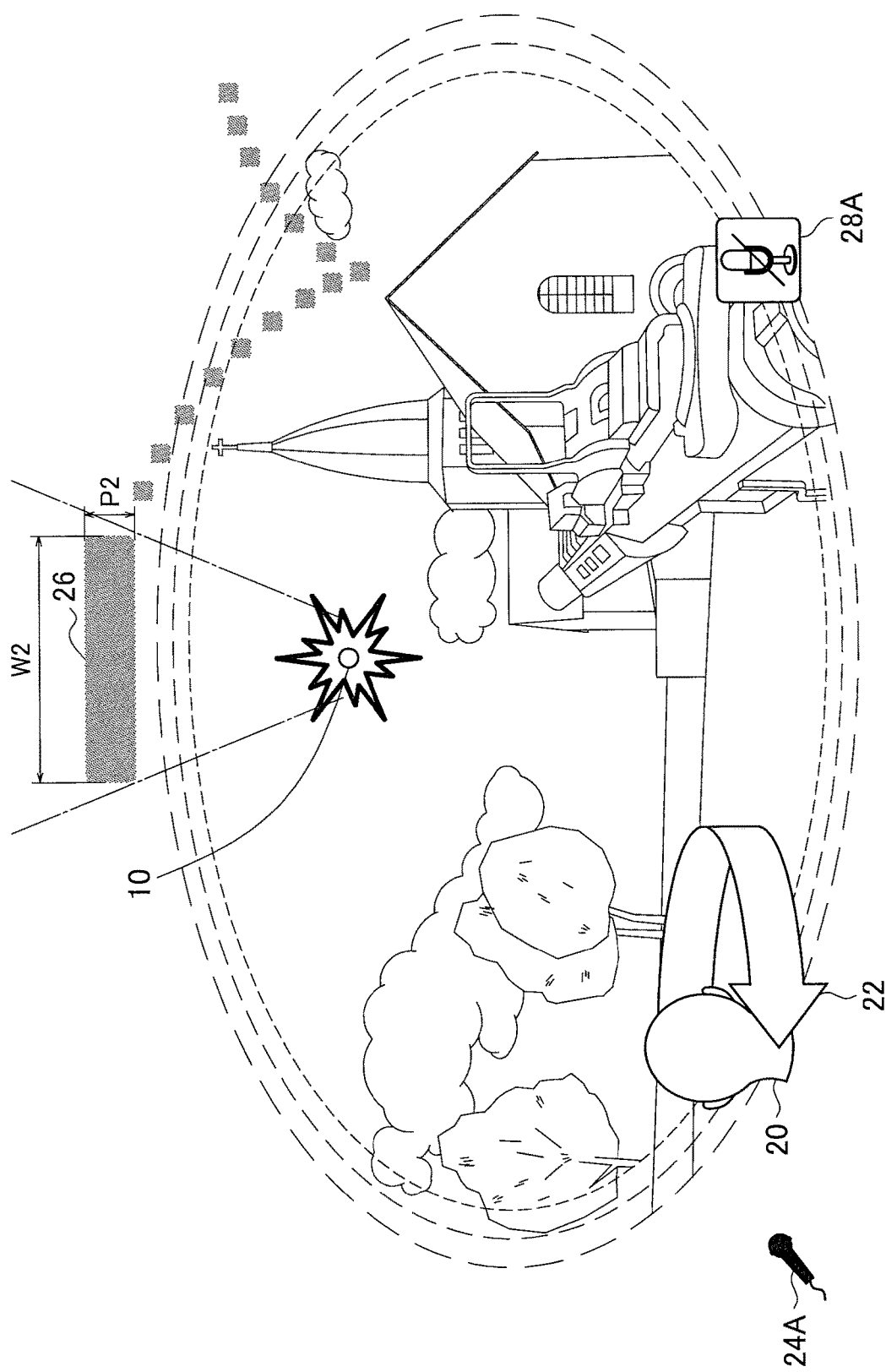
FIG. 13 is an explanatory diagram of a processing example of the information processing system in a case in which voice input is possible.

A state in which a user directly faces the noise source 10, i.e., the state of (1) of FIG. 6, will be first described with reference to FIG. 13. First, the information processing device 100-1 generates a game screen on the basis of VR processing. Next, in a case in which a sound pressure level of noise is higher than or equal to the lower limit threshold value, the information processing device 100-1 superimposes output to induce an action of a user, i.e., the above-described display object, on the game screen. For example, the output control unit 126 superimposes a display object 20 resembling a person's head, a face direction inducing object 22 that is an arrow indicating a rotation direction of the head, an evaluation object 24 whose display changes in accordance with evaluation of a mode of the user, and a noise reachable area object 26 indicating an area of noise that can reach the user, i.e., the display/sound collecting device 200-1, on the game screen. A size of an area in which a sound pressure level is higher than or equal to a predetermined threshold value is denoted by a width W2 of the noise reachable area object 26, and the sound pressure level is denoted by a thickness P2. Note that the noise source 10 of FIG. 13 is not actually displayed. In addition, the output control unit 126 superimposes a voice input suitability object 28 whose display changes in accordance with the suitability of voice input on the game screen.

Since rotation of the head of the user is induced so that his or her face faces directly Rearward in the state of (1) of FIG. 6, the arrow of the face direction inducing object 22 is formed to be longer than in other states. In addition, the evaluation object 24A is expressed as a microphone, and is most affected by noise among the states of FIG. 6, and thus the microphone is expressed to be smaller than in other states. Accordingly, the user is presented with the fact that evaluation of the orientation of the face of the user is low. Accordingly, in the example of FIG. 13, since the sound pressure level of noise is less than the determination threshold value, i.e., the sound pressure determination value is 1, and the user directly faces the noise source, i.e., the direction determination value is 1, a voice input suitability object 28A indicating that voice input is not appropriate is superimposed thereon. Furthermore, the output control unit 126 may superimpose a display object indicating influence of noise on suitability of voice input thereon in accordance with the sound pressure level of the noise. For example, a dashed line, which is generated from the noise reachable area object 26, extends toward the voice input suitability object 28A, and shifts its direction out of the screen on the way, is superimposed on the game screen as illustrated in FIG. 13.

Figure 14:
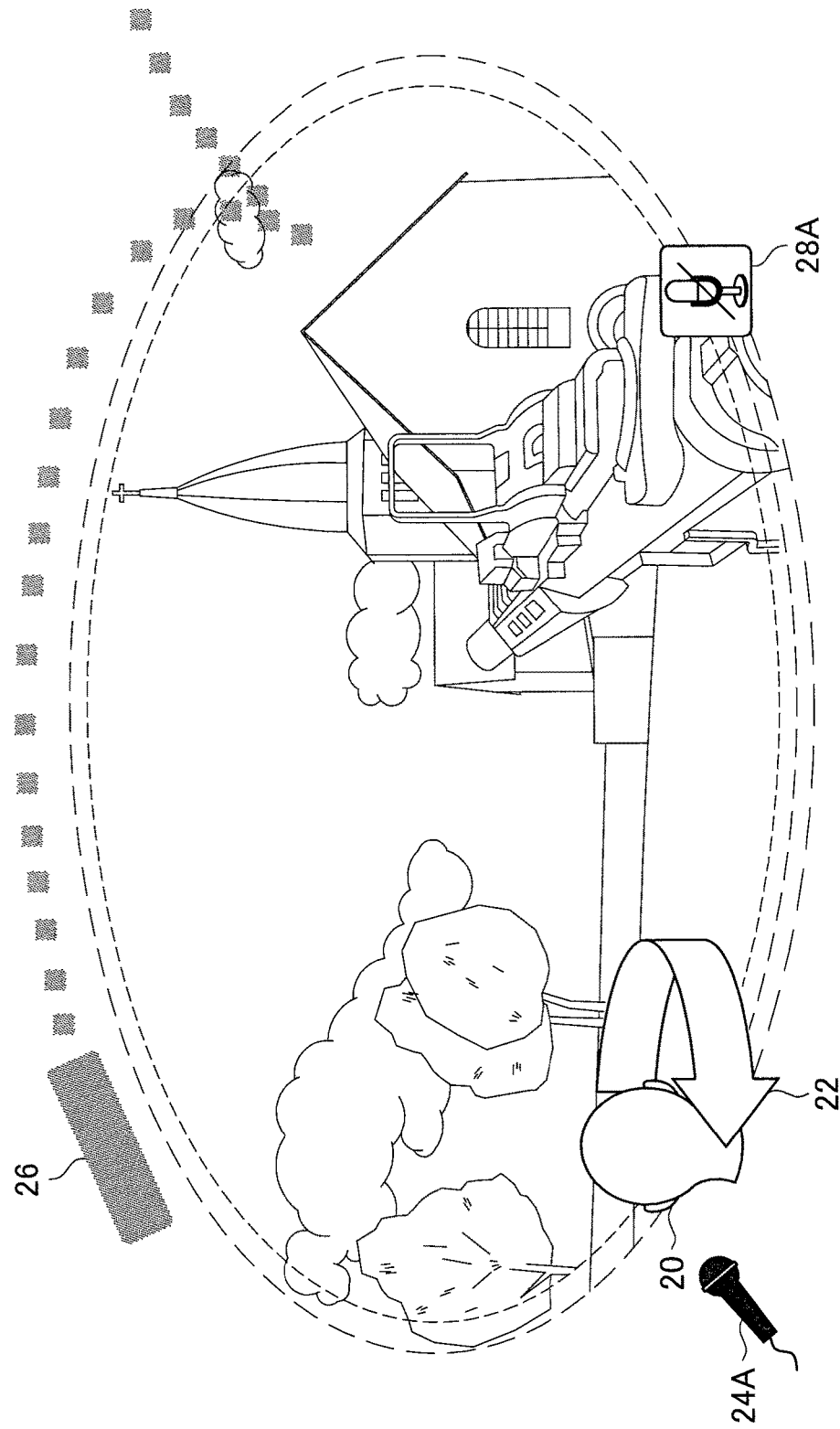
FIG. 14 is an explanatory diagram of a processing example of the information processing system in a case in which voice input is possible.

Next, a state in which the user rotates his or her head slightly clockwise, i.e., the state of (2) of FIG. 6, will be described with reference to FIG. 14. Since the user rotates his or her head slightly clockwise from the state of (1) in the state of (2), the arrow of the face direction inducing object 22 is formed to be shorter than in the state of (1). In addition, since the evaluation object 24A is less affected by noise than in the state of (1), the microphone is expressed to be larger than in the state of (1). Furthermore, the evaluation object 24A may be brought closer to the display object 20. Accordingly, the user is presented with the fact that evaluation of the orientation of the face of the user has been improved. Then, the user is informed of the fact that the action of the user has been induced as intended, and can receive a sense of satisfaction with his or her action. In addition, the position of the noise source with respect to the orientation of the face changes because the user has rotated his or her head, and in this case, the noise reachable area object 26 is moved in the opposite direction to the rotation direction of the head. In addition, in the example of FIG. 14, since the sound pressure determination value is 1 and the direction determination value is 2, the voice input suitability object 28A indicating that voice input is not appropriate is superimposed.

Figure 15:
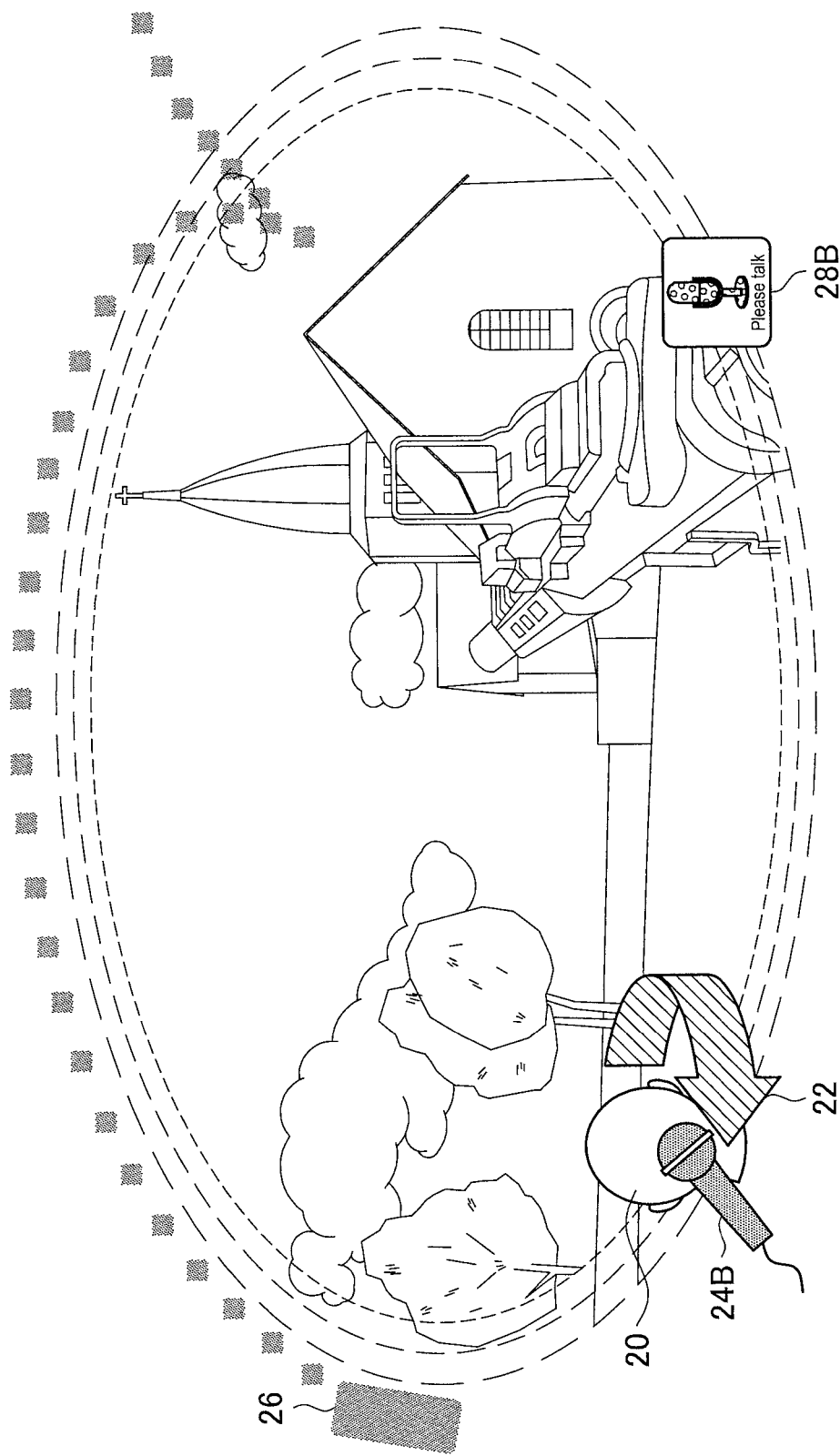
FIG. 15 is an explanatory diagram of a processing example of the information processing system in a case in which voice input is possible.

Next, a state in which the user rotates his or her head further clockwise, i.e., the state of (3) of FIG. 6, will be described with reference to FIG. 15. Since the user rotates his or her head further clockwise from the state of (2) in the state of (3), the arrow of the face direction inducing object 22 is formed to be shorter than in the state of (2). In addition, since influence of noise is less than in the state of (2), the microphone is expressed to be larger than in the state of (2), and an evaluation object 24B to which an emphasis effect is further added is superimposed. The emphasis effect may be, for example, a changed hue, saturation, or luminance, a changed pattern, flickering, or the like. In addition, since the user further rotates his or her head from the state of (2), the noise reachable area object 26 is further moved in the opposite direction to the rotation direction of the head. Furthermore, since the sound pressure determination value is 1 and the direction determination value is 3 in the example of FIG. 15, a voice input suitability object 28B indicating that voice input is appropriate is superimposed.

Figure 16:
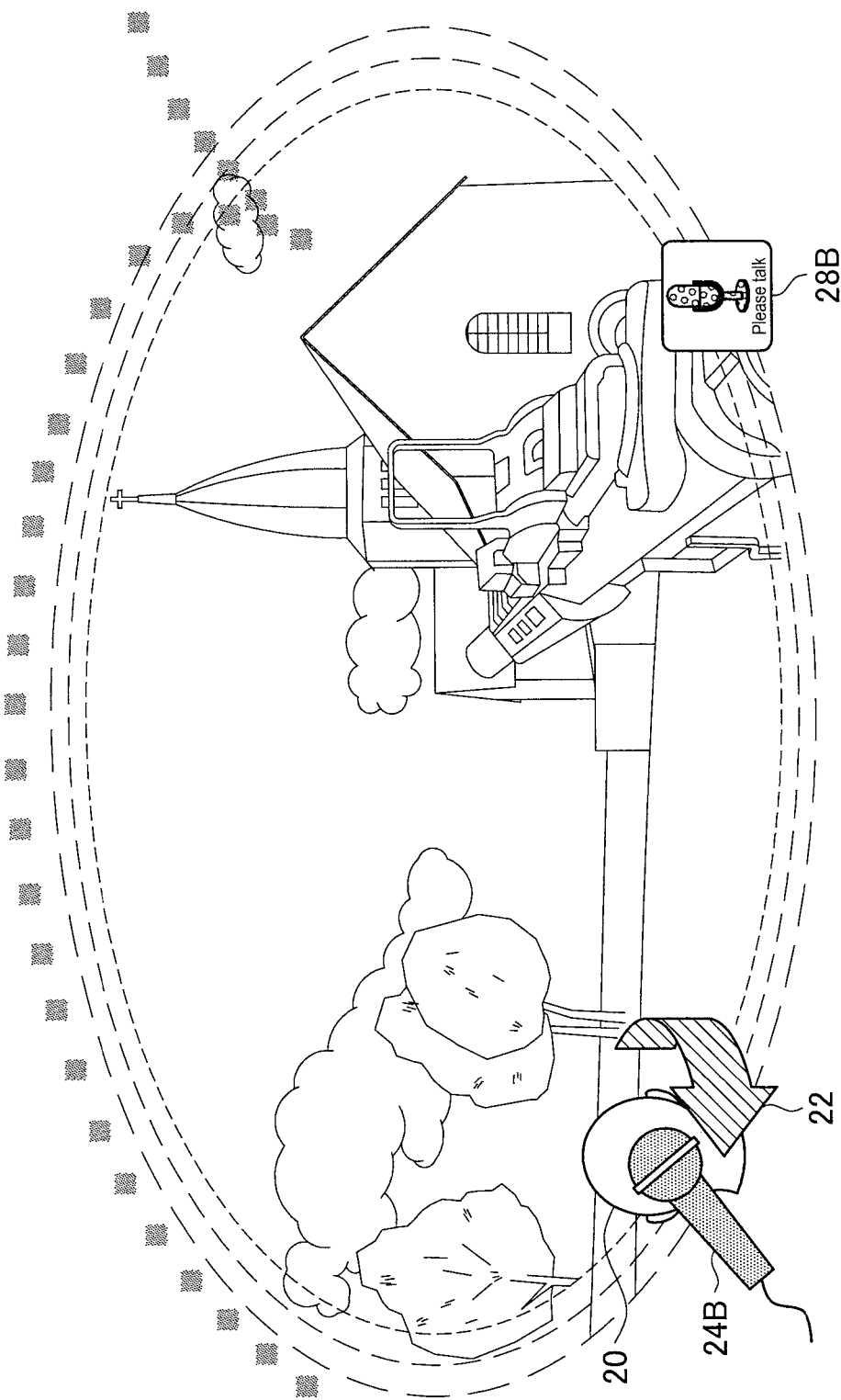
FIG. 16 is an explanatory diagram of a processing example of the information processing system in a case in which voice input is possible.

Next, a state in which the user rotates his or her head further clockwise, i.e., the state of (4) of FIG. 6, will be described with reference to FIG. 16. Since the user rotates his or her head further clockwise from the state of (3) in the state of (4), the arrow of the face direction inducing object 22 is formed to be shorter than in the state of (3). In addition, since influence of noise is smaller than in the state of (3), the microphone is expressed to be larger than in the state of (3), and the evaluation object 24B to which the emphasis effect is added is superimposed. Furthermore, since the user further rotates his or her head from the state of (3), the noise reachable area object 26 is further moved in the opposite direction to the rotation direction of the head. As a result, the noise reachable area object 26 may not be superimposed on the game screen as illustrated in FIG. 16. Note that, even in such a case, the display object indicating influence of noise on the suitability of voice input (the dashed-lined display object) may be superimposed in accordance with a sound pressure level of the noise. In addition, since the sound pressure determination value is 1 and the direction determination value is 4 in the example of FIG. 16, the voice input suitability object 28B indicating that voice input is appropriate is superimposed.

Figure 17:
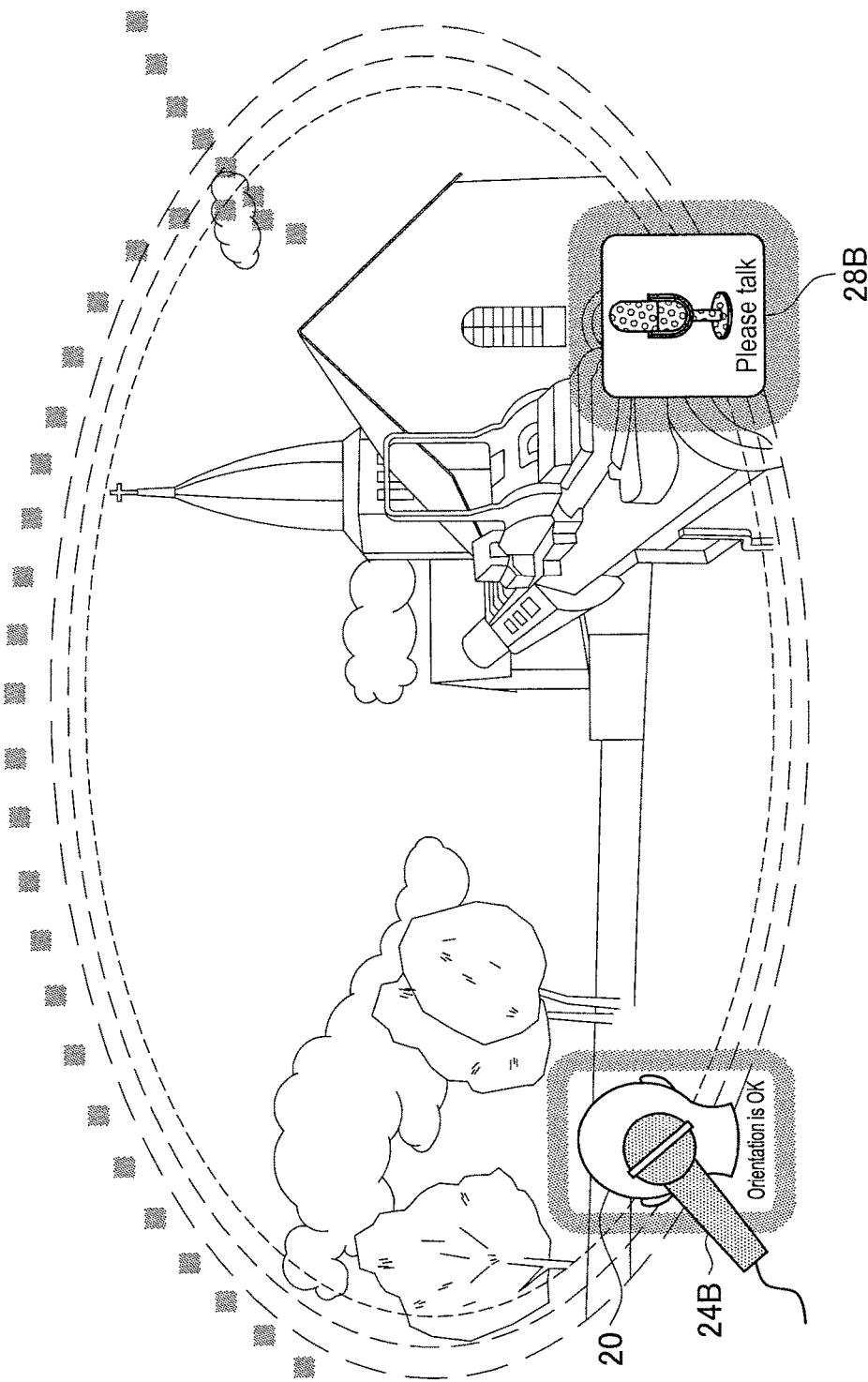
FIG. 17 is an explanatory diagram of a processing example of the information processing system in a case in which voice input is possible.

Finally, a state in which the face of the user faces the opposite direction to the direction that the noise source faces, i.e., the state of (5) of FIG. 6, will be described with reference to FIG. 17. Since the user is not required to further rotate his or her head in the state of (5), the face direction inducing object 22 of the arrow is not superimposed. In addition, since the orientation of the face of the user has changed as induced, a character string object "orientation is OK" is superimposed as a display object indicating that the orientation of the face is appropriate for voice input. Furthermore, a mode of the peripheries of the display object 20 may be changed. For example, the hue, luminance, or the like of the peripheries of the display object 20 may be changed. In addition, the evaluation object 24B to which the emphasis effect is added is superimposed. Note that, since the influence of noise is smaller than in the state of (4), the microphone may be expressed to be larger than in the state of (4). Furthermore, since the head of the user is rotated further than in the state of (4), the noise reachable area object 26 is further moved to the opposite direction to the rotation direction of the head. As a result, the noise reachable area object is not superimposed on the game screen as illustrated in FIG. 17. In addition, since the sound pressure determination value is 1 and the direction determination value is 5 in the example of FIG. 17, the voice input suitability object 28B indicating that voice input is appropriate is superimposed. Furthermore, since both the sound pressure determination value and the direction determination value have the highest values, an emphasis effect is added to the voice input suitability object 28B. The emphasis effect may be, for example, a change in the size, hue, luminance, or pattern of the display object, or a change in the mode in peripheries of the display object.

(Case in which Voice Input is Difficult)

Next, processing examples of the information processing system in a case in which voice input is difficult will be described with reference to FIG. 18 to FIG. 22. FIG. 18 to FIG. 22 are diagrams for describing processing examples of the information processing system in the case in which voice input is difficult.

Figure 18:
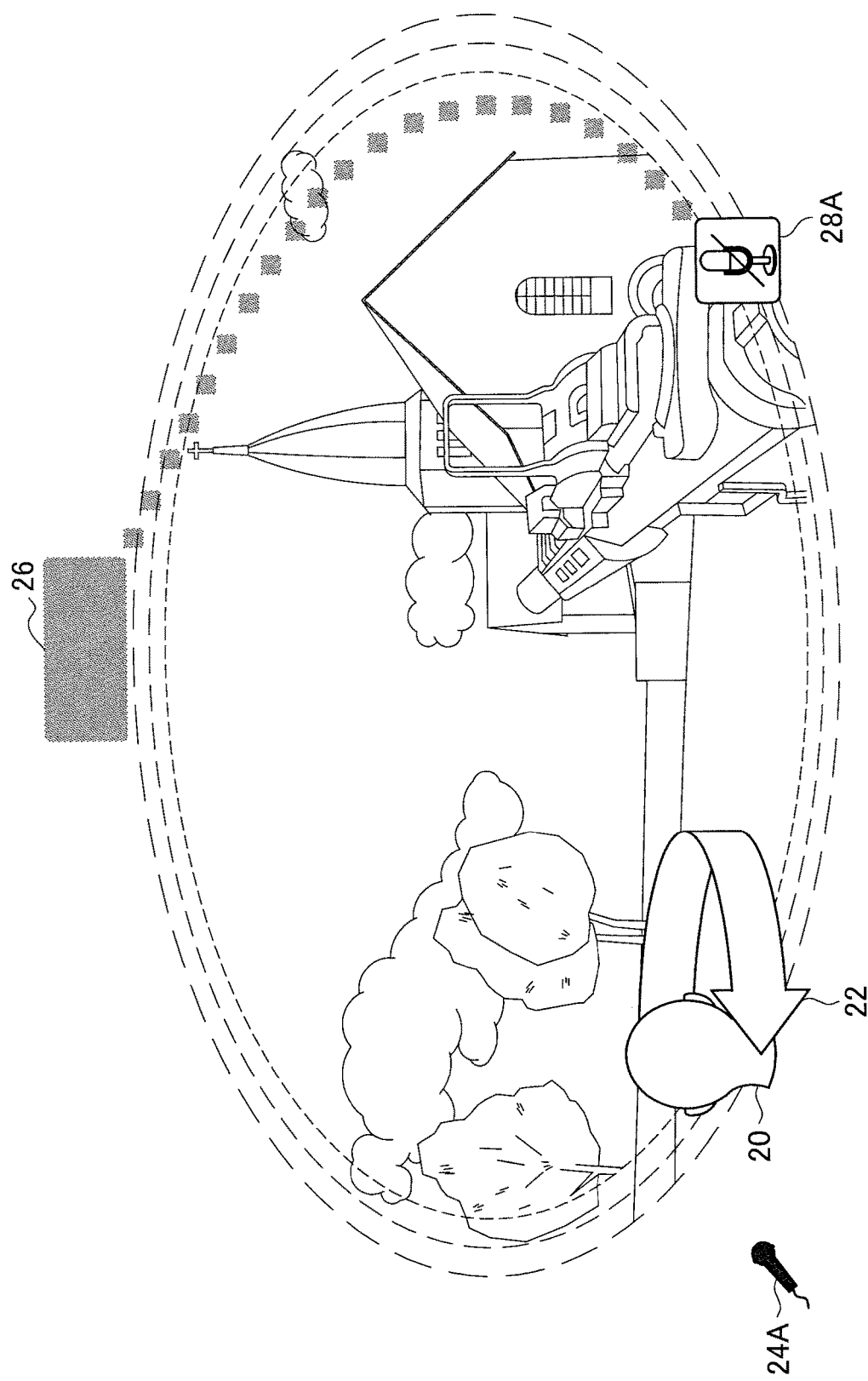
FIG. 18 is an explanatory diagram of a processing example of the information processing system in a case in which voice input is difficult.

First, a state in which the user directly faces the noise source 10, i.e., the state of (1) of FIG. 6, will be described first with reference to FIG. 18. The display object 20, the face direction inducing object 22, the evaluation object 24A, and the voice input suitability object 28A that are superimposed on the game screen in the state of (1) of FIG. 6 are substantially the same display objects described with reference to FIG. 13. Since a sound pressure level of noise is higher in the example of FIG. 18 than in the example of FIG. 13, a thickness of the noise reachable area 26 increases. In addition, since the sound pressure level of noise is higher than or equal to the determination threshold value, the dashed-lined display object indicating influence of noise on suitability of voice input is generated from the noise reachable area 26 and superimposed so as to extend toward and reach the voice input suitability object 28A.

Figure 19:
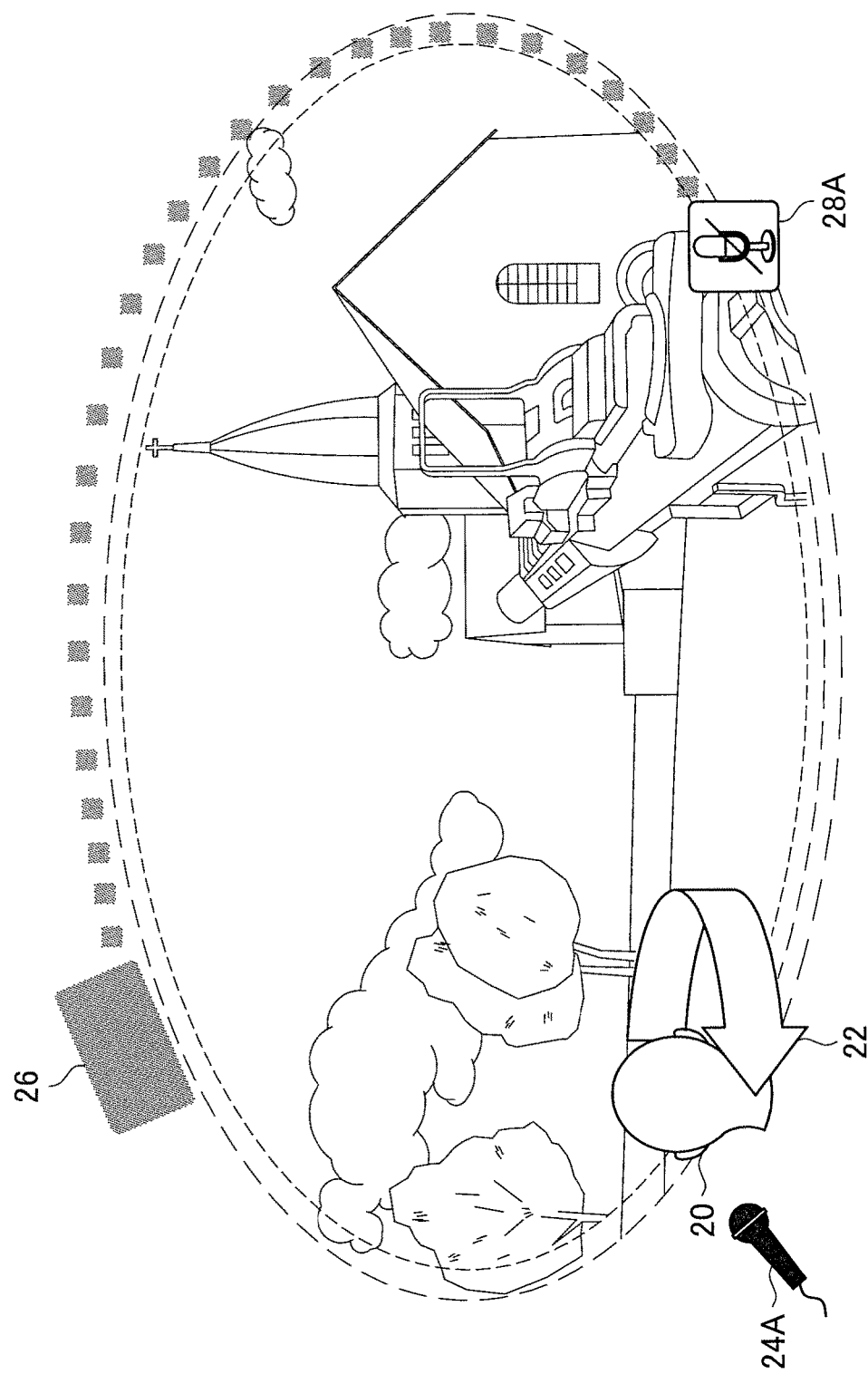
FIG. 19 is an explanatory diagram of a processing example of the information processing system in a case in which voice input is difficult.

Next, a state in which the user rotates his or her head slightly clockwise, i.e., the state of (2) of FIG. 6, will be described with reference to FIG. 19. In the state of (2), the arrow of the face direction inducing object 22 is formed to be shorter than in the state of (1). In addition, the microphone of the evaluation object 24A is expressed to be larger than in the state of (1). Furthermore, the noise reachable area object 26 is moved in the opposite direction to the rotation direction of the head. In addition, since the sound pressure determination value is 0 in the example of FIG. 19, the voice input suitability object 28A indicating that voice input is not appropriate is superimposed.

Figure 20:
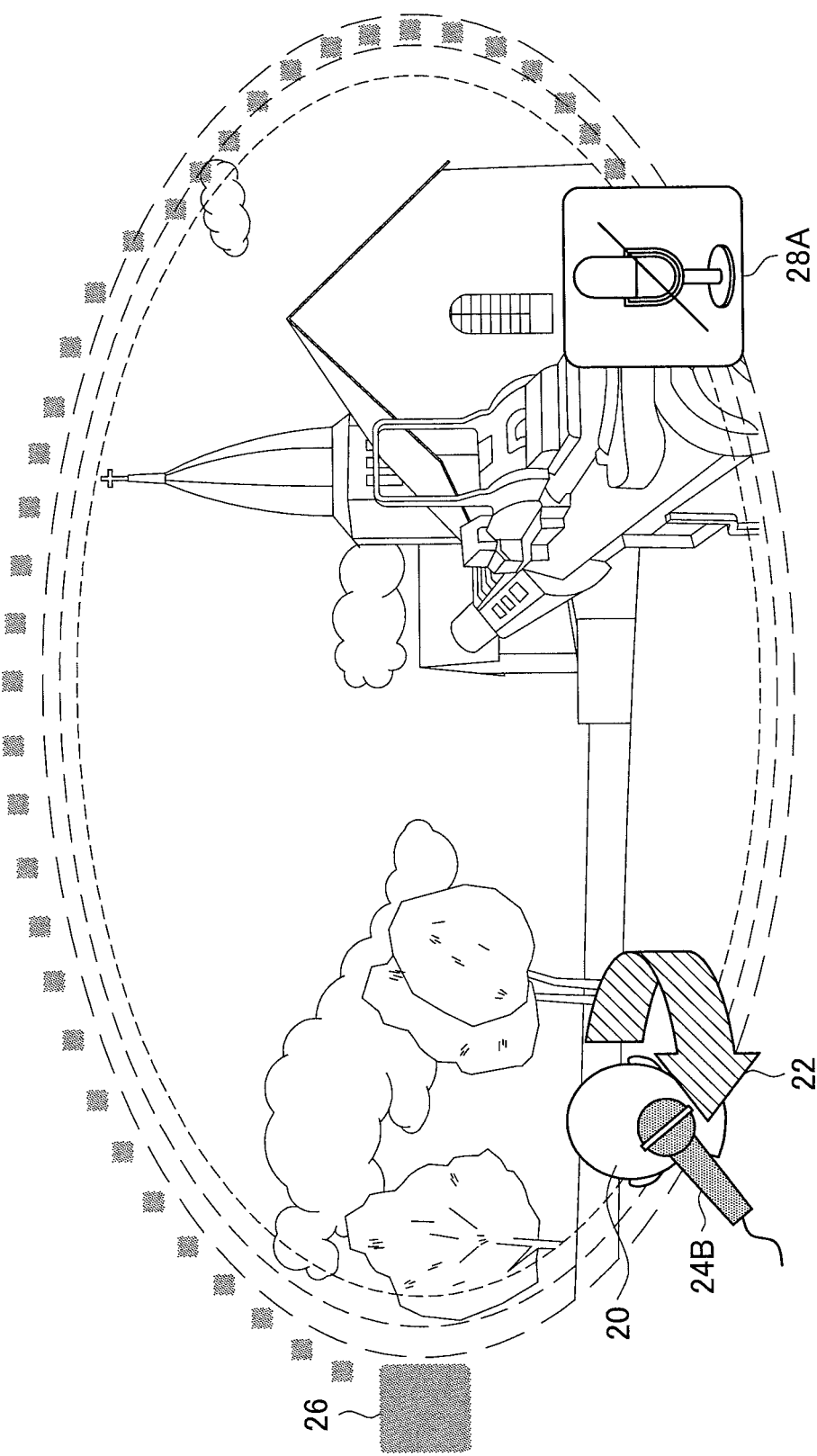
FIG. 20 is an explanatory diagram of a processing example of the information processing system in a case in which voice input is difficult.

Next, a state in which the user rotates his or her head further clockwise, i.e., the state of (3) of FIG. 6, will be described with reference to FIG. 20. In the state of (3), the arrow of the face direction inducing object 22 is formed to be shorter than in the state of (2). In addition, the microphone is expressed to be larger than in the state of (2), and the evaluation object 24B to which the emphasis effect is added is superimposed. Furthermore, the noise reachable area object 26 is further moved in the opposite direction to the rotation direction of the head. In addition, since the sound pressure determination value is 0 in the example of FIG. 20, the voice input suitability object 28A indicating that voice input is not appropriate is superimposed. Furthermore, in a case in which it is unlikely that the suitability of voice input is improved, an emphasis effect may be added to the voice input suitability object 28A. For example, the size of the voice input suitability object 28A may be increased as illustrated in FIG. 20, or the hue, saturation, luminance, pattern, or the like of the voice input suitability object 28A may be changed.

Figure 21:
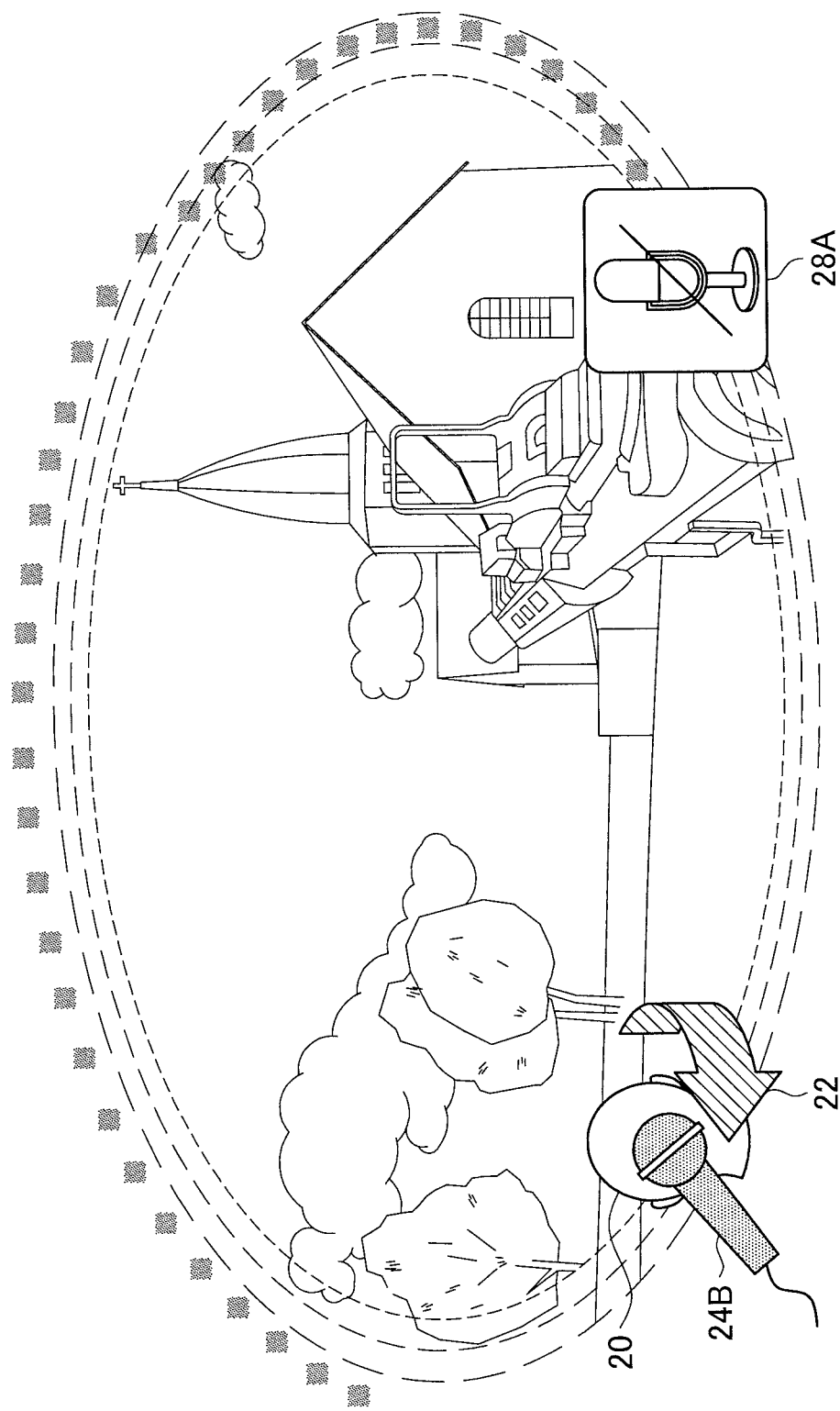
FIG. 21 is an explanatory diagram of a processing example of the information processing system in a case in which voice input is difficult.

Next, a state in which the user rotates his or her head further clockwise, i.e., the state of (4) of FIG. 6, will be described with reference to FIG. 21. In the state of (4), the arrow of the face direction inducing object 22 is formed to be shorter than in the state of (3). In addition, the microphone is expressed to be larger than in the state of (3) and the evaluation object 24B to which the emphasis effect is added is superimposed. Furthermore, the noise reachable area object 26 is further moved in the opposite direction to the rotation direction of the head. As a result, the noise reachable area object may not be superimposed on the game screen as illustrated in FIG. 21. Note that, even in such a case, the display object (dashed-lined display object) indicating influence of noise on suitability of voice input may be superimposed in accordance with a sound pressure level of the noise. In addition, since the sound pressure determination value is 0 in the example of FIG. 21, the voice input suitability object 28A with the emphasis effect indicating that voice input is not appropriate is superimposed.

Figure 22:
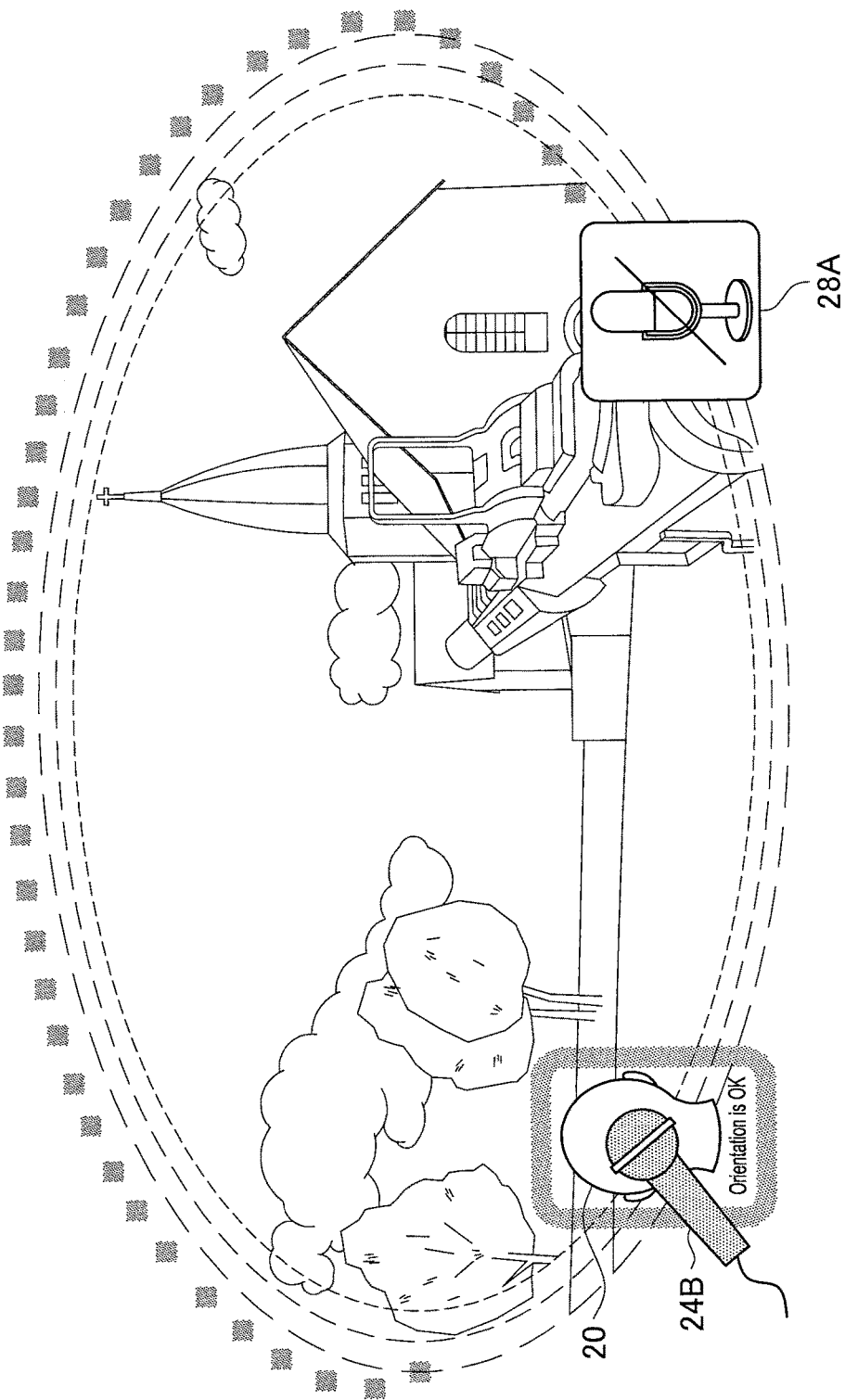
FIG. 22 is an explanatory diagram of a processing example of the information processing system in a case in which voice input is difficult.

Finally, a state in which the face of the user faces the opposite direction to the direction that the noise source faces, i.e., the state of (5) of FIG. 6, will be described with reference to FIG. 22. In the state of (5), the arrow of the face direction inducing object 22 is not superimposed. In addition, the character string object "orientation is OK" is superimposed as a display object indicating that the orientation of the face is appropriate for voice input. Furthermore, the mode of the peripheries of the display object 20 may be changed. In addition, the evaluation object 24B to which the emphasis effect is added is superimposed. Furthermore, the noise reachable area object 26 is further moved in the opposite direction to the rotation direction of the head. As a result, the noise reachable area object is not superimposed on the game screen as illustrated in FIG. 22. In addition, since the sound pressure determination value is 0 in the example of FIG. 22, the voice input suitability object 28B with the emphasis effect indicating that voice input is not appropriate is superimposed.

1-5. Summary of First Embodiment

According to the first embodiment of the present disclosure described above, the information processing device 100-1 controls the output to induce an action of a user to change a sound collecting characteristic of a generated sound, which is different from an operation related to processing of the sound collecting unit, which collects sound generated by the user, on the basis of a positional relation between a noise generation source and the sound collecting unit. Thus, by inducing the user's action of changing a positional relation between the noise source and the display/sound collecting device 200-1 such that the sound collecting characteristic is improved, the user can realize a situation in which noise is hardly input and voice input is appropriate only by following the induction. In addition, since noise is hardly input because the user performs the action, a separate configuration for avoiding noise may not be added to the information processing device 100-1 or the information processing system. Therefore, noise input can be easily suppressed in light of usability, cost, and facilities.

In addition, sounds generated by the user include voice, and the information processing device 100-1 controls the output for induction on the basis of the positional relation and an orientation of the face of the user. Here, in order to improve the sound collecting characteristic of the voice of the user, it is desirable for the sound collecting unit 224, i.e., the microphone, to be provided in the voice generation direction (the orientation of the face including the mouth producing the voice). Actually, microphones are provided to be positioned at the mouths of users in most cases. However, if a noise source is present in a speech direction, noise is easily input. With regard to this problem, according to the present configuration, it is possible to prompt a user to perform an action to prevent a noise source from being present in the orientation of the face of the user. Therefore, noise input can be suppressed while the sound collecting characteristic is improved.

Furthermore, the information processing device 100-1 controls the output for induction on the basis of information regarding a difference between a direction from the generation source to the sound collecting unit or a direction from the sound collecting unit to the generation source and an orientation of the face of the user. Thus, the direction from the user wearing the microphone to the noise source or the direction from the noise source to the user is used in output control processing, and a more accurate action that the user is supposed to perform can be induced. Therefore, noise input can be suppressed more effectively.

In addition, the difference includes the angle formed by the direction from the generation source to the sound collecting unit or the direction from the sound collecting unit to the generation source and the orientation of the face of the user. Thus, by using angle information in the output control processing, accuracy or precision of the output control can be improved. Furthermore, by performing the output control processing using an existing angle calculation technology, costs for device development can be reduced and complication of the process can be prevented.

In addition, the action of the user includes a change of the orientation of the face of the user. Thus, by changing the orientation of the face including the mouth producing voice, noise input can be suppressed more effectively and easily than by other actions. Note that an orientation or movement of the body may be induced as long as induction of an orientation of the face is included therein.

Furthermore, the output for induction includes output related to evaluation of a mode of the user with reference to a mode of the user resulting from an induced action. Thus, the user can ascertain whether his or her action has been performed as induced. Thus, the user action based on the induction is easily performed, and thus noise input can be suppressed more reliably.

In addition, the output for induction includes output related to noise collected by the sound collecting unit. Thus, by presenting information regarding the invisible noise to the user, the user can ascertain the noise or the noise source. Therefore, the user can intuitively understand an action that prevents input of the noise.

Furthermore, the output related to noise includes output to notify of a reachable area of the noise collected by the sound collecting unit. Thus, the user can intuitively understand what action the user should perform to prevent noise from reaching the user. Therefore, the user can perform an action to suppress noise input more easily.

In addition, the output related to noise includes output to notify of a sound pressure of the noise collected by the sound collecting unit. Thus, the user can ascertain the sound pressure level of the noise. Therefore, since the user understands likelihood of input of the noise, the user can be motivated to perform an action.

Furthermore, the output for induction includes visual presentation to the user. Here, visual information delivery requires a larger amount of information than information presentation using other senses in general. Thus, the user can easily understand the induction of an action, and thus the action can be smoothly induced.

In addition, the visual presentation to the user includes superimposition of a display object on an image or an external image. Thus, by presenting a display object for inducing an action in the visual field of the user, an obstruction of concentration or immersion in an image or an external image can be suppressed. Furthermore, the configuration of the present embodiment can be applied to display using VR or augmented reality (AR).

In addition, the information processing device 100-1 controls notification of suitability for collection of a sound generated by the user on the basis of an orientation of the face of the user or a sound pressure of the noise. Thus, by directly transmitting suitability of voice input to the user, it is easy to ascertain the suitability of voice input. Therefore, it is possible to easily prompt the user to perform an action to avoid noise input.

Furthermore, the information processing device 100-1 controls whether to perform the output for induction on the basis of information regarding a sound collection result of the sound collecting unit. Thus, it is possible to control whether to perform the output for induction in accordance with a situation, without bothering the user. Note that whether to perform the output for induction may be controlled on the basis of a setting made by the user.

In addition, the information regarding the sound collection result includes start information of processing that uses the sound collection result. Thus, it is possible to stop a series of processing such as sound collection processing, sound processing, output control processing, and the like before the aforementioned processing is started. Therefore, a processing load and power consumption of the devices of the information processing system can be reduced.

Furthermore, the information regarding the sound collection result includes sound pressure information of the noise collected by the sound collecting unit. Thus, since noise is not input or has little influence on voice input in a case in which the sound pressure level of the noise is less than the lower limit threshold value, for example, the above-described series of processing can be stopped. On the contrary, since the output control processing is automatically performed in a case in which the sound pressure level of the noise is higher than or equal to the lower limit threshold value, it is possible to prompt the user to perform an action to suppress noise input even before the user notices the noise.

In addition, in a case in which the output for induction is performed during execution of processing using a sound collection result of the sound collecting unit, the information processing device 100-1 stops at least a part of the processing. Thus, by interrupting or discontinuing processing of a game application in the case in which the output for induction is performed during the processing of the game application, for example, it is possible to prevent the processing of the game application from progressing while the user performs an action following the induction. In particular, if the processing progresses when the processing is performed in accordance with a motion of the head of the user, it is likely that a processing result unintended by the user is generated due to the induction of the action. Even at that time, the generation of the processing result unintended by the user can be prevented according to the present configuration.

Furthermore, at least a part of the processing includes processing using an orientation of the face of the user in the processing. Thus, by stopping only processing that is affected by a change of the orientation of the face, the user can enjoy a result of other processing. Therefore, in a case in which a processing result may be independent from other processing, user convenience can be improved.

1-6. Modified Example

The first embodiment of the present disclosure has been described above. Note that the present embodiment is not limited to the above-described examples. A modified example of the present embodiment will be described below.

Figure 23:
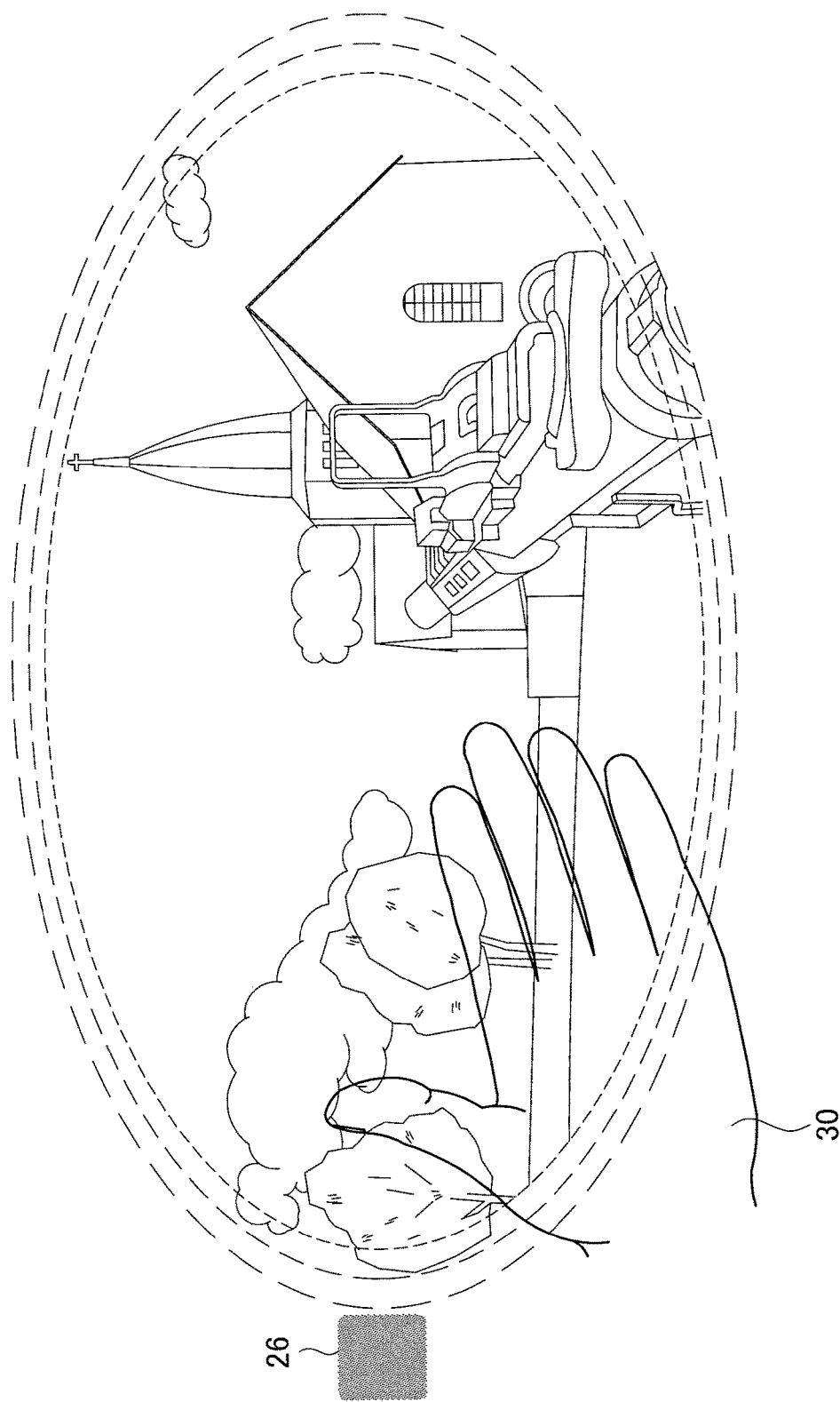
FIG. 23 is a diagram for describing a processing example of an information processing system according to a modified example of the embodiment.

As the modified example of the present embodiment, an induced action of a user may be another action. Specifically, the induced action of the user includes an action to block a noise source from the display/sound collecting device 200-1 with a predetermined object (which will also be referred to as a blocking action below). The blocking action includes, for example, an action of putting a hand between the noise source and the display/sound collecting device 200-1, i.e., a microphone. Furthermore, a processing example of the present modified example will be described with reference to FIG. 23. FIG. 23 is a diagram for describing a processing example of the information processing system according to the modified example of the present embodiment.

Processing of the present modified example will be described in detail on the basis of processing related to a blocking action in the state of (3) of FIG. 6 with reference to FIG. 23. In the state of (3), since the noise source is present on the left with respect to the orientation of the face of the user, the noise reachable area 26 object is superimposed on the left side of the game screen.

Here, since the microphone is assumed to be provided near the mouth of the user, the microphone is regarded as being positioned near the lower center of the game screen. Thus, the output control unit 126 superimposes a display object of inducing disposition of a blocker (which will also be referred to as a blocker object below) such that a blocker such as a hand is placed between the microphone and the noise source or the noise reachable area object 26. For example, a blocker object 30 resembling a hand of the user is superimposed between the noise reachable area object 26 and the lower center of the game screen as illustrated in FIG.

23. In particular, the blocker object may be a display object in a shape of covering the mouth of the user, i.e., the microphone.

Note that, in a case in which the user places his or her hand at the position at which the blocker object 30 is superimposed, a mode of the blocker object 30 may be changed. For example, a change in the type, thickness, hue, or luminance of a contour line of the blocker object 30, filling of the area surrounded by the contour line, or the like is possible. In addition, the blocker may be another part of a human body such as a finger or an arm, or an object other than a part of a human body such as a book, a plate, an umbrella, or a movable partition other than a hand. Note that, since the predetermined object is operated by the user, a portable object is desirable.

As described above, according to the modified example of the present embodiment, an induced action of the user includes an action of blocking the noise source from the display/sound collecting device 200-1 using such a predetermined object. Thus, even in a case in which the user does not want to change the orientation of his or her face, for example, in a case in which processing of a game application or the like is performed in accordance with the orientation of the face of the user, the user's action can be induced to suppress input of noise. Therefore, chances of enjoying the effect of suppressing noise input can increase, and user convenience can be improved.

2. Second Embodiment (Control of Sound Collecting Unit and Induction of User for Highly Sensitive Sound Collection)

The first embodiment of the present disclosure has been described above. Next, a second embodiment of the present disclosure will be described. In the second embodiment, a sound collection mode of a sound collecting unit, i.e., a display/sound collecting device 200-2, is controlled and an action of a user is induced such that sounds to be collected are collected with high sensitivity.

2-1. System Configuration

Figure 24:
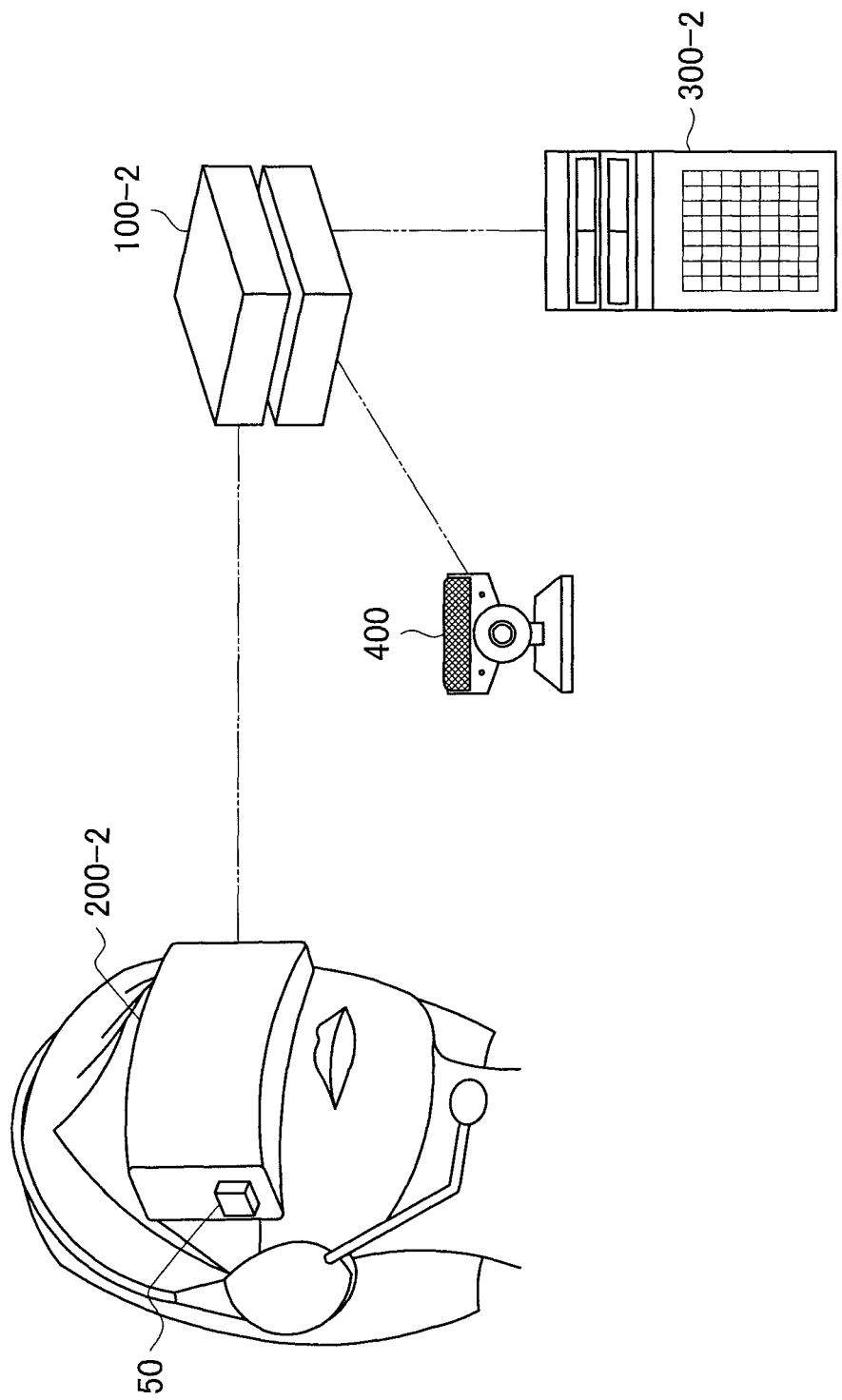
FIG. 24 is a diagram for describing a schematic configuration example of an information processing system according to a second embodiment of the present disclosure.

A configuration of an information processing system according to the second embodiment of the present disclosure will be described with reference to FIG. 24. FIG. 24 is a diagram for describing a schematic configuration example of the information processing system according to the present embodiment. Note that description of substantially the same configuration as that of the first embodiment will be omitted.

As illustrated in FIG. 24, the information processing system according to the present embodiment includes a sound collecting/imaging device 400 in addition to an information processing device 100-2, the display/sound collecting device 200-2, and a sound processing device 300-2.

The display/sound collecting device 200-2 includes a luminous body 50 in addition to the configuration of the display/sound collecting device 200-1 according to the first embodiment. The luminous body 50 may start light emission along with activation of the display/sound collecting device 200-2, or may start light emission along with a start of specific processing. In addition, the luminous body 50 may output visible light, or may output light other than visible light such as infrared light.

The sound collecting/imaging device 400 includes a sound collecting function and an imaging function. For example, the sound collecting/imaging device 400 collects sounds around the device and provides collected sound information regarding the collected sounds to the information processing device 100-2. In addition, the sound collecting/imaging device 400 captures environments around the device and provides image information regarding the captured images to the information processing device 100-2. Note that the sound collecting/imaging device 400 is a stationary device as illustrated in FIG. 24, is connected to the information processing device 100-2 for communication, and provides collected sound information and image information through communication. In addition, the sound collecting/imaging device 400 has a beamforming function for sound collection. The beamforming function realizes highly sensitive sound collection.

In addition, the sound collecting/imaging device 400 may have a function of controlling positions or attitudes. Specifically, the sound collecting/imaging device 400 may move itself or change its own attitudes (orientations). For example, the sound collecting/imaging device 400 may have a movement module such as a motor for movement or attitude change and wheels driven by the motor. Furthermore, the sound collecting/imaging device 400 may move only a part having a function of collecting a sound (e.g., a microphone) while maintaining its attitude, or change an attitude.

Here, there are cases in which it is difficult to use a microphone of the display/sound collecting device 200-2. In such a case, the sound collecting/imaging device 400 that is a separate device from the display/sound collecting device 200-2 is instead used for voice input and the like. However, in a case in which the display/sound collecting device 200-2 is a shielded-type HMD, for example, a VR display device, it is difficult for a user wearing the display/sound collecting device 200-2 to visually check outside. Thus, the user is not able to ascertain a position of the sound collecting/imaging device 400, and thus is likely to speak in a wrong direction. In addition, even in a case in which the display/sound collecting device 200-2 is a see-through-type HMD, for example, an AR display device, it is difficult for the user to view in a direction in which sounds are collected with high sensitivity, and thus there is a possibility of the user likewise speaking in a wrong direction, i.e., a direction different from the direction in which sounds are collected with high sensitivity. As a result, a sound collecting characteristic such as a sound pressure level or a signal-to-noise ratio (SN ratio) deteriorates, and it is likely to be difficult to obtain a desired processing result in processing based on collected sound.

Therefore, the second embodiment of the present disclosure proposes an information processing system that can enhance a sound collecting characteristic more reliably. Each of the devices that are constituent elements of the information processing system according to the second embodiment will be described in detail below.

Note that, although the example in which the sound collecting/imaging device 400 is an independent device has been described above, the sound collecting/imaging device 400 may be integrated with the information processing device 100-2 or the sound processing device 300-2. In addition, although the example in which the sound collecting/imaging device 400 has the sound collecting function and the imaging function has been descried, the sound collecting/imaging device 400 may be realized by a combination of a device only with the sound collecting function and a device only with the imaging function.

2-2. Configuration of Devices

Next, a configuration of each of the devices of the information processing system according to the present embodiment will be described. Note that, since a physical configuration of the sound collecting/imaging device 400 is similar to those of the display/sound collecting devices 200, description thereof will be omitted. In addition, since physical configurations of other devices are substantially the same as those of the first embodiment, description thereof will be omitted.

Figure 25:
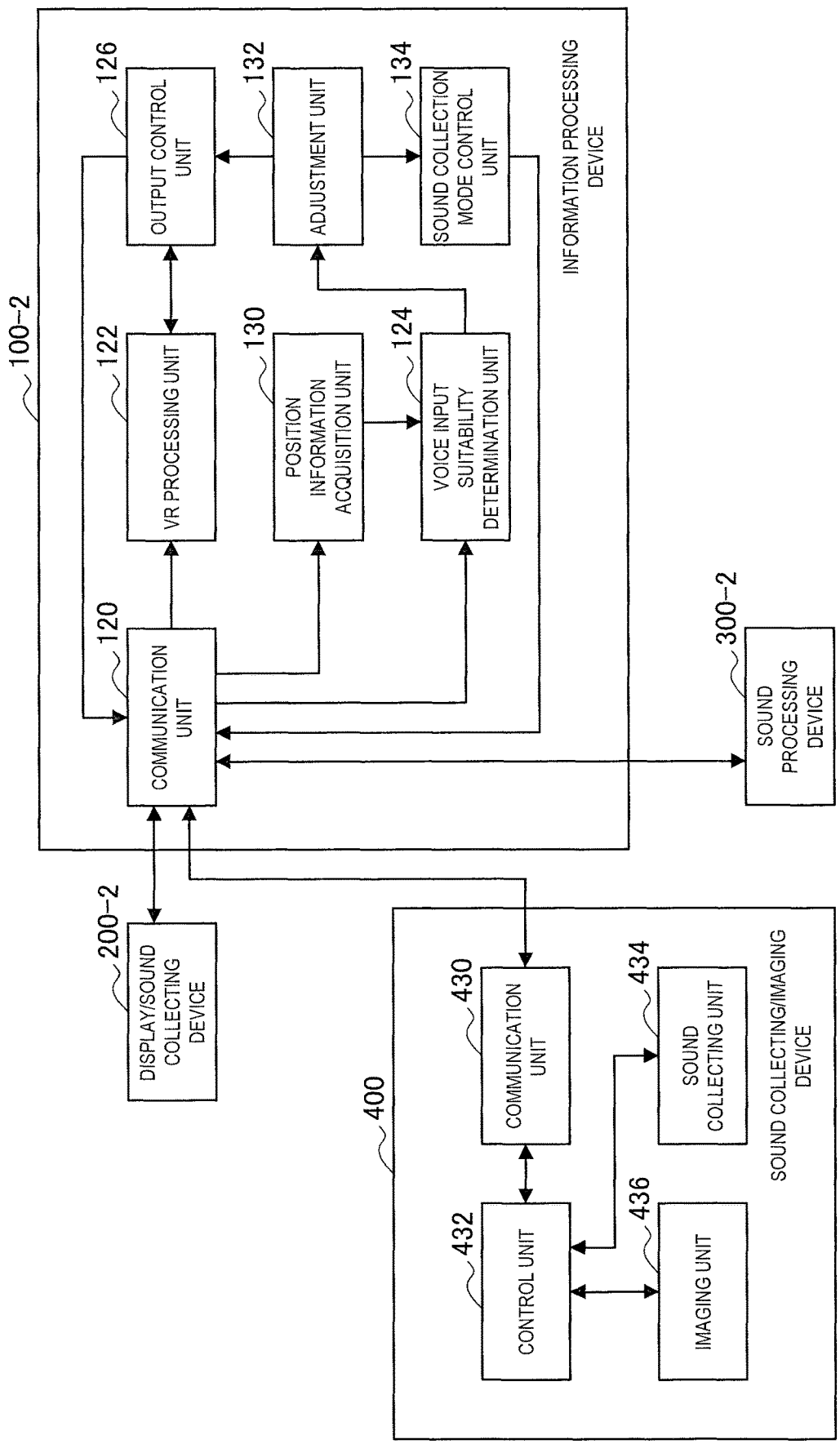
FIG. 25 is a block diagram illustrating a schematic functional configuration example of each device of the information processing system according to the embodiment.

A logical configuration of each device of the information processing system according to the present embodiment will be described with reference to FIG. 25. FIG. 25 is a block diagram illustrating a schematic functional configuration example of each device of the information processing system according to the present embodiment. Note that description of substantially the same functions as those of the first embodiment will be omitted.

(Logical Configuration of Information Processing Device)

The information processing device 100-2 includes a position information acquisition unit 130, an adjustment unit 132, and a sound collection mode control unit 134, in addition to a communication unit 120, a VR processing unit 122, a voice input suitability determination unit 124, and an output control unit 126 as illustrated in FIG. 25.

(Communication Unit)

The communication unit 120 communicates with the sound collecting/imaging device 400 in addition to the display/sound collecting device 200-2 and the sound processing device 300-2. Specifically, the communication unit 120 receives collected sound information and image information from the sound collecting/imaging device 400 and transmits sound collection mode instruction information, which will be described below, to the sound collecting/imaging device 400.

(Position Information Acquisition Unit)

The position information acquisition unit 130 acquires information indicating a position of the display/sound collecting device 200-2 (which will also be referred to as position information below). Specifically, the position information acquisition unit 130 estimates a position of the display/sound collecting device 200-2 using image information acquired from the sound collecting/imaging device 400 via the communication unit 120 and generates position information indicating the estimated position. For example, the position information acquisition unit 130 estimates a position of the luminous body 50, i.e., the display/sound collecting device 200-2, with respect to the sound collecting/imaging device 400 on the basis of a position and a size of the luminous body 50 projected on an image indicated by the image information. Note that information indicating the size of the luminous body 50 may be stored in the sound collecting/imaging device 400 in advance or acquired via the communication unit 120. In addition, the position information may be information relative to the sound collecting/imaging device 400 or information indicating a position of predetermined spatial coordinates. Furthermore, the acquisition of the position information may be realized using another means. For example, the position information may be acquired using object recognition processing of the display/sound collecting device 200-2 without using the luminous body 50, or position information calculated by an external device may be acquired via the communication unit 120.

(Voice Input Suitability Determination Unit)

Figure 26:
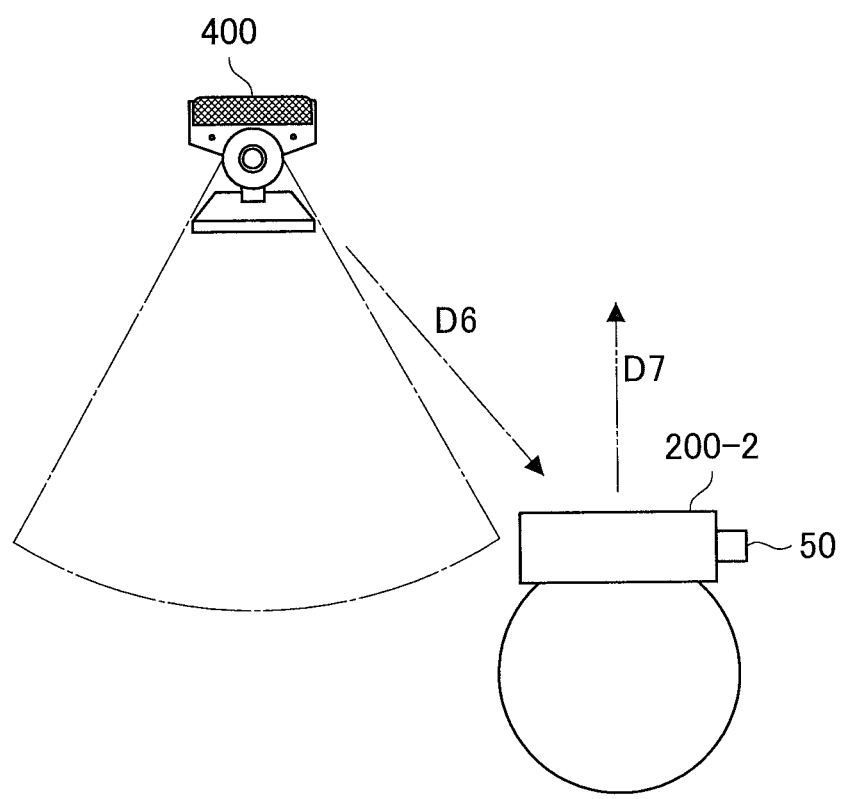
FIG. 26 is a diagram for describing a voice input suitability determination process according to the embodiment.

The voice input suitability determination unit 124 serves as a part of a control unit and determines suitability of voice input on the basis of a positional relation between the sound collecting/imaging device 400 and generation source of a sound to be collected by the sound collecting/imaging device 400. Specifically, the voice input suitability determination unit 124 determines suitability of voice input on the basis of the positional relation between the sound collecting/imaging device 400 and the generation source (mouth or face) of the voice and face direction information. Furthermore, a voice input suitability determination process according to the present embodiment will be described with reference to FIG. 26 and FIG. 27. FIG. 26 is a diagram for describing the voice input suitability determination process according to the present embodiment, and FIG. 27 is a diagram illustrating examples of determination patterns of suitability of voice input according to the present embodiment.

A case in which the display/sound collecting device 200-2 and the sound collecting/imaging device 400 are disposed as illustrated in, for example, FIG. 26 will be considered. In this case, first, the voice input suitability determination unit 124 specifies a direction in which the display/sound collecting device 200-2 (the face of a user) and the sound collecting/imaging device 400 are connected (which will also be referred to as a sound collection direction below) on the basis of position information. For example, the voice input suitability determination unit 124 specifies a sound collection direction D6 from the display/sound collecting device 200-2 to the sound collecting/imaging device 400 as illustrated in FIG. 26 on the basis of position information provided from the position information acquisition unit 130. Note that information indicating a sound collection direction will also be referred to as sound collection direction information, and sound collection direction information indicating a sound collection direction from the display/sound collecting device 200-2 to the sound collecting/imaging device 400, like the above-described D6, will also be referred to as a FaceToMicVec below.

In addition, the voice input suitability determination unit 124 acquires face direction information from the display/sound collecting device 200-2. For example, the voice input suitability determination unit 124 acquires the face direction information indicating an orientation D7 of the face of the user wearing the display/sound collecting device 200-2 as illustrated in FIG. 26 from the display/sound collecting device 200-2 via the communication unit 120.

Next, the voice input suitability determination unit 124 determines suitability of voice input on the basis of information regarding a difference between the direction between the sound collecting/imaging device 400 and the display/sound collecting device 200-2 (that is, the face of the user) and the orientation of the face of the user. Specifically, using sound collection direction information regarding the specified sound collection direction and face direction information, the voice input suitability determination unit 124 calculates the angle formed by the direction indicated by the sound collection direction information and the direction indicated by the face direction information. Then, the voice input suitability determination unit 124 determines a direction determination value as the suitability of the voice input in accordance with the calculated angle. For example, the voice input suitability determination unit 124 calculates a MicToFaceVec, which is sound collection direction information having the opposite direction to that of the specified FaceToMicVec, and then calculates an angle α formed by the direction indicated by the MicToFaceVec, i.e., the direction from the sound collecting/imaging device 400 to the face of the user, and the direction indicated by the face direction information. Then, the voice input suitability determination unit 124 determines, as a direction determination value, a value in accordance with an output value of a cosine function having the calculated angle α as input as illustrated in FIG. 27. The direction determination value is set to a value at which, for example, the suitability of the voice input is improved as the angle α becomes larger.

Note that the difference may be a combination of directions or cardinal directions in addition to angles, and in that case, the direction determination value may be set in accordance with the combination. In addition, although the example of using the MicToFaceVec has been described above, the FaceToMicVec having the opposite direction to the MicToFaceVec may be used without change. In addition, although the example in which the directions of the sound source direction information, the face direction information, and the like are directions on a horizontal plane when the user is viewed from above has been described, the directions may be directions on a vertical plane with respect to the horizontal plane, or directions in a three-dimensional space. Furthermore, the direction determination value may be a value of the five levels shown in FIG. 27, or may be a value of finer levels or a value of rougher levels.

Furthermore, in a case in which the sound collecting/imaging device 400 performs beamforming for sound collection, the voice input suitability determination unit 124 may determine suitability of voice input on the basis of information indicating a direction of the beamforming (which will also be referred to as beamforming information below) and the face direction information. In addition, directions of beamforming have a predetermined range, one of the directions within the predetermined range may be used as a beamforming direction.

(Adjustment Unit)

The adjustment unit 132 serves as a part of the control unit and controls a mode of the sound collecting/imaging device 400 related to a sound collecting characteristic and output to induce a generation direction of a collected sound by controlling an operation of the sound collection mode control unit 134 and the output control unit 126 on the basis of a voice input suitability determination result. Specifically, the adjustment unit 132 controls a degree of the mode of the sound collecting/imaging device 400 and a degree of the output to induce the user's speech direction on the basis of the information regarding the sound collection result. More specifically, the adjustment unit 132 controls the degree of the mode and the degree of the output on the basis of type information of content to be processed using the sound collection result.

The adjustment unit 132 decides, for example, an overall control amount on the basis of a direction determination value. Next, the adjustment unit 132 decides a control amount related to a change of a mode of the sound collecting/imaging device 400 and a control amount related to a change of the user's speech direction using the decided overall control amount on the basis of information regarding a sound collection result. This can be said that the adjustment unit 132 distributes the overall control amount to control of a mode of the sound collecting/imaging device 400 and control of output related to induce the user's speech direction. In addition, the adjustment unit 132 causes the sound collection mode control unit 134 to control a mode of the sound collecting/imaging device 400 and causes the output control unit 126 to control output to induce the speech direction on the basis of the decided control amount. Note that the output control unit 126 may perform control using a direction determination value.

In addition, the adjustment unit 132 decides distribution of the above-described control amount in accordance with a type of content. For example, the adjustment unit 132 increases the control amount for the mode of the sound collecting/imaging device 400 and decreases the control amount for the output for the induction of the user's speech direction with respect to content whose details is to be provided (e.g., a display screen) change in accordance with movement of the head of the user. In addition, the same applies to content closely observed by the user, such as images or dynamic images.

Note that the above-described information regarding the sound collection result may be surrounding environment information of the sound collecting/imaging device 400 or the user. For example, the adjustment unit 132 decides distribution of the above-described control amount in accordance with the presence or absence of a surrounding shield, a size of a movable space, or the like of the sound collecting/imaging device 400 or the user.

In addition, the above-described information regarding the sound collection result may be mode information of the user. Specifically, the adjustment unit 132 decides distribution of the above-described control amount in accordance with attitude information of the user. In a case in which the user faces upward, for example, the adjustment unit 132 decreases a control amount for the mode of the sound collecting/imaging device 400 and increases a control amount for the output to induce the user's speech direction. Furthermore, the adjustment unit 132 may decide distribution of the above-described control amount in accordance with information regarding immersion of the user in content (information indicating whether or how far the user is being immersed in the content). In a case in which the user is immersed in content, for example, the adjustment unit 132 increases a control amount for the mode of the sound collecting/imaging device 400 and decreases a control amount for the output to induce the user's speech direction. Note that whether and how far the user is being immersed in the content may be determined on the basis of biological information, for example, eye movement information of the user.

Although details of control over the mode of the sound collecting/imaging device 400 and the output to induce a speech direction have been described above, the adjustment unit 132 may decide whether to control on the basis of a sound collection situation. Specifically, the adjustment unit 132 decides whether to control on the basis of sound collection sensitivity that is one of sound collecting characteristics of the sound collecting/imaging device 400. In a case in which sound collection sensitivity of the sound collecting/imaging device 400 decreases to be equal to or lower than a threshold value, for example, the adjustment unit 132 starts processing related to the control.

In addition, the adjustment unit 132 may control only one of the mode of the sound collecting/imaging device 400 and the output to induce a speech direction on the basis of the above-described information regarding a sound collection result. In a case in which the user is determined to be in a situation in which it is difficult for him or her to move or change the orientation of his or her face, for example, the adjustment unit 132 may cause only the sound collection mode control unit 134 to perform processing. Conversely, in a case in which the sound collecting/imaging device 400 has neither a movement function nor a sound collection mode control function or these functions are determined not to be normally operating, the adjustment unit 132 may cause only the output control unit 126 to perform processing.

Note that, although the example in which the adjustment unit 132 controls distribution of the control amount has been described above, the adjustment unit 132 may control the mode of the sound collecting/imaging device 400 and the output to induce the user's speech direction independently of each other on the basis of the voice input suitability determination result and the information regarding the sound collection result.

(Sound Collection Mode Control Unit)

The sound collection mode control unit 134 controls a mode related to a sound collecting characteristic of the sound collecting/imaging device 400. Specifically, the sound collection mode control unit 134 decides a mode of the sound collecting/imaging device 400 on the basis of a control amount instructed by the adjustment unit 132 and generates information instructing a transition to the decided mode (which will also be referred to as sound collection mode instruction information below). More specifically, the sound collection mode control unit 134 controls beamforming for a position, an attitude, or sound collection of the sound collecting/imaging device 400. For example, the sound collection mode control unit 134 generates sound collection mode instruction information instructing movement, a change of an attitude, or an orientation or a range of beamforming of the sound collecting/imaging device 400 on the basis of the control amount instructed by the adjustment unit 132.

Note that the sound collection mode control unit 134 may separately control beamforming on the basis of position information. When position information is acquired, for example, the sound collection mode control unit 134 generates sound collection mode instruction information using a direction from the sound collecting/imaging device 400 to the position indicated by the position information as a beamforming direction.

(Output Control Unit)

The output control unit 126 controls visual presentation for inducing the user's speech direction on the basis of an instruction of the adjustment unit 132. Specifically, the output control unit 126 decides the face direction inducing object indicating a direction in which an orientation of the face of the user is to be changed in accordance with a control amount instructed by the adjustment unit 132. In a case in which a direction determination value instructed by the adjustment unit 132 is low, for example, the output control unit 126 decides the face direction inducing object that is likely to induce a change of the orientation of the face of the user so that the direction determination value increases.

In addition, the output control unit 126 may control output to notify of a position of the sound collecting/imaging device 400. Specifically, the output control unit 126 decides a display object indicating the position of the sound collecting/imaging device 400 (which will also be referred to as a sound collection position object below) on the basis of a positional relation between the face of the user and the sound collecting/imaging device 400. For example, the output control unit 126 decides the sound collection position object indicating a position of the sound collecting/imaging device 400 with respect to the face of the user.

Furthermore, the output control unit 126 may control output for evaluation of a current orientation of the face of the user with reference to the orientation of the face of the user resulting from induction. Specifically, the output control unit 126 decides an evaluation object indicating evaluation of an orientation of the face on the basis of a degree of divergence between the orientation of the face that the user should change in accordance with induction and the current orientation of the face of the user. For example, the output control unit 126 decides the evaluation object indicating that suitability of voice input is improved as the divergence further decreases.

(Logical Configuration of Sound Collecting/Imaging Device)

The sound collecting/imaging device 400 includes a communication unit 430, a control unit 432, a sound collecting unit 434, and an imaging unit 436 as illustrated in FIG. 25.

(Communication Unit)

The communication unit 430 communicates with the information processing device 100-2. Specifically, the communication unit 430 transmits collected sound information and image information to the information processing device 100-2 and receives sound collection mode instruction information from the information processing device 100-2.

(Control Unit)

The control unit 432 controls the sound collecting/imaging device 400 overall. Specifically, the control unit 432 controls a mode of the device related to the sound collecting characteristic on the basis of the sound collection mode instruction information. For example, the control unit 432 sets an orientation of the microphone or an orientation or a range of beamforming specified by the sound collection mode instruction information. In addition, the control unit 432 causes the device to move a position specified by sound collection mode instruction information.

In addition, the control unit 432 controls the imaging unit 436 by setting imaging parameters of the imaging unit 436. For example, the control unit 432 sets imaging parameters such as an imaging direction, an imaging range, imaging sensitivity, and a shutter speed. Note that the imaging parameters may be set such that the display/sound collecting device 200-2 is easily imaged. For example, a direction in which the head of the user easily enters the imaging range may be set as the imaging direction. In addition, the imaging parameters may be notified of by the information processing device 100-2.

(Sound Collecting Unit)

The sound collecting unit 434 collects sounds around the sound collecting/imaging device 400. Specifically, the sound collecting unit 434 collects sounds such as voice of the user produced around the sound collecting/imaging device 400. In addition, the sound collecting unit 434 performs beamforming processing related to sound collection. For example, the sound collecting unit 434 improves sensitivity of a sound input from a direction that is set as a beamforming direction. Note that the sound collecting unit 434 generates collected sound information regarding collected sounds.

(Imaging Unit)

The imaging unit 436 images peripheries of the sound collecting/imaging device 400. Specifically, the imaging unit 436 performs imaging on the basis of the imaging parameters set by the control unit 432. The imaging unit 436 is realized by, for example, an imaging optical system such as an imaging lens that collects light and a zoom lens, or a signal converting element such as a charge coupled device (CCD) or a complementary metal oxide semiconductor (CMOS). In addition, imaging may be performed for visible light, infrared, and an image obtained through imaging may be a still image or a dynamic image.

2-3. Processing of Device

Next, processing of the information processing device 100-2 that performs principal processing among the constituent elements of the information processing system will be described. Note that description of substantially the same processing as the processing of the first embodiment will be omitted.

(Overall Processing)

Figure 28:
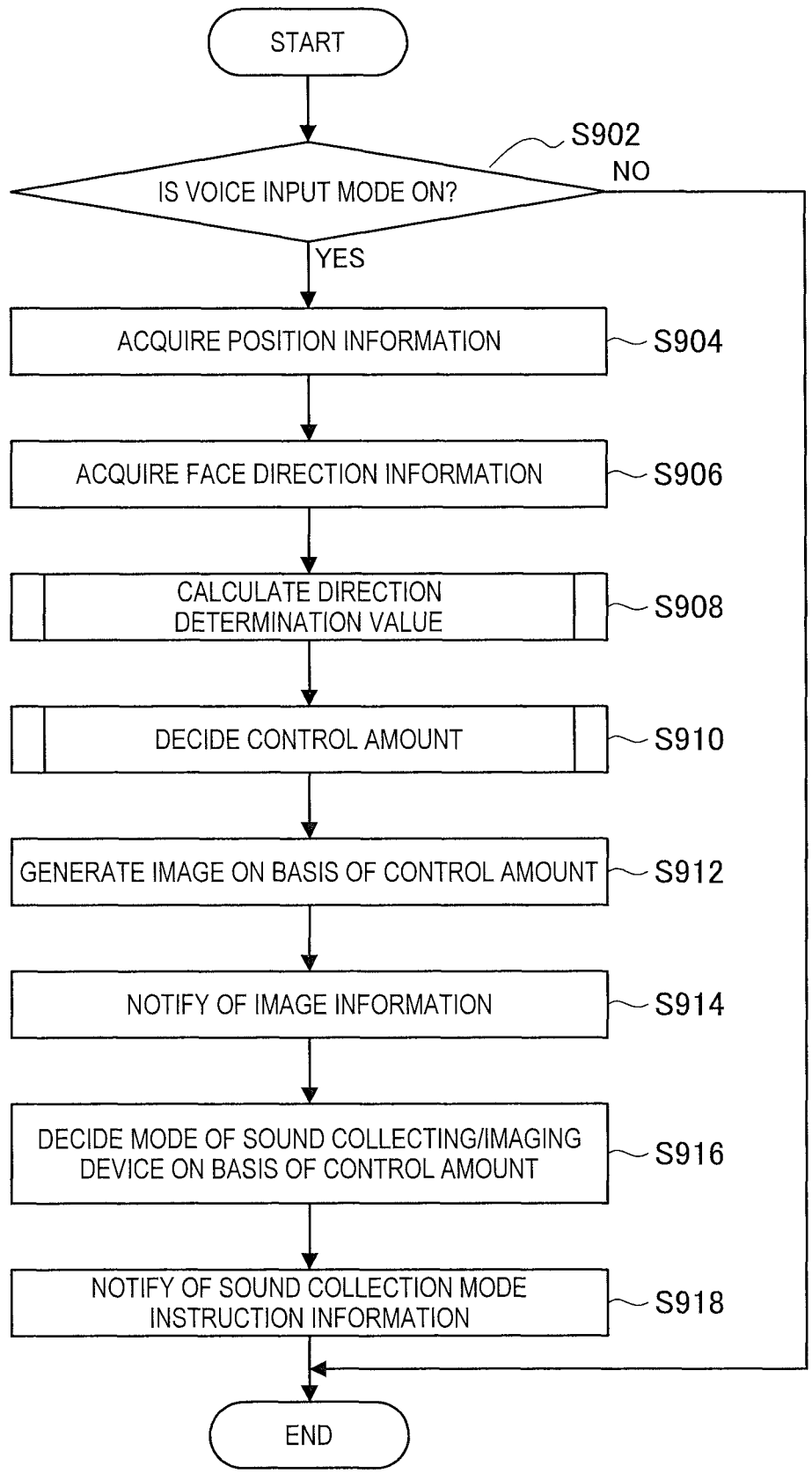
FIG. 28 is a flowchart illustrating the concept of an overall process of an information processing device according to the embodiment.

First, overall processing of the information processing device 100-2 according to the present embodiment will be described with reference to FIG. 28. FIG. 28 is a flowchart showing the concept of overall processing of the information processing device 100-2 according to the present embodiment.

The information processing device 100-2 determines whether a voice input mode is on (Step S902). Specifically, the adjustment unit 132 determines whether the voice input mode using the sound collecting/imaging device 400 is on.

If it is determined that the voice input mode is on, the information processing device 100-2 acquires position information (Step S904). Specifically, if it is determined that the voice input mode is on, the position information acquisition unit 130 acquires image information provided from the sound collecting/imaging device 400 and generates the position information indicating a position of the display/sound collecting device 200-2, i.e., a position of the face of the user, on the basis of the image information.

In addition, the information processing device 100-2 acquires face direction information (Step S906). Specifically, the voice input suitability determination unit 124 acquires the face direction information provided from the display/sound collecting device 200-2.

Next, the information processing device 100-2 calculates a direction determination value (Step S908). Specifically, the voice input suitability determination unit 124 calculates the direction determination value on the basis of the position information and the face direction information. Details thereof will be described below.

Next, the information processing device 100-2 decides a control amount (Step S910). Specifically, the adjustment unit 132 decides the control amount for a mode of the sound collecting/imaging device 400 and output to induce a speech direction on the basis of the direction determination value. Details of the decision will be descried below.

Next, the information processing device 100-2 generates an image on the basis of the control amount (Step S912) and notifies the display/sound collecting device 200-2 of image information thereof (Step S914). Specifically, the output control unit 126 decides a display object to be superimposed on the basis of the control amount instructed by the adjustment unit 132 and generates an image on which the display object is to be superimposed. Then, the communication unit 120 transmits the image information regarding the generated image to the display/sound collecting device 200-2.

Next, the information processing device 100-2 decides a mode of the sound collecting/imaging device 400 on the basis of the control amount (Step S916), and notifies the sound collecting/imaging device 400 of sound collection mode instruction information (Step S918). Specifically, the sound collection mode control unit 134 generates the sound collection mode instruction information instructing a transition to the mode of the sound collecting/imaging device 400 decided on the basis of the control amount instructed by the adjustment unit 132. Then, the communication unit 120 transmits the generated sound collection mode instruction information to the sound collecting/imaging device 400.

(Direction Determination Value Calculation Process)

Figure 29:
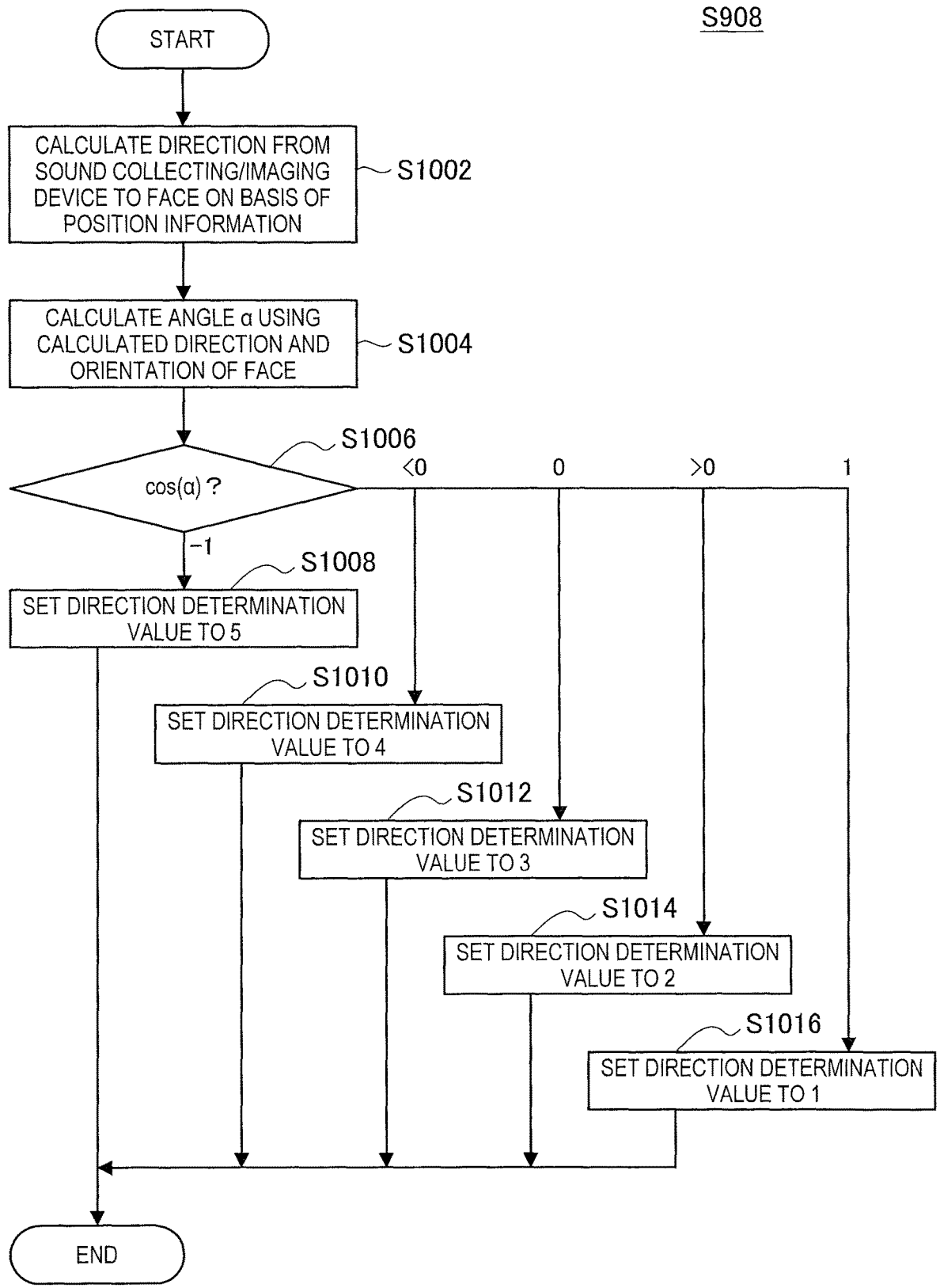
FIG. 29 is a flowchart illustrating the concept of a direction determination value calculation process by the information processing device according to the embodiment.

Subsequently, a direction determination value calculation process according to the present embodiment will be described with reference to FIG. 29. FIG. 29 is a flowchart illustrating the concept of the direction determination value calculation process of the information processing device 100-2 according to the present embodiment.

The information processing device 100-2 calculates a direction from the sound collecting/imaging device 400 to the face of the user on the basis of the position information (Step S1002). Specifically, the voice input suitability determination unit 124 calculates a MicToFaceVec using the position information acquired by the position information acquisition unit 130.

Next, the information processing device 100-2 calculates an angle α using the calculated direction and the orientation of the face (Step S1004). Specifically, the voice input suitability determination unit 124 calculates the angle α formed by the direction indicated by the MicToFaceVec and the orientation of the face indicated by the face direction information.

Next, the information processing device 100-2 determines an output result of the cosine function having the angle α as input (Step S1006). Specifically, the voice input suitability determination unit 124 determines a direction determination value in accordance with the value of cos (a).

In a case in which the output result of the cosine function is −1, the information processing device 100-2 sets the direction determination value to 5 (Step S1008). In a case in which the output result of the cosine function is not −1 but smaller than 0, the information processing device 100-2 sets the direction determination value to 4 (Step S1010). In a case in which the output result of the cosine function is 0, the information processing device 100-2 sets the direction determination value to 3 (Step S1012). In a case in which the output result of the cosine function is greater than 0 and is not 1, the information processing device 100-2 sets the direction determination value to 2 (Step S1014). In a case in which the output result of the cosine function is 1, the information processing device 100-2 sets the direction determination value to 1 (Step S1016).

(Control Amount Decision Process)

Figure 30:
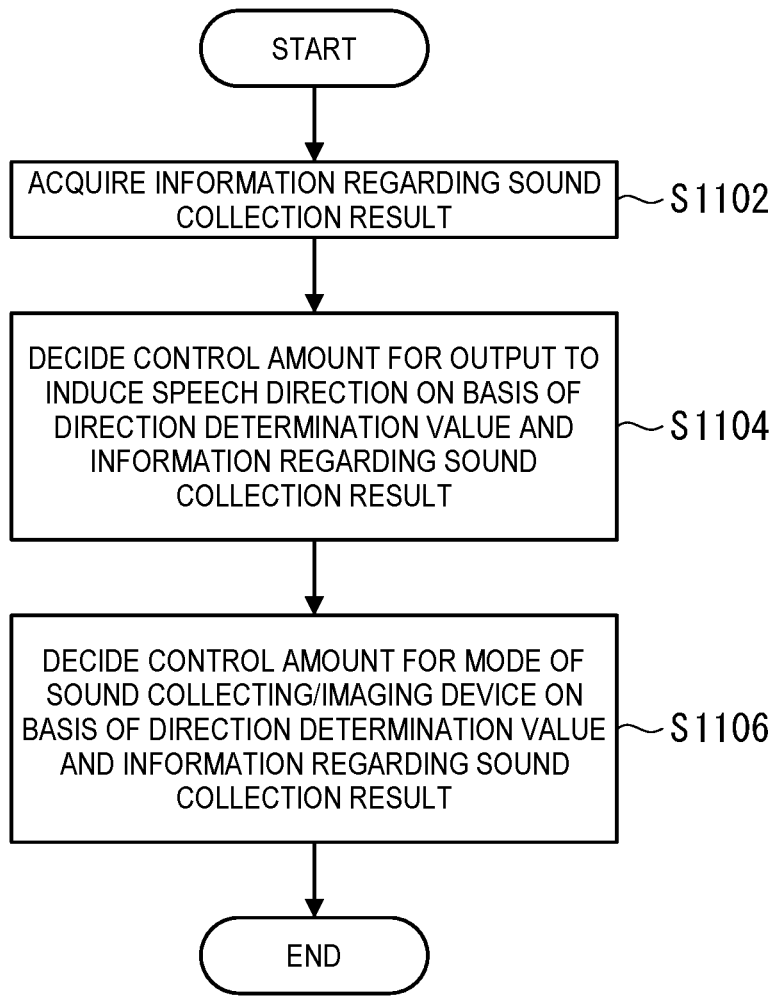
FIG. 30 is a flowchart illustrating the concept of a control amount decision process by the information processing device according to the embodiment.

Subsequently, a control amount decision process will be described with reference to FIG. 30. FIG. 30 is a flowchart illustrating the concept of the control amount decision process by the information processing device 100-2 according to the present embodiment.

The information processing device 100-2 acquires information regarding a sound collection result (Step S1102). Specifically, the adjustment unit 132 acquires content type information processed using the sound collection result, surrounding environment information of the sound collecting/imaging device 400 or the user that affects the sound collection result, user mode information, and the like.

Next, the information processing device 100-2 decides a control amount for output to induce a speech direction on the basis of the direction determination value and the information regarding the sound collection result (Step S1104). Specifically, the adjustment unit 132 decides the control amount (direction determination value) to be instructed to the output control unit 126 on the basis of the direction determination value provided from the voice input suitability determination unit 124 and the information regarding the sound collection result.

In addition, the information processing device 100-2 decides a control amount for the mode of the sound collecting/imaging device 400 on the basis of the direction determination value and the information regarding the sound collection result (Step S1106). Specifically, the adjustment unit 132 decides the control amount to be instructed to the sound collection mode control unit 134 on the basis of the direction determination value provided from the voice input suitability determination unit 124 and the information regarding the sound collection result.

2-4. Processing Example

Next, processing examples of the information processing system will be described with reference to FIG. 31 to FIG. 35. FIG. 31 to FIG. 35 are diagrams for describing the processing examples of the information processing system according to the present embodiment.

Figure 31:
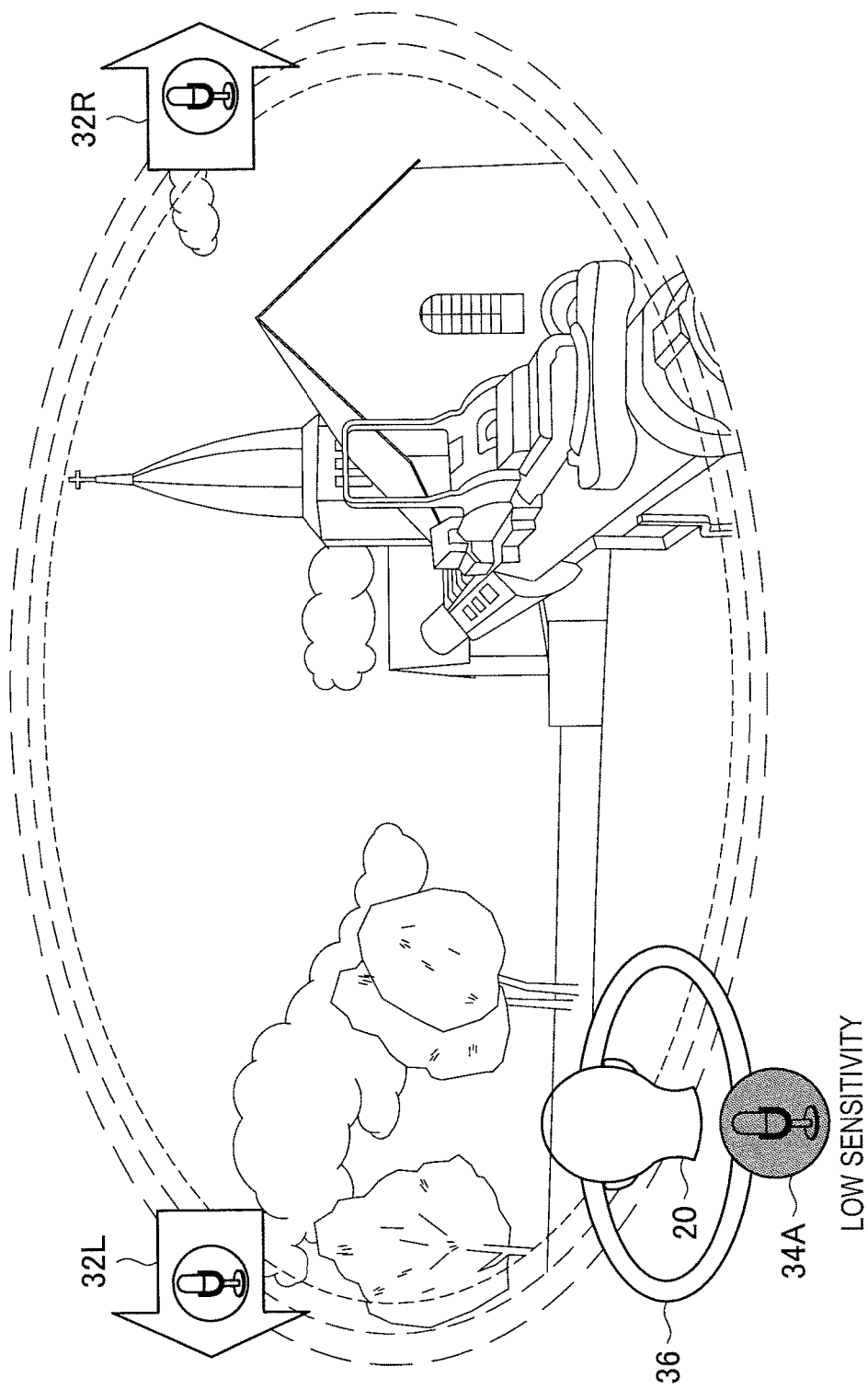
FIG. 31 is a diagram for describing a processing example of the information processing system according to the embodiment.

The description begins from a state in which a user faces the opposite direction to a direction in which the user faces the sound collecting/imaging device 400, i.e., the state of (15) of FIG. 27, with reference to FIG. 31. First, the information processing device 100-2 generates a game screen on the basis of VR processing. Next, in a case in which sound collection sensitivity is less than a threshold value, the information processing device 100-2 decides a control amount for a mode of the sound collecting/imaging device 400 and a control amount for output to induce a user's speech direction. Then, the information processing device 100-2 superimposes the above-described display object decided on the basis of the control amount for the output for induction on the game screen. Examples of the output for induction will be mainly described below.

The output control unit 126 superimposes, for example, a display object 20 indicating the head of a person, a face direction inducing object 32 indicating an orientation of the face to be changed, a sound collection position object 34 for indicating a position of the sound collecting/imaging device 400, and a display object 36 for making the position to be easily recognized on the game screen. Note that the sound collection position object 34 may also serve as the above-described evaluation object.

Since rotation of the head of the user is induced so that the face of the user faces directly rearward in the state of (15) of FIG. 27, arrows of face direction inducing objects 32L and 32R prompting the user to rotate his or her head to any side between the left and the right are superimposed. In addition, the display object 36 is superimposed as a circle surrounding the head of the user indicated by the display object 20, and a sound collection position object 34A is superimposed at a position at which the sound collection position object appears to be present right behind the user. Furthermore, the sound collection position object 34A serves as an evaluation object and is expressed with shading of a dot pattern in accordance with evaluation of a mode of the user. In the example of FIG. 31, for example, the orientation of the face of the user corresponds to a direction with respect to the lowest value of the direction determination value, and thus the sound collection position object 34A is expressed with a dark dot pattern. Furthermore, the output control unit 126 may superimpose a display object indicating sound collection sensitivity of the sound collecting/imaging device 400 on the game screen. As illustrated in FIG. 31, for example, a display object of "low sensitivity" indicating sound collection sensitivity of the sound collecting/imaging device 400 (which will also be referred to as a sound collection sensitivity object below) in a case in which voice input has been performed at the current mode of the user may be superimposed on the game screen. Note that the sound collection sensitivity object may be a figure, a symbol, or the like, other than a character string as illustrated in FIG. 31.

Figure 32:
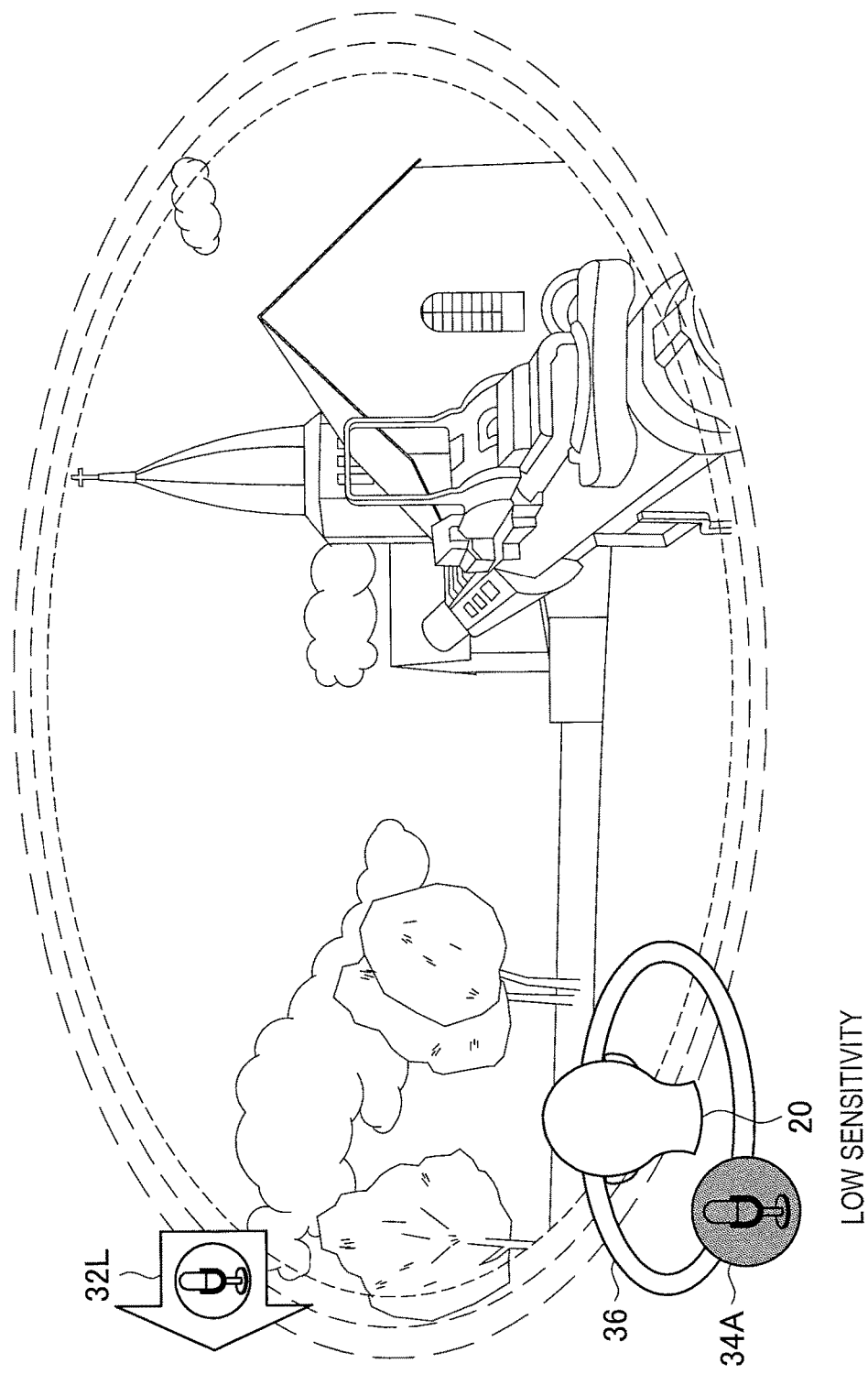
FIG. 32 is a diagram for describing a processing example of the information processing system according to the embodiment.

Next, a state in which the user rotates his or her head slightly counterclockwise, i.e., the state of (14) of FIG. 27, will be described with reference to FIG. 32. In the state of (14), the head of the user rotates slightly counterclockwise from the state of (15), and thus the arrow of the face direction inducing object 32L is formed to be shorter than in the state of (15). In addition, since the position of the sound collecting/imaging device 400 with respect to the orientation of the face changes due to the rotation of the head of the user, the sound collection position object 34A is moved clockwise in accordance with the rotation of the head of the user. Note that, in the example of FIG. 32, although the shading of the dot pattern of the sound collection position object 34A is maintained, the orientation of the face is changed on the basis of the induced orientation of the face, and thus the shading of the dot pattern may be changed to be lighter than in the state of (15) of FIG. 27. Accordingly, the user is presented with the fact that evaluation of the orientation of the face of the user has been improved.

Figure 33:
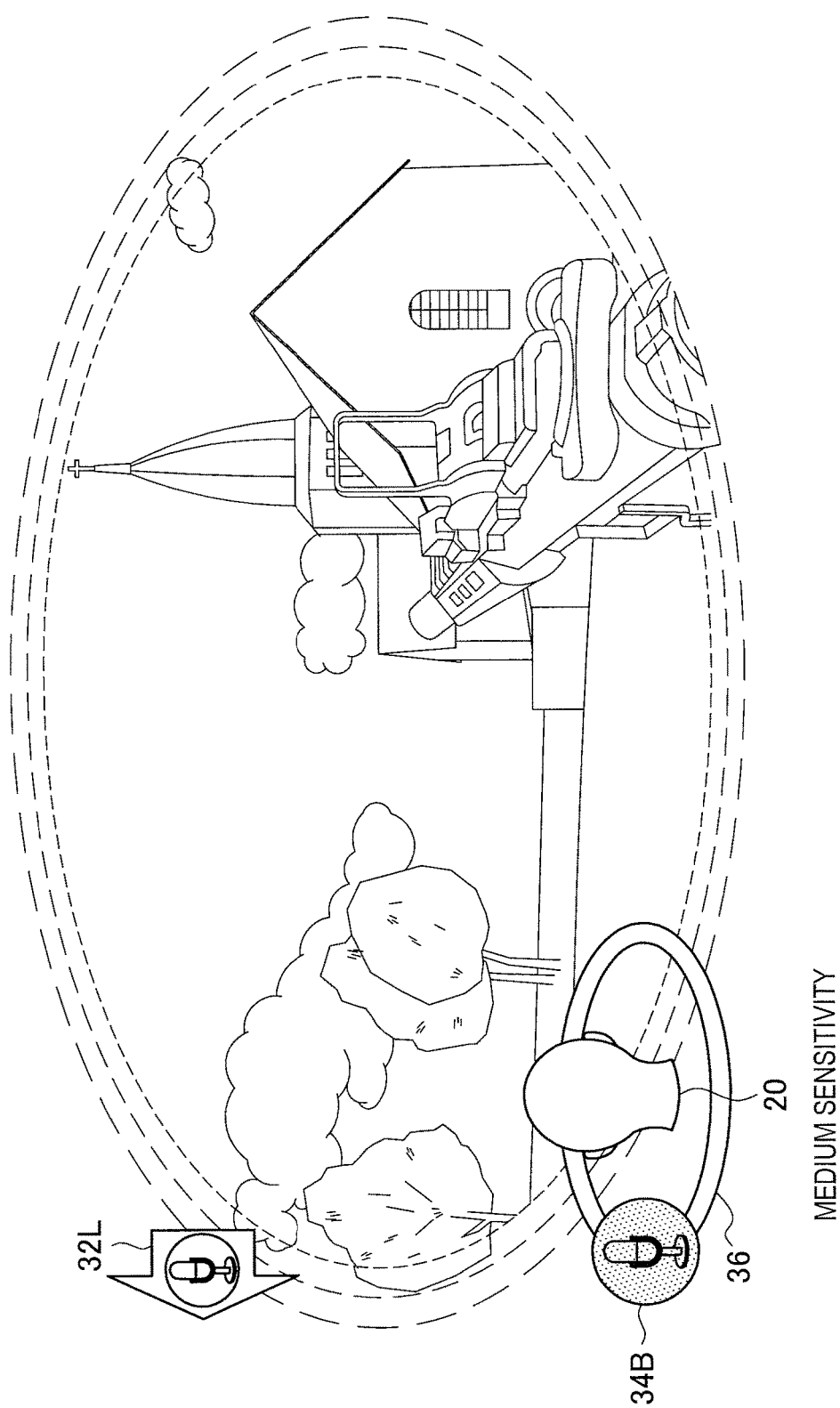
FIG. 33 is a diagram for describing a processing example of the information processing system according to the embodiment.

Next, a state in which the user rotates his or her head further counterclockwise, i.e., the state of (13) of FIG. 27, will be described with reference to FIG. 33. In the state of (13), the head of the user is rotated further clockwise from the state of (14), and thus the arrow of the face direction inducing object 32L is formed to be shorter than in the state of (14). In addition, sine the orientation of the face is changed on the basis of the induced orientation of the face, a sound collection position object 34B whose shading of the dot pattern is changed to be lighter than in the state of (14) is superimposed. Furthermore, since the position of the sound collecting/imaging device 400 with respect to the orientation of the face is further changed from the state of (14), the sound collection position object 34B is moved further clockwise from the state of (14) in accordance with the rotation of the head. In addition, since the sound collection sensitivity of the sound collecting/imaging device 400 has been improved, the sound collection sensitivity object switches from "low sensitivity" to "medium sensitivity."

Figure 34:
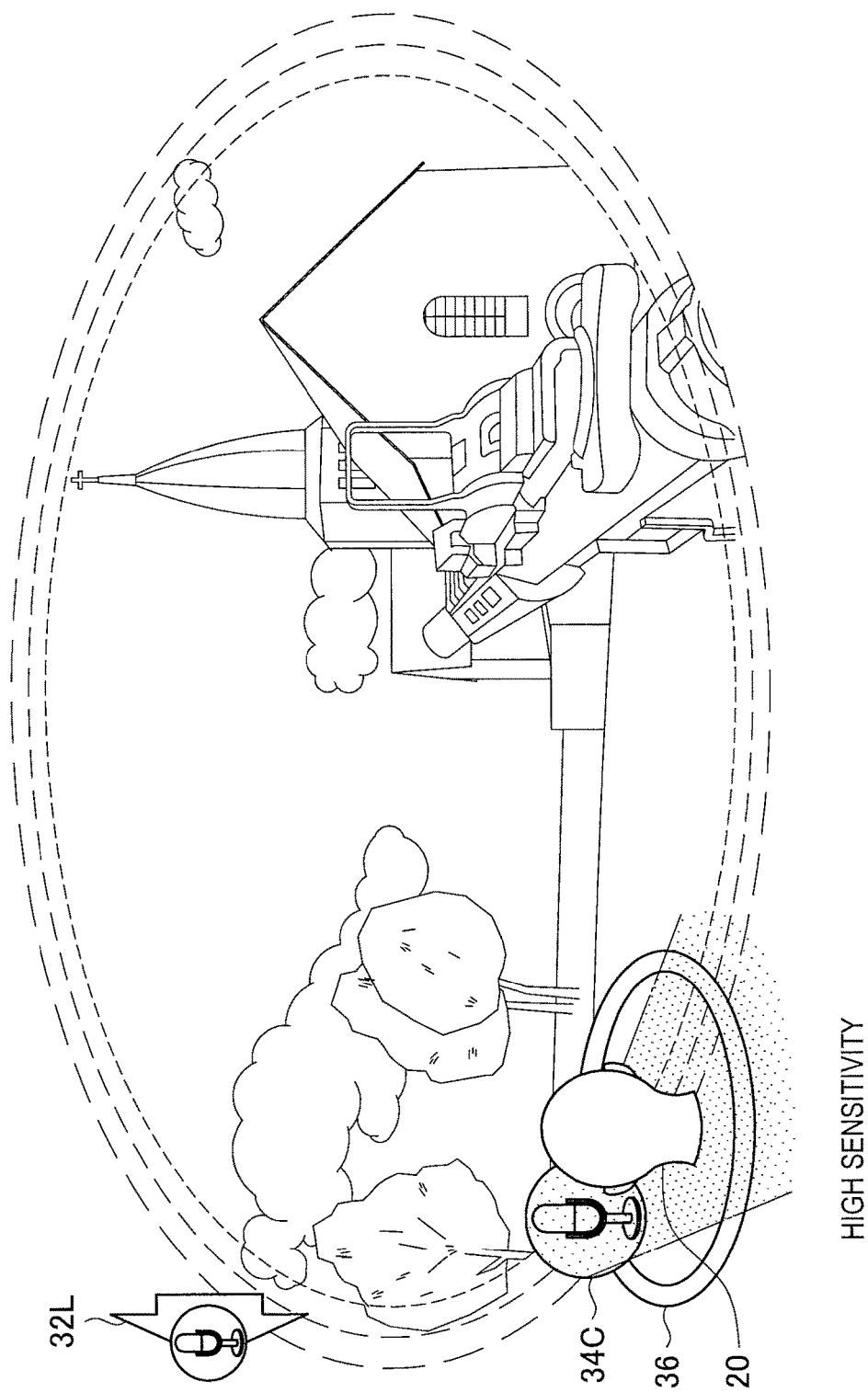
FIG. 34 is a diagram for describing a processing example of the information processing system according to the embodiment.

Next, a state in which the user rotates his or her head further counterclockwise, i.e., the state of (12) of FIG. 27, will be described with reference to FIG. 34. In the state of (12), the head of the user is rotated further clockwise from the state of (13), and thus the arrow of the face direction inducing object 32L is formed to be shorter than in the state of (13). In addition, sine the orientation of the face is changed on the basis of the induced orientation of the face, a sound collection position object 34C whose shading of the dot pattern is changed to be lighter than in the state of (13) is superimposed. Furthermore, since the position of the sound collecting/imaging device 400 with respect to the orientation of the face is further changed from the state of (13), the sound collection position object 34C is moved further clockwise from the state of (13) in accordance with the rotation of the head. In addition, since the sound collection sensitivity of the sound collecting/imaging device 400 has been improved, the sound collection sensitivity object switches from "medium sensitivity" to "high sensitivity." Furthermore, the output control unit 126 may superimpose a display object indicating a beamforming direction (which will also be referred to as a beamforming object below) on the game screen. For example, a beamforming object indicating a range of the beamforming direction is superimposed using a sound collection position object 34C as a starting point as illustrated in FIG. 34. Note that the range of the beamforming object may not precisely coincide with the actual range of the beamforming direction of the sound collecting/imaging device 400. The reason for this is to give an image of the invisible beamforming direction to the user.

Figure 35:
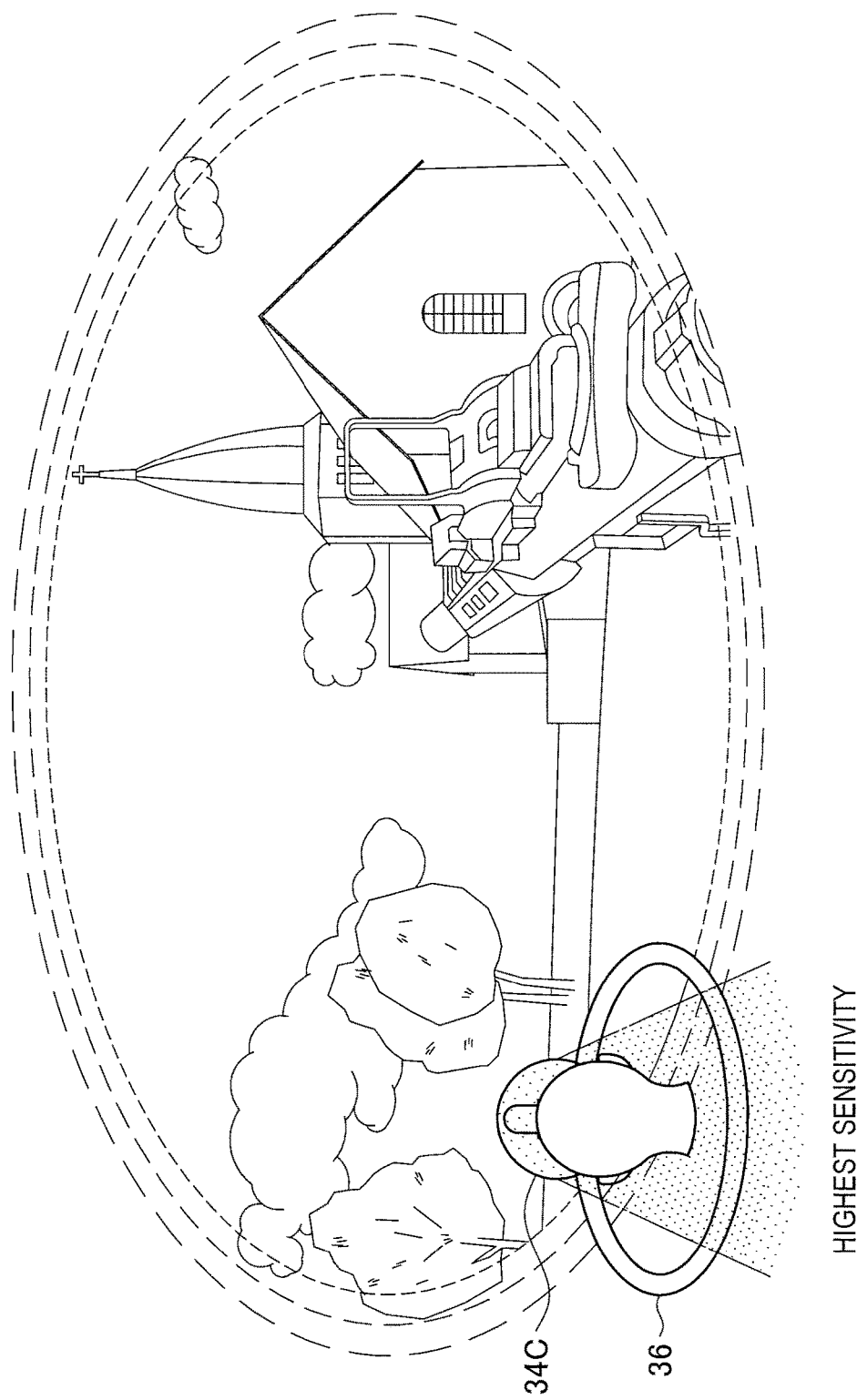
FIG. 35 is a diagram for describing a processing example of the information processing system according to the embodiment.

Finally, a state in which the face of the user directly faces the sound collecting/imaging device 400, i.e., the state of (11) of FIG. 27, will be described with reference to FIG. 35. In the state of (11), it is not necessary to cause the user to rotate his or her head further, and thus the arrow of the face direction inducing object 32L is not superimposed. In addition, since the sound collecting/imaging device 400 is positioned at a position in the front of the face of the user, the sound collection position object 34C is moved behind the front side of the display object 20 resembling the head of the user. Furthermore, since the sound collection sensitivity of the sound collecting/imaging device 400 has a highest value in the range changed by the rotation of the head, the sound collection sensitivity object switches from "high sensitivity" to "highest sensitivity."

Note that, although the example in which the output to induce a speech direction is output to induce an orientation of the face has been described in the above-described series of processing examples, a target to be induced may be movement of the user. For example, a display object indicating a movement direction or a movement destination of the user may be superimposed on the game screen, instead of the face direction inducing object.

In addition, the sound collection position object may be a display object indicating a mode of the sound collecting/imaging device 400. For example, the output control unit 126 may superimpose a display object indicating a position, an attitude, or a beamforming direction before, after, or during actual movement of the sound collecting/imaging device 400, or a state during movement thereof or the like.

2-5. Summary of Second Embodiment

As described above, according to the second embodiment of the present disclosure, the information processing device 100-2 performs control related to a mode of the sound collecting unit (the sound collecting/imaging device 400) related to the sound collecting characteristic and output to induce a generation direction of a sound to be collected by the sound collecting unit on the basis of a positional relation between the sound collecting unit and a generation source of the sound to be collected. Thus, a possibility of the sound collecting characteristic being improved can be further increased in comparison to a case in which only the mode of the sound collecting unit or only the generation direction of the sound is controlled. For example, in a case in which it is not possible to sufficiently control one of the mode of the sound collecting unit and the generation direction of the sound, the sound collecting characteristic can be recovered in control of the other side. Thus, the sound collecting characteristic can be improved more reliably.

In addition, a sound to be collected includes voice, the generation direction of the sound to be collected includes a direction of the face of the user, and the information processing device 100-2 performs the control on the basis of the positional relation and an orientation of the face of the user. Here, since speech of the user is performed using his or her mouth, if processing is performed to set a speech direction as the orientation of the face of the user, separate processing to specify a speech direction can be omitted. Therefore, complexity of processing can be avoided.

In addition, the information processing device 100-2 performs the control on the basis of information regarding a difference between a direction from the generation source to the sound collecting unit or a direction from the sound collecting unit to the generation source and the orientation of the face of the user. Thus, since the direction from the sound collecting unit to the user or the direction from the user to the sound collecting unit is used in control processing, a mode of the sound collecting unit can be controlled more accurately, and a speech direction can be induced more accurately. Therefore, the sound collecting characteristic can be improved more effectively.

In addition, the difference includes the angle formed by the direction from the generation source to the sound collecting unit or the direction from the sound collecting unit to the generation source and the orientation of the face of the user. Thus, by using angle information in the control processing, accuracy or precision of the control can be improved. Furthermore, by performing the control processing using an existing angle calculation technology, costs for device development can be reduced and complication of the process can be prevented.

In addition, the information processing device 100-2 controls degrees of the mode of the sound collecting unit and the output for induction on the basis of information regarding a sound collection result of the sound collecting unit. Thus, the mode of the sound collecting unit and the output for induction that are appropriate for more situations can be realized in comparison to control is uniformly performed. Therefore, the sound collecting characteristic can be improved more reliably in more situations.

In addition, the information regarding the sound collection result includes type information of content to be processed using the sound collection result. Thus, by performing control in accordance with content to be viewed by the user, the sound collecting characteristic can be improved without obstructing viewing of the user. Furthermore, since details of the control is determined using the relatively simple information of the type of the content, complexity of the control processing can be reduced.

In addition, the information regarding the sound collection result includes surrounding environment information of the sound collecting unit or the user. Here, there are cases in which it is difficult to change movement or an attitude depending on a place at which the sound collecting unit or the user is present. With regard to this problem, according to the present configuration, by performing control over the mode of the sound collecting unit and the output for induction using control distribution in accordance with the surrounding environment of the sound collecting unit or the user, it is possible to free the sound collecting unit or the user from being forced to execute a difficult action.

In addition, the information regarding the sound collection result includes the user mode information. Here, there are cases in which it is difficult to change a speech direction to an induced direction depending on a mode of the user. With regard to this problem, according to the present configuration, by performing control over the mode of the sound collecting unit and the output for induction using control distribution in accordance with the mode of the user, user-friendly induction can be realized. In general, since users tend to think that they want to avoid performing an additional action, the present configuration is particularly beneficial in a case in which a user wants to concentrate on viewing content or the like.

In addition, the user mode information includes information regarding an attitude of the user. Thus, an attitude can be changed from an attitude of the user specified from the information, can be induced within a desirable range, or the like. Therefore, it is possible to free the user from being forced to perform an absurd action.

In addition, the user mode information includes information regarding immersion of the user in content to be processed using the sound collection result. Thus, the sound collecting characteristic can be improved, without obstructing immersion of the user in content viewing. Therefore, user convenience can be improved without giving discomfort to the user.

In addition, the information processing device 100-2 decides whether to perform the control on the basis of sound collection sensitivity information of the sound collecting unit. Thus, by performing the control in a case in which sound collection sensitivity decreases, for example, power consumption of the device can be suppressed in comparison to a case in which the control is performed at all times. Furthermore, by providing the output for induction to the user at a right time, complications of the output for the user can be reduced.

In addition, the information processing device 100-2 controls only one of the mode of the sound collecting unit and the output for induction on the basis of the information regarding the sound collection result of the sound collecting unit. Thus, even in a case in which it is difficult to change the mode of the sound collecting unit or to prompt induction of the user, the sound collecting characteristic can be improved.

In addition, the mode of the sound collecting unit includes a position or an attitude of the sound collecting unit. Here, a position or an attitude of the sound collecting unit is an element for deciding a sound collection direction with relatively significant influence among elements that have influence on the sound collecting characteristic. Therefore, by controlling such a position or an attitude, the sound collecting characteristic can be improved more effectively.

In addition, the mode of the sound collecting unit includes a mode of beamforming related to sound collection of the sound collecting unit. Thus, the sound collecting characteristic can be improved without changing an attitude of the sound collecting unit or moving the sound collecting unit. Therefore, a configuration for changing an attitude of the sound collecting unit or moving the sound collecting unit may not be provided, a variation of the sound collecting unit applicable to the information processing system can be expanded, or cost for the sound collecting unit can be reduced.

In addition, the output for induction includes output to notify of a direction in which the orientation of the face of the user is to be changed. Thus, the user can ascertain an action for more highly sensitive voice input. Therefore, it is possible to reduce a possibility of the user feeling discomfort because the user does not know the reason that the user failed voice input or an action to take. In addition, since the user is directly notified of the orientation of the face, the user can intuitively understand an action to take.

In addition, the output for induction includes output to notify of a position of the sound collecting unit. Here, the user mostly understands that, if the user turns his or her face toward the sound collecting unit, the sound collection sensitivity is improved. Thus, by notifying the user of a position of the sound collecting unit as in the present configuration, the user can intuitively ascertain an action to take without exact induction by the device. Therefore, notification to the user becomes simplified, and thus complexity of notification to the user can be reduced.

In addition, the output for induction includes visual presentation to the user. Here, visual information presentation requires a larger amount of information than information presentation using other senses in general. Thus, the user can easily understand the induction, and thus smooth induction is possible.

In addition, the output for induction includes output related to evaluation of an orientation of the face of the user with reference to an orientation of the face of the user resulting from induction. Thus, the user can ascertain whether he or she performed an induced action. Therefore, since the user easily performs the action based on induction, the sound collecting characteristic can be improved more reliably.

3. Application Examples

The information processing system according to each embodiment of the present disclosure has been described above. The information processing device 100 can be applied to various fields and situations. Application examples of the information processing system will be described below.

(Application to Field of Medicine)

The above-described information processing system may be applied to the field of medicine. Here, there are many cases in which medical services such as surgeries are provided by a plurality of people along with the advancement of medicine. Thus, communication between surgery attendants has become ever more important. Thus, to encourage such communication, sharing of visual information and communication through voice using the above-described display/sound collecting device 200 are considered. For example, it is assumed that, during a surgery, an advisor located at a remote place wearing the display/sound collecting device 200 gives an instruction or advice to an operator while checking situations of the surgery. In this case, it may be difficult for the advisor to check a surrounding situation because he or she concentrates on viewing a displayed situation of the surgery. Furthermore, in such a case, a noise source can be present in the vicinity or an independent sound collecting device installed at a separate position from the display/sound collecting device 200 can be used. According to the information processing system, however, the user can be induced to avoid noise from the noise source and maintain sound collection sensitivity even in such a case. In addition, the sound collecting device side can be controlled such that sound collection sensitivity increases. Therefore, smooth communication can be realized, safety of medical treatment can be assured, and a surgical operation time can be shortened.

(Application to Robot)

In addition, the above-described information processing system can be applied to robots. Along with the development of current robot technologies, a combination of a plurality of functions such as a change of an attitude, movement, voice recognition, and voice output of one robot has progressed. Thus, application of the above-described functions of the sound collecting/imaging device 400 is considered. For example, it is assumed that a user wearing the display/sound collecting device 200 speaks to a robot in a case in which the user starts talking to the robot. However, it is difficult for the user to know which part of the robot a sound collecting device is provided or which direction ensures high sound collection sensitivity. To solve this problem, the information processing system suggests a direction of speech toward the robot, and thus voice input is possible with high sound collection sensitivity. Therefore, the user can use the robot without fear of failing voice input.

In addition, as another issue, a case in which a user goes outside wearing the display/sound collecting device 200 is considered. In this case, there are normally other objects around the user, for example, other people, vehicles, buildings, and the like. Thus, there is a possibility of an orientation of his or her face changing or moving for the purpose of avoiding noise sources or improving sound collection sensitivity during voice input. In addition, there may also be a danger of accident or the like if the user is caused to move. To solve this problem, according to the information processing system, when there is difficulty or danger changing a mode of the user, comfortable voice input can be realized while safety of the user is secured even in outdoor places by changing a mode of the robot side, i.e., the sound collecting device side, by priority. Note that an apparatus on a street may have the functions of the sound collecting/imaging device 400, instead of or in addition to the robot.

4. Conclusion

According to the first embodiment of the present disclosure described above, by inducing a user's action of changing a positional relation between the noise source and the display/sound collecting device 200-1 so that the sound collecting characteristic is improved, the user can realize a situation appropriate for voice input in which noise is hardly input only by following induction. In addition, since noise is hardly input since the user is caused to perform an action, a separate configuration for avoiding noise may not be added to the information processing device 100-1 or the information processing system. Therefore, input of noise can be easily suppressed from the perspective of usability and the perspective of costs and facilities.

In addition, according to the second embodiment of the present disclosure, it is possible to increase the possibility of the sound collecting characteristic being improved in comparison to a case in which only a mode of the sound collecting unit or only a generation direction of sound is controlled. For example, in the case in which it is not possible to sufficiently control one of the mode of the sound collecting unit and the generation direction of the sound, the sound collecting characteristic can be recovered by control of the other side. Therefore, the sound collecting characteristic can be improved more reliably.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the voice of the user is a target to be collected in the above-described embodiments, the present disclosure is not limited thereto. For example, a sound produced using a part of the body other than the mouth or an object or a sound output by a sound output device or the like may be a target to be collected.

In addition, although the example output to induce an action of the user or the like is visually presented has been described in the above-described embodiments, the output for induction may be another type of output. The output for induction may be, for example, voice output or tactile vibration output. In this case, the display/sound collecting device 200 may have no display unit, i.e., may be a headset.

In addition, although the example in which noise or a user's speech sound is linearly collected has been described in the above-described embodiments, such sounds may be collected after reflection. Thus, output to induce an action of the user and a mode of the sound collecting/imaging device 400 may be controlled in consideration of the reflection of the sounds.

In addition, although the example in which the information processing device 100 generates position information of the display/sound collecting device 200 has been described in the above-described second embodiment, the display/sound collecting device 200 may generate the position information. For example, by mounting the luminous body 50 onto the sound collecting/imaging device 400 and providing an imaging unit in the display/sound collecting device 200, the process of generating the position information can be performed on the display/sound collecting device 200 side.

In addition, although the example in which the mode of the sound collecting/imaging device 400 is controlled by the information processing device 100 through communication has been described in the second embodiment, a user other than the user wearing the display/sound collecting device 200 may be allowed to change the mode of the sound collecting/imaging device 400. For example, the information processing device 100 may cause an external device or an output unit that is additionally included in the information processing device 100 to perform output to induce the other user to change the mode of the sound collecting/imaging device 400. In this case, the configuration of the sound collecting/imaging device 400 can be simplified.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

In addition, a computer program for causing hardware built in the information processing device 100 to exhibit functions equivalent to those of the above-described respective logical configurations of the information processing device 100 can also be produced. Furthermore, a storage medium in which the computer program is stored is also provided.

Additionally, the present technology may also be configured as below.

(1)

An information processing device including:

a control unit configured to, on a basis of a positional relation between a generation source of noise and a sound collecting unit that collects a sound generated by a user, control output to induce an action of the user to change a sound collection characteristic of a generated sound, the action being different from an operation related to processing of the sound collecting unit.

(2)

The information processing device according to (1), in which the sound generated by the user includes voice, and the control unit controls the output for the induction on a basis of the positional relation and an orientation of a face of the user.

(3)

The information processing device according to (2), in which the control unit controls the output for the induction on a basis of information regarding a difference between a direction from the generation source to the sound collecting unit or a direction from the sound collecting unit to the generation source and the orientation of the face of the user.

(4)

The information processing device according to (3), in which the difference includes an angle formed by the direction from the generation source to the sound collecting unit or the direction from the sound collecting unit to the generation source and the orientation of the face of the user.

(5)

The information processing device according to any one of (2) to (4), in which the action of the user includes a change of the orientation of the face of the user.

(6)

The information processing device according to any one of (2) to (5), in which the action of the user includes an action of blocking the generation source from the sound collecting unit with a predetermined object.

(7)

The information processing device according to any one of (2) to (6), in which the output for the induction includes output related to evaluation of a mode of the user with reference to a mode of the user resulting from the induced action.

(8)

The information processing device according to any one of (2) to (7), in which the output for the induction includes output related to the noise collected by the sound collecting unit.

(9)

The information processing device according to (8), in which the output related to the noise includes output to notify of a reachable area of the noise collected by the sound collecting unit.

(10)

The information processing device according to (8) or (9), in which the output related to the noise includes output to notify of sound pressure of the noise collected by the sound collecting unit.

(11)

The information processing device according to any one of (2) to (10), in which the output for the induction includes visual presentation to the user.

(12)

The information processing device according to (11), in which the visual presentation to the user includes superimposition of a display object on an image or an external image.

(13)

The information processing device according to any one of (2) to (12), in which the control unit controls notification of suitability for collection of a sound generated by the user on a basis of the orientation of the face of the user or sound pressure of the noise.

(14)

The information processing device according to any one of (2) to (13), in which the control unit controls whether to perform the output for the induction on a basis of information regarding a sound collection result of the sound collecting unit.

(15)

The information processing device according to (14), in which the information regarding the sound collection result includes start information of processing that uses the sound collection result.

(16)

The information processing device according to (14) or (15), in which the information regarding the sound collection result includes sound pressure information of the noise collected by the sound collecting unit.

(17)

The information processing device according to any one of (2) to (16), in which, in a case in which the output for the induction is performed during execution of processing using a sound collection result of the sound collecting unit, the control unit stops at least a part of the processing.

(18)

The information processing device according to (17), in which the at least part of the processing includes processing using the orientation of the face of the user in the processing.

(19)

An information processing method performed by a processor, the information processing method including:

on a basis of a positional relation between a generation source of noise and a sound collecting unit that collects a sound generated by a user, controlling output to induce an action of the user to change a sound collection characteristic of a generated sound, the action being different from an operation related to processing of the sound collecting unit.

(20)

A program for causing a computer to realize:

a control function of, on a basis of a positional relation between a generation source of noise and a sound collecting unit that collects a sound generated by a user, controlling output to induce an action of the user to change a sound collection characteristic of a generated sound, the action being different from an operation related to processing of the sound collecting unit.

Additionally, the present technology may also be configured as below.

(1)

An information processing device including:

a control unit configured to perform control related to a mode of a sound collecting unit related to a sound collecting characteristic and output to induce a generation direction of a sound to be collected by the sound collecting unit on a basis of a positional relation between the sound collecting unit and a generation source of the sound to be collected.

(2)

The information processing device according to (1), in which the sound to be collected includes voice, the generation direction of the sound to be collected includes a direction of a face of a user, and the control unit performs the control on a basis of the positional relation and an orientation of the face of the user.

(3)

The information processing device according to (2), in which the control unit performs the control on a basis of information regarding a difference between a direction from the generation source to the sound collecting unit or a direction from the sound collecting unit to the generation source and the orientation of the face of the user.

(4)

The information processing device according to (3), in which the difference includes an angle formed by the direction from the generation source to the sound collecting unit or the direction from the sound collecting unit to the generation source and the orientation of the face of the user.

(5)

The information processing device according to any one of (2) to (4), in which the control unit controls degrees of the mode of the sound collecting unit and the output for the induction on a basis of information regarding a sound collection result of the sound collecting unit.

(6)

The information processing device according to (5), in which the information regarding the sound collection result includes type information of content to be processed using the sound collection result.

(7)

The information processing device according to (5) or (6), in which the information regarding the sound collection result includes surrounding environment information of the sound collecting unit or the user.

(8)

The information processing device according to any one of (5) to (7), in which the information regarding the sound collection result includes mode information of the user.

(9)

The information processing device according to (8), in which the mode information of the user includes information regarding an attitude of the user.

(10)

The information processing device according to (8) or (9), in which the mode information of the user includes information regarding immersion of the user in content to be processed using the sound collection result.

(11)

The information processing device according to any one of (2) to (10), in which the control unit decides whether to perform the control on a basis of sound collection sensitivity information of the sound collecting unit.

(12)

The information processing device according to any one of (2) to (11), in which the control unit controls only one of the mode of the sound collecting unit and the output for the induction on a basis of information regarding a sound collection result of the sound collecting unit.

(13)

The information processing device according to any one of (2) to (12), in which the mode of the sound collecting unit includes a position or an attitude of the sound collecting unit.

(14)

The information processing device according to any one of (2) to (13), in which the mode of the sound collecting unit includes a mode of beamforming related to sound collection of the sound collecting unit.

(15)

The information processing device according to any one of (2) to (14), in which the output for the induction includes output to notify of a direction in which the orientation of the face of the user is to be changed.

(16)

The information processing device according to any one of (2) to (15), in which the output for the induction includes output to notify of a position of the sound collecting unit.

(17)

The information processing device according to any one of (2) to (16), in which the output for the induction includes visual presentation to the user.

(18)

The information processing device according to any one of (2) to (17), in which the output for the induction includes output related to evaluation of the orientation of the face of the user with reference to an orientation of the face of the user resulting from the induction.

(19)

An information processing method performed by a processor, the information processing method including: performing control related to a mode of a sound collecting unit related to a sound collecting characteristic and output to induce a generation direction of a sound to be collected by the sound collecting unit on a basis of a positional relation between the sound collecting unit and a generation source of the sound to be collected.

(20)

A program causing a computer to realize: a control function of performing control related to a mode of a sound collecting unit related to a sound collecting characteristic and output to induce a generation direction of a sound to be collected by the sound collecting unit on a basis of a positional relation between the sound collecting unit and a generation source of the sound to be collected.

REFERENCE SIGNS LIST 100 information processing device
120 communication unit
122 VR processing unit
124 voice input suitability determination unit
126 output control unit
130 position information acquisition unit
132 adjustment unit
134 sound collection mode control unit
200 display/sound collecting device
300 sound processing device
400 sound collecting/imaging device

The invention claimed is:

1. An information processing device, comprising:
a central processing unit (CPU) configured to:
control output to induce a user action to change an orientation of a face of a user, wherein
the output to induce the user action includes:
a notification that notifies the user to change the orientation of the face of the user, and
a first object indicating a direction and a degree of the change of the orientation of the face of the user,
the output to induce the user action is controlled to change a sound collection characteristic of a user generated sound,
the output to induce the user action is controlled based on a positional relation between a generation source of noise and a microphone,
the microphone collects the user generated sound,
the sound is different from the noise, and
the change of the orientation of the face of the user is different from an operation related to a first process of the microphone; and
change a size of the first object based on the change of the orientation of the face of the user.

2. The information processing device according to claim 1, wherein
the user generated sound includes voice, and
the CPU is further configured to control the output to induce the user action based on the positional relation and the orientation of the face of the user.

3. The information processing device according to claim 2, wherein the CPU is further configured to control the output to induce the user action based on information regarding a difference between one of a direction from the generation source of noise to the microphone or a direction from the microphone to the generation source of noise and the orientation of the face of the user.

4. The information processing device according to claim 3, wherein the difference includes an angle formed by the one of the direction from the generation source of noise to the microphone or the direction from the microphone to the generation source of noise and the orientation of the face of the user.

5. The information processing device according to claim 2, wherein
the output to induce the user action further includes output related to evaluation of a first user mode with reference to a second user mode, and
the second user mode results from the changed orientation of the face of the user.

6. The information processing device according to claim 2, wherein the output to induce the user action further includes output related to the noise collected by the microphone.

7. The information processing device according to claim 6, wherein the output related to the noise includes output to notify of a reachable area of the noise collected by the microphone.

8. The information processing device according to claim 6, wherein the output related to the noise includes output to notify of sound pressure of the noise collected by the microphone.

9. The information processing device according to claim 2, wherein
the CPU is further configured to control notification of suitability for the collection of the user generated sound based on at least one of the orientation of the face of the user or a sound pressure of the noise.

10. The information processing device according to claim 2, wherein the CPU is further configured to control the output to induce the user action based on information regarding a sound collection result of the microphone.

11. The information processing device according to claim 10, wherein the information regarding the sound collection result includes start information of a second process that uses the sound collection result.

12. The information processing device according to claim 10, wherein the information regarding the sound collection result includes sound pressure information of the noise collected by the microphone.

13. The information processing device according to claim 2, wherein
the CPU is further configured to stop at least a part of a second process that uses a sound collection result of the microphone, and
at least the part of the second process is stopped based on the output to induce the user action during execution of the second process that uses the sound collection result of the microphone.

14. The information processing device according to claim 13, wherein at least the part of the second process is based on the orientation of the face of the user.

15. The information processing device according to claim 1, wherein the user action includes an action that blocks the generation source of noise from the microphone with a specific object.

16. The information processing device according to claim 1, wherein the output to induce the user action includes visual presentation to the user.

17. The information processing device according to claim 16, wherein the visual presentation to the user includes superimposition of a second object on an image.

18. An information processing method comprising:
controlling, by a processor, output to induce a user action to change an orientation of a face of a user, wherein
the output to induce the user action includes:
a notification that notifies the user to change the orientation of the face of the user, and
an object indicating a direction and a degree of the change of the orientation of the face of the user,
the output is controlled to change a sound collection characteristic of a user generated sound,
the output is controlled based on a positional relation between a generation source of noise and a microphone,
the microphone collects the user generated sound,
the user generated sound is different from the noise, and
the change of the orientation of the face of the user is different from an operation related to a process of the microphone; and
changing, by the processor, a size of the object based on the change of the orientation of the face of the user.

19. A non-transitory computer-readable medium having stored thereon, computer-executable instructions which, when executed by a computer, cause the computer to execute operations, the operations comprising:
controlling output to induce a user action to change an orientation of a face of a user, wherein
the output to induce the user action includes:
a notification that notifies the user to change the orientation of the face of the user, and
a object indicating a direction and a degree of the change of the orientation of the face of the user,
the output is controlled to change a sound collection characteristic of a user generated sound,
the output is controlled based on a positional relation between a generation source of noise and a microphone,
the microphone collects the user generated sound,
the user generated sound is different from the noise, and
the change of the orientation of the face of the user is different from an operation related to a process of the microphone; and
changing a size of the object based on the change of the orientation of the face of the user.

* * * * *